US011659219B2

(12) United States Patent
Li et al.

(10) Patent No.: US 11,659,219 B2
(45) Date of Patent: May 23, 2023

(54) VIDEO PERFORMANCE RENDERING MODIFICATION BASED ON DEVICE ROTATION METRIC

(71) Applicant: Loop Now Technologies, Inc., Redwood City, CA (US)

(72) Inventors: Wu-Hsi Li, Somerville, MA (US); Jerry Ting Kwan Luk, Menlo Park, CA (US); Kylie Marie Wetzel, San Mateo, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 17/086,335

(22) Filed: Oct. 31, 2020

(65) Prior Publication Data
US 2021/0051355 A1 Feb. 18, 2021

Related U.S. Application Data

(63) Continuation-in-part of application No. 16/865,985, filed on May 4, 2020, now Pat. No. 11,483,492, (Continued)

(51) Int. Cl.
*H04N 21/258* (2011.01)
*H04N 21/266* (2011.01)
(Continued)

(52) U.S. Cl.
CPC ..... *H04N 21/25825* (2013.01); *H04N 19/136* (2014.11); *H04N 21/25833* (2013.01); *H04N 21/2662* (2013.01)

(58) Field of Classification Search
USPC .......................................................... 348/68
See application file for complete search history.

(56) References Cited

U.S. PATENT DOCUMENTS

| 8,069,414 B2 | 11/2011 | Hartwig et al. |
| 8,244,707 B2 | 8/2012 | Lin et al. |

(Continued)

FOREIGN PATENT DOCUMENTS

| JP | 2017525247 A | 8/2017 |
| KR | 20130063327 A1 | 6/2013 |

(Continued)

*Primary Examiner* — Mikhail Itskovich
(74) *Attorney, Agent, or Firm* — Adams Intellex, PLC

(57) ABSTRACT

Disclosed techniques include video performance rendering modification based on device rotation metric. A media stream is received from a server. The media stream is targeted for display on a handheld media stream playback device. An orientation of the handheld device is determined during playback of the media stream on the handheld device. A change in the orientation of the handheld device is detected. The change occurs during playback of the media stream. Based on the detecting the change of orientation, a rotation angle of the handheld device is calculated. Based on the rotation angle, the playback speed of the media stream on the handheld device is changed. The changing the playback speed changes direction of playback rendering based on the rotation angle of the handheld device. The changing direction provides forward playback by rotating the handheld device in a clockwise direction from an initial orientation.

35 Claims, 32 Drawing Sheets

Related U.S. Application Data which is a continuation-in-part of application No. 16/423,332, filed on May 28, 2019, now Pat. No. 10,645,331.

(60) Provisional application No. 62/929,584, filed on Nov. 1, 2019, provisional application No. 62/801,987, filed on Feb. 6, 2019.

(51) Int. Cl.
    *H04N 21/2662*     (2011.01)
    *H04N 19/136*     (2014.01)

(56) References Cited

U.S. PATENT DOCUMENTS

| | | | |
|---|---|---|---|
| 8,572,490 B2 | 10/2013 | Hartwig et al. | |
| 9,118,712 B2 | 8/2015 | McCoy et al. | |
| 9,532,116 B2 | 12/2016 | Terpe | |
| 9,637,169 B2* | 5/2017 | Klank | B62D 15/0295 |
| 9,824,372 B1 | 11/2017 | Seth et al. | |
| 10,089,402 B1 | 10/2018 | Winkler et al. | |
| 2010/0149359 A1 | 6/2010 | Taoka | |
| 2012/0221950 A1 | 8/2012 | Chao et al. | |
| 2013/0021373 A1 | 1/2013 | Vaught et al. | |
| 2013/0276021 A1 | 10/2013 | Cho | |
| 2014/0043231 A1* | 2/2014 | Yoshioka | G09G 5/00 345/156 |
| 2014/0085227 A1* | 3/2014 | Alexandersson | G06F 3/041 345/173 |
| 2015/0195175 A1 | 7/2015 | Kariman | |
| 2015/0309686 A1* | 10/2015 | Morin | G06F 3/017 715/720 |
| 2016/0065929 A1 | 3/2016 | Barcons-Palau et al. | |
| 2016/0088369 A1 | 3/2016 | Terpe | |
| 2016/0093105 A1 | 3/2016 | Rimon et al. | |
| 2016/0162179 A1* | 6/2016 | Annett | G06F 3/0488 715/709 |
| 2018/0035170 A1 | 2/2018 | Liu et al. | |
| 2018/0253765 A1 | 9/2018 | Avedissian et al. | |
| 2018/0288396 A1 | 10/2018 | Bouazizi et al. | |

FOREIGN PATENT DOCUMENTS

| | | |
|---|---|---|
| KR | 101606860 B1 | 3/2016 |
| KR | 20180091359 A | 8/2018 |

* cited by examiner

VIDEO PERFORMANCE RENDERING MODIFICATION BASED ON DEVICE ROTATION METRIC

RELATED APPLICATIONS

This application claims the benefit of U.S. provisional patent application "Immersive Audio-Visual Experience" Ser. No. 62/929,584, filed Nov. 1, 2019.

This application is also a continuation-in-part of U.S. patent application "Immersive Video Experience Including Rotation" Ser. No. 16/865,985, filed May 4, 2020, which claims the benefit of U.S. provisional patent application "Immersive Audio-Visual Experience" Ser. No. 62/929,584, filed Nov. 1, 2019.

The U.S. patent application "Immersive Video Experience Including Rotation" Ser. No. 16/865,985, filed May 4, 2020 is also a continuation-in-part of U.S. patent application "Immersive Video Experience" Ser. No. 16/423,332, filed May 28, 2019, which claims the benefit of U.S. provisional patent application "Immersive Video Experience" Ser. No. 62/801,987, filed Feb. 6, 2019.

Each of the foregoing applications is hereby incorporated by reference in its entirety.

FIELD OF ART

This application relates generally to media stream playback and more particularly to a video performance rendering modification based on a device rotation metric.

BACKGROUND

Video has become a prominent medium around the world. Social media, texts, and even gas pumps can now include video content. No longer is broadcasting video reserved for only networks. Now people in general have access to technology for filming, editing, and publishing videos online. A simple smartphone can record content and then be used to post it online. Some people have their own channels, where they can promote their own brand, products, or social message, and so on. Video content has outpaced other forms of media, and it continues to grow for many reasons. Scientists say humans process video 60,000 times faster than text. Visual content condenses content, making presentations of information concise and rich. The saying "a picture is worth a thousand words" is true. Video also shows nonverbal communication such as body language and tone better than other media. Visual clues help audiences interpret the meaning of words more accurately than simply reading a text message would allow. Video can also include other media like photos or images, which help convey mood and make communication more effective. Video also engages audiences better than other media because it combines visuals and sounds. Internet users are more inclined to share quick and relatable videos than other media. Because video often uses personal interaction, it's more compelling than other mediums. And for most people, speaking about a topic is easier than writing about it. Video also allows easy and accessible connection with friends and family over the internet using common devices like a smartphone with a camera.

Video streaming over the internet includes diverse content. Product review videos are critically important to many consumers who will not make a purchase over the internet without first viewing one of these. These reviews allow customers to see how a product works and to hear feedback from other customers. How-to videos are also popular, and many channels center on this content exclusively. Vlogs, or video blogs, are another form of video content in which people routinely post short, personal videos. Beauty influencers use these extensively. Gaming videos are a niche category of video content, and many channels have sprung up around it. Comedy or skit videos are the most likely video format to go viral. Challenge videos are another category of internet video content that appeals to many viewers. People post a video accomplishing some task and invite others to try it and post about it as well. "Favorites" videos are often used by people with channels to post about their favorite items in a certain category, like books or cereals. It's a way for a person to share about themselves and influence others to purchase and pursue the same favorites. Education videos are for people who want to learn something new. There is no end to educational content available on the internet today. "Unboxing" videos are another form of video content, where people post videos of themselves opening the box of a new purchase for the first time. The video records their reaction to the new product.

Because more people are consuming more video content, more business and individuals are using video to communicate with customers and audiences. Marketers use video content in the form of presentations, testimonials, presentations, events, webinars, interviews or Q&A sessions, video emails, contests, personalized video, and more to connect with customers and sell products and services. Video content can be produced cheaply and easily or through big budget productions, but the key to using it effectively is to connect with the audience and provide them with a good experience.

SUMMARY

People view video content on electronic devices like desktop and laptop computers, tablets, smartphones, personal digital assistants (PDAs), and more. Video content can include movies, TV shows, live-feed videos, social media posts, and so on. Digital technology, including augmented reality, virtual reality, and mixed reality, allows people to interact with video content using electronic devices such as headsets, game consoles, and mobile devices. When interacting with video content, a person will move, tilt, or rotate the display screen, which alters the video content and creates an experience that "pulls the person into" an imaginary world, or an augmented version of the real world, by engaging the senses and shifting the perception of reality. Studies have shown that positive, engaging user experiences can create increased satisfaction and happiness, which can lead to sales, referrals, and customer loyalty. Conversely, a negative or even a neutral user experience can lead to lost revenue and no promotion, or worse, a bad reputation. The user experience can be negatively impacted by device and software limitations, poor image quality and poor transitions, a fixed video orientation that limits interaction, and video boundaries that leave portions of the screen video-content empty.

The video playback technology disclosed herein includes allowing a user to control video stream playback by rotating a handheld device and enables a video performance rendering modification based on a device rotation metric. One application includes viewing a video on a smartphone and rotating it to affect the video stream playback speed, which includes speeds in both forward and reverse modes, which could be considered a velocity in other fields of endeavor, but is not common usage in video playback. A clockwise rotation of the smartphone can increase playback speed. A counterclockwise rotation of the smartphone can decrease playback speed. Turning the smartphone by substantially 90 degrees counterclockwise can pause playback. Orienting the smartphone vertically can accomplish normal playback speed, where normal playback speed matches the speed at which the video was recorded.

A processor-implemented method for media stream playback is disclosed. A media stream is received from a server. The media stream is targeted for display on a handheld media stream playback device. An orientation of the handheld device is determined during playback of the media stream on the handheld device. A change in the orientation of the handheld device is detected. The change occurs during playback of the media stream. Based on detecting the change of orientation, a rotation angle of the handheld device is calculated. Based on the rotation angle, the playback speed of the media stream on the handheld device is changed. The changing the playback speed comprises changing speed at which the media stream is rendered on the handheld device, which also changes a number of frames per second that a video is rendered on the handheld device. Rotating the handheld device in a clockwise direction increases the playback speed. Rotating the handheld device in a counterclockwise direction decreases the playback speed. Rotating the handheld device counterclockwise substantially by 90 degrees pauses playback. When the handheld device has a display screen in a substantially vertical orientation, normal playback speed rendering is accomplished. Normal playback speed matches a speed at which the media stream was recorded.

A processor-implemented method for media stream playback is disclosed comprising: receiving a media stream from a server, wherein the media stream is targeted for display on a handheld media stream playback device; determining an orientation of the handheld device during playback of the media stream on the handheld device; detecting a change in the orientation of the handheld device, wherein the change occurs during playback of the media stream; calculating a rotation angle of the handheld device, based on the detecting; and changing playback speed of the media stream on the handheld device, based on the rotation angle.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
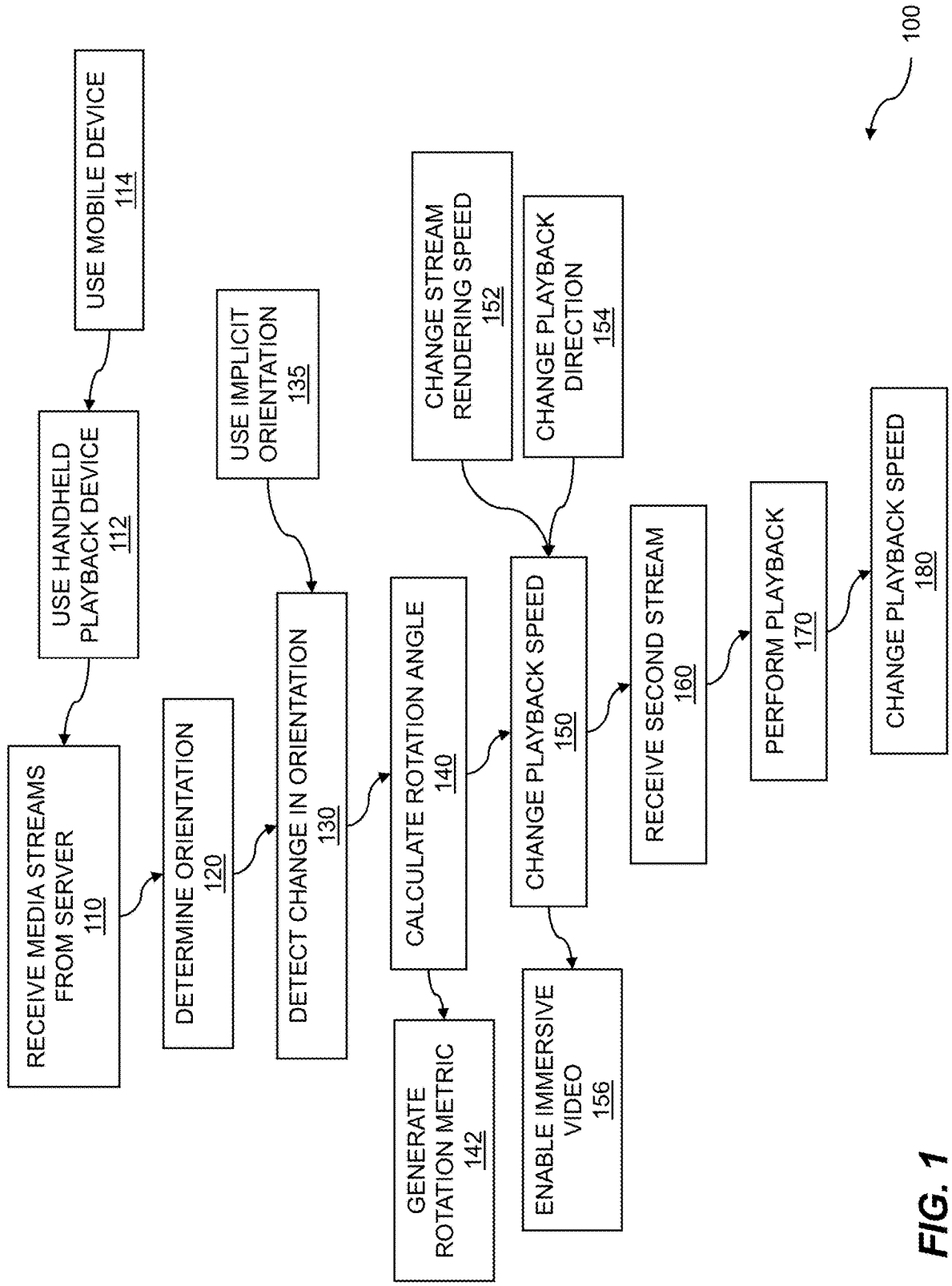
FIG. 1 is a flow diagram for video performance rendering modification based on device rotation metric.

Individuals love to view and interact with a wide variety of media content. The content, which is often delivered as video and audio streams, can include educational, informational, political, social, diverting, and other media content. To access the content, the individuals use handheld electronic devices such as tablets, smartphones, PDAs, and media players. The content can be easily accessed using apps installed on the handheld devices or on specialty media players, using web browsers, and so on. The media content covers a wide range of subjects that range from news, government information, and educational material, to entertainment content, and beyond. Of all the content that is available online for free or by payment, the content most frequently sought after by the individuals includes video content. The video content can include videos or long-form videos, video clips, short-form videos, graphic interchange format files (GIFs), animations, mashups, and other content. This content can further include audio and text content which are used to enhance the video viewing experience. An individual viewing the media content can react to the content and may choose to respond to it. The responses can include commenting on or reacting to the content. The responses are often posted on a site that provides the media content, shared on a social media site, discussed with friends, and so on.

The fact that the available content is static is one of the major limitations to an individual's enjoying the content. The content is designed to be viewed and experienced in a particular way that is defined by the media creator. While a user may have limited playback control by choosing to change settings associated with the content, such as selecting an audio language, viewing or hiding subtitles, or setting an aspect ratio or video resolution for viewing, the settings are adjusted based on various menu selections. These menu settings are "set and forget" settings, where once configured, the settings remain static until the user decides to return to the menus to make adjustments. In techniques disclosed herein, playback of the media stream rendered on the handheld device can be changed by rotating the device. The rotation, which can include a clockwise rotation, a counter-clockwise rotation, a tilting, and so on, can effect changes to the ways the video and audio streams are presented on the handheld device. By rotating the handheld device, the user changes the manner in which media streams are displayed. The rotating the handheld device can be used to change playback speed of the media stream for display on the handheld device. The rotating the handheld device can further be used to change the direction of the playback of the media stream. The rotating can be used to access other information associated with the media streams, such as exposing or hiding captions, providing song lyrics, adding voices of people or sounds of instruments, and so on. Through rotation of the handheld device, a user has significantly more control over the manner in which the media stream is presented. Further, the changes made to the playback by the rotating enable the individual to enjoy an immersive video and audio experience. The immersive experience enables virtual reality and augmented reality viewing of the media streams.

Techniques for video performance rendering modification based on a device rotation metric are disclosed. An individual can use a handheld device such as a mobile device to experience a media stream that includes a video stream and audio streams. The media stream can include a video stream and one or more associated audio streams. The media stream that is rendered on a handheld device can be consumed for personal use or amusement, for social sharing, for education or training, for making political statements, for presenting a call to action, and so on. The media stream can be one of many available media streams. The media streams can be generated by a range of individuals; purchased by consumers; or created by creatives, influencers, tastemakers, trendsetters, politicians, and others. The media streams can include travel videos, cooking videos, home improvement videos, makeup videos, animal videos, music videos, etc. As the individual rotates the handheld device used to experience the media stream, the playback and rendering of the media streams can be changed. The changing can include increasing speed, decreasing playback speed, or pausing playback. The changing can include changing playback direction, where playback direction can include forward or backward playback. The changing can include rendering two media streams for presentation or presenting a single media stream. The rotating of the device can further affect zooming into a video stream or zooming out of the video stream. The rotating can be used to present or hide further information such as captions associated with the media steams. The rotating can also be used to add audio streams to create multi-dimensional audio space that can be experienced by the user. The modifying the rendering of the audio streams and the video streams on the handheld device creates an immersive experience, such as a virtual reality or an augmented reality experience, for the user.

Media stream playback is enabled using video performance rendering modification based on a device rotation metric. A media stream is received from a server, where the media stream can include a video stream, one or more audio streams, captions, and so on. The one or more audio streams can include voice, music, sound effects, and the like. The video stream can include a long-form video, a short-form video, a video clip, a montage of video clips, a series of still images, and so on. The media stream is targeted for display on a handheld media stream playback device. The handheld media stream playback device can include a mobile device such as a smartphone or tablet. The media stream can be based on various resolutions, formats, codecs, etc. that are appropriate for rendering on the handheld device. An orientation of the handheld device is determined during playback of the media stream on the handheld device. The orientation of the handheld device can include vertical, horizontal, an angle between vertical and horizontal, tilted, rotated, and the like. A change of the orientation of the handheld device is detected, wherein the change occurs during playback of the media stream. As the media stream is being played back, a user can rotate her handheld device. The rotating the handheld device can be used to control the playback speed and playback direction. A rotation angle of the handheld device is calculated, based on the detecting. The rotation angle can be calculated based on a coordinate system. The playback of the media stream is changed on the handheld device, based on the rotation angle. The changing the playback can include combining videos, zooming, receiving captions, adding audio, and filling video.

It should be noted that the terminology regarding the orientation of a handheld device is largely dependent on the how the user of the device perceives his or her usage of that device. For example, many users holding a rectangular smart phone in front of them would describe it as being in a "vertical" orientation when the longer axis of the rectangular shape of the smart phone is up and down, and they would likewise describe it as being in a "horizontal" orientation when the longer axis of the rectangular shape is side-to-side. This perception aligns with the common nomenclature of a portrait orientation (vertical) and a landscape orientation (horizontal). However, depending on the device and the user, that designation may be reversed or even somewhat arbitrary. One obviously unclear case for the nomenclature is for the orientation of a round or square device (or round or square viewport). Another unclear case is for a device normally used in a different orientation, for example a laptop or perhaps even a "phablet". Thus referring to a "starting orientation" or an "original orientation" or an "initial orientation" or a "default orientation" and then looking for a subsequent change in orientation can be a helpful way to interpret handheld device orientation.

The media stream playback technology disclosed herein is very different from, for example, watching a television screen with a remote control in hand to "click" to change the rendering. Rather, the media stream playback technology disclosed herein provides an immersive video viewing experience for videos recorded by generic mobile devices and delivers a smooth video rendering even when the viewer is rotating, moving, and tilting the viewing device as part of the interaction. Specifically, a good/smooth viewing experience may include that:
   (a) The video stays in bound: the user cannot see outside the video, which results in an undesirable partial black screen;
   (b) The user can zoom in only when necessary: to enable the user to view as much part of the video as possible;
   (c) The view is stable: dramatic movement or scaling on rotating or tilting is avoided;

(d) The view is smart: when only a partial view of the video is visible, the significant part is shown, if possible; and (e) Video quality is ensured in every angle.

To provide the immersive experience, a geometric-based system is designed in order to achieve one or more of the above results. An implementation of the video playback technology disclosed herein obtains various parameters of the video including the following:

(1) Size of video (width and height, defined in pixels);
(2) Size of viewport (width and height, defined in pixels);
(3) θ, the rotating angle of viewport; and
(4) a, the scale factor.

FIG. 1 is a flow diagram for video performance rendering modification based on device rotation metric. A media stream is received from a server. The media stream can be selected, combined, augmented, modified, and so on, based on an orientation and rotation of a handheld device. The media stream is targeted for display on a handheld media stream playback device. The handheld media stream playback device can include a mobile device such as a smartphone, tablet, or PDA. The media stream includes a video stream and one or more audio steams. The video stream can include various media types such as news videos, entertainment videos, political message videos, cooking videos, animal videos, and so on. The audio streams can include single, monaural streams; paired binaural or stereo streams; second audio program (SAP) streams; and so on. An orientation of the handheld device is determined, where the orientation can include upright or lying down, tilted, rotated, and the like. A change in device orientation is detected, and a rotation angle is calculated. The playback on the handheld device of the media stream is changed, based on the rotation angle.

Media streams can include video streams, audio streams, text streams, and the like. The media streams can be used to display presentations to a user of a handheld device discussed below. The media streams can be used to convey a message, to provide entertainment, to educate, to inform, etc. The flow 100 includes receiving a media stream 110 from a server. Discussed throughout, a media stream can include a video stream, one or more audio streams, text streams, and the like. The media stream can include a long-form video, a short-form video, a GIF, an animation, etc. The media stream can further include one or more audio streams where the one or more audio streams can include audio associated with the video stream. In embodiments, the media stream can include a single video channel and a single audio channel. The single audio channel can enable monaural audio associated with the video channel. In other embodiments, the media stream can include a single video channel and a pair of audio channels. The pair of audio channels can enable binaural or stereo audio associated with the video stream. The pair of audio channels can further enable encoded audio such as 5.1 Surround Sound™, Atmos™, and the like. In the flow 100, the media stream is targeted for display on a handheld media stream playback device 112. The handheld media stream playback device can include a personal electronic device owned by or used by an individual. The flow 100 includes using a mobile device 114. The mobile device can include a wirelessly enabled handheld device such as a smartphone, a tablet, a personal digital assistant (PDA), and the like. The mobile device can include a purpose-built mobile device such as a media player device. A media player device can include video processing, audio processing, and other hardware or software that enhances the experience of the user while consuming the media stream.

The flow 100 includes determining an orientation 120 of the handheld device during playback of the media stream on the handheld device. The orientation of the handheld device can be determined within a three-dimensional space. The handheld device can be lying display up on a table, held by a user, and so on. The handheld device can be oriented in a substantially vertical orientation (e.g. 90 degrees), a substantially horizontal orientation (e.g. 0 degrees), or at an angle between vertical and horizontal. The handheld display can be tipped forward or backward. The orientation of the handheld device can include an elevation above a surface such as a desk, a floor, the ground, and the like. The orientation of the handheld device can be determined using rectangular coordinates, cylindrical coordinates, spherical coordinates, etc. The orientation of the device can be determined in degrees, radians, etc. The orientation of the handheld device can be determined using motion sensors included in the handheld device (discussed below). The orientation of the handheld device can be determined using implicit orientation 135. Along with position of the handheld device, the implicit orientation of the device can be used to determine object pose. The pose of the handheld device can be determined based on an image of the user holding the handheld device.

The flow 100 includes detecting a change of the orientation 130 of the handheld device, where the change occurs during playback of the media stream. A change of orientation of the handheld device can include a user picking up the device; tilting the top edge of device away from or toward the user; pushing the side edge of the device away from or toward the user, and so on. The detecting a change in the orientation of the handheld device can include rotating the device clockwise or counterclockwise. The change in orientation of the handheld device can include a combination of pushing, tilting, rotating, and so on. The change in orientation can be based on pitch, roll, and yaw. The detecting a change in orientation can include detecting a change from a substantially vertical orientation of the handheld device to a substantially horizontal orientation, or vice versa. The flow 100 includes calculating a rotation angle 140 of the handheld device, based on the detecting. The rotation angle can be determined based on rotation within a 3D space, where the 3D space can be described using a coordinate system. For example, the rotation angle can be determined based on x, y, and z coordinates. Using x, y, z coordinates, the rotation angle can be determined based on rotation about the z-axis such as pushing the side edge of the display away from or toward the user; about the x-axis such as rotation clockwise or counterclockwise; about the y-axis such as tilting the top edge of the display away from or toward the user; etc. The angle of rotation can include rotations about multiple axes. In embodiments, the calculating the rotation angle can be based on one or more motion sensors included in the handheld device. The motion sensors can detect position, rotation, acceleration, displacement, and so on. In embodiments, the motion sensors comprise a gyroscope, an accelerometer, a gravity sensor, or a magnetic field sensor within the handheld device. In the flow 100, the rotation angle is used to generate a rotation metric 142. The rotation metric can include a quality of the rotation such as the orientation of a handheld device being vertical, or the orientation of the handheld device being horizontal. The rotation metric can include an amount of change of a rotation angle such as a small change, a medium change, a large change, and the like. The rotation metric can be applied to a variety of calculations and renderings associated with the one or more media streams. In embodiments, the rotation metric can impact zoom calculations and renderings (discussed below) of the playback.

The flow 100 includes changing playback speed 150 of the media stream on the handheld device, based on the rotation angle. The changing the playback speed can include speeding up playback, slowing down playback, pausing or stopping playback, and so on. In embodiments, the changing the playback speed can include playing back the media stream using more than one playback speed. In a usage example, playback can include normal playback, a period of slow-motion playback, a return to normal playback, and so on. In the flow 100, the changing the playback speed can include changing speed at which the media stream is rendered on the handheld device. Recall that a media stream such as a video stream can be comprised of video frames. The resolution of the video stream is based on the number of frames of the video stream that can be rendered on the display of the handheld device within a period of time. In embodiments, the changing the playback speed can change the stream rendering speed 152, which can include changing a number of frames per second (fps) that a video is rendered on the handheld device. For a given number of frames associated with a video stream, rendering fewer frames per second can require an increased amount of time to render the full number of video frames while rendering more frames per second can require a decreased amount of time.

The changing playback speed can be accomplished using a variety of techniques such touching the screen, swiping the screen, making a menu selection, and so on. The playback speed can include a "normal" playback speed when the handheld device is held in a starting position. In embodiments, normal playback speed rendering can be accomplished when the handheld device has a display screen in a substantially vertical orientation. Normal playback speed can be accomplished by starting a media stream on a handheld device held at an orientation other than horizontal. In embodiments, the normal playback speed can match a speed at which the media stream was recorded, produced, created, and so on. In embodiments, the changing the playback speed can increase the playback speed by rotating the handheld device in a clockwise direction. The amount of increase of the playback speed can be related to the amount of rotation of the handheld device. In other embodiments, the changing the playback speed can decrease the playback speed by rotating the handheld device in a counterclockwise direction. Discussed throughout, the changing the playback speed can also include pausing or stopping playback. In embodiments, the changing the playback speed can pause playback by rotating the handheld device counterclockwise substantially by 90 degrees. The substantially 90 degree counterclockwise rotation can include 90 degrees relative to a give orientation of the handheld device.

The amount of change of the playback speed can be determined based on a function. In embodiments, the changing the playback speed can be a linear function of the rotation angle. The linear function can enable a proportional speed change based on a proportional angle change. In a usage example, a user can speed up playback of a media stream 25 percent by rotating her handheld device 25 percent; increase playback speed 50 percent by rotating her device 50 percent; and so on. Other functions can be used for changing playback speed. In embodiments, the changing the playback speed can be a nonlinear function of the rotation angle. A nonlinear or non-proportional function can be used to bias an amount of speed change based on an amount of rotation. In a usage example, large changes in rotation angle from the starting orientation of the handheld device can effect fine or small speed changes, while small change of rotation angle near 90 degrees can effect large speed changes. The nonlinear function can bias or make it easier to accomplish small speed changes relative to normal playback speed while also enabling rapid or fast forward speeds when so desired.

In the flow 100, the changing the playback speed includes changing direction 154 of playback rendering based on the rotation angle of the handheld device. The changing playback direction can include a forward direction, a reverse direction, a zero direction such as paused or stopped, and the like. In embodiments, the changing direction can provide forward playback by rotating the handheld device in a clockwise direction from an initial orientation. Rotating the handheld device in the clockwise direction can also accomplish changing playback speed. In other embodiments, the playback speed can increase to provide faster forward playback as the rotation angle increases in the clockwise direction. In a usage example, the user rotating her handheld device clockwise can cause forward playback. Further rotation of the handheld device can increase the speed of playback. In embodiments, the playback speed can increase to provide faster forward playback. As the rotation angle increases in the clockwise direction, the playback speed increases to provide faster forward playback. Alternatively, the playback speed at an initial or default orientation can be zero, or paused, for example if a video is queued up but the "autoplay" function is not enabled. In this case, a rotation from an initial orientation can enable starting playback in a forward or reverse direction, depending on the direction and amount of device rotation. Thus the playback speed of the media stream is paused at an initial orientation and changes based on the rotation angle.

The changing the playback speed and the playback direction of the media is accomplished relative to an initial or original position of the handheld device. In embodiments, an initial orientation for the handheld device can have a display screen in a substantially vertical or 90 degree orientation. The substantially vertical orientation can be used to determine how a media stream can be rendered on the device. The rendering can include a portrait rendering where the portrait rendering can be accomplished using a frame, viewport, etc. In other embodiments, an initial orientation for the handheld device can have a display screen in a substantially horizontal or 0 degree orientation. The original orientation can be chosen by a user of a handheld device such as a mobile device. The original orientation can also be the "natural" orientation of the mobile device. In a usage example, the original orientation of a smartphone can be a substantially vertical orientation, while the original orientation of a tablet can be a substantially horizontal orientation. Whichever original orientation is used for the handheld device, in embodiments, playback speed can increase as the rotation angle deviates further from the initial orientation. Recall that changing playback speed of a media stream can also include pausing the media stream. The pausing can be accomplished by rotating the device. In embodiments, the changing the playback speed can pause playback by rotating the handheld device to show a display screen in a substantially vertical orientation. Such a rotation can be used for a handheld device originally in a substantially horizontal orientation. In other embodiments, the changing the playback speed can pause playback by rotating the handheld device to show a display screen in a substantially horizontal orientation. This latter rotation can be used for a handheld device originally in a vertical orientation.

Recall that changing playback speed can be based on a function. The function can include a linear function or a nonlinear function. The changing playback speed can also be accomplished using a lookup table, a translation table, etc. The particular function can be chosen based on a desired playback speed change profile. The playback speed change profile can be linear, biased, weighted, nonlinear, and the like. In embodiments, the playback speed is changed linearly based on the rotation angle. Discussed above and throughout, rotation can include rotating the handheld device between vertical (90 degrees) and horizontal (0 degrees). A 5 percent rotation can result in a 5 percent speed change, a 10 percent rotation in a 10 percent change, etc. In other embodiments, the playback speed can be changed nonlinearly based on the rotation angle. The changing playback speed can be used to enhance an experience of a user with the media stream. In the flow 100, the changing the playback enables an immersive video 156 experience. Immersive video can enable a user to "enter" the video in the sense that the user can travel into and move around within the video; look up, down, left, or right within the video; and so on. In embodiments, the immersive video experience can enable virtual reality (VR), augmented reality (AR), mixed reality (MR), etc., viewing.

The flow 100 further includes receiving a second media stream 160. The second media stream can include a video stream, one or more audio streams, and so on. The second media stream can be received from the server from which the first media stream was received. The second media stream can be received from a library, provided by a user, crowdsourced from a plurality of users, and the like. As for the media stream, the second media stream can include a video stream, one or more audio streams, text streams, and the like. The media stream can include a long-form video, a short-form video, a GIF, an animation, etc. The media stream can further include one or more audio streams where the one or more audio streams can include audio associated with the video stream. The flow 100 includes performing playback 170 of the media stream and the second media stream. The playback of the media stream and the second media stream can be rendered based on an orientation of the handheld device. In a usage example, performing playback of the media stream and the second media stream on a handheld device in a substantially vertical orientation can include rendering the streams one above the other in the viewport, rendering the streams using a "picture in picture" technique, and the like. In another usage example, performing playback of the media stream and the second media stream on a handheld device in a substantially horizontal orientation can include rendering the stream one next to the other in the view port. The flow 100 includes changing the playback speed 180 of the media stream and the second media stream on the handheld device, based on the rotation angle. The playback speed of the media stream and the playback speed of the second media stream can be changed by the same amount or by different amounts. The playback speeds of the media stream and the second media stream can be changed based on any of the techniques discussed above and throughout.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
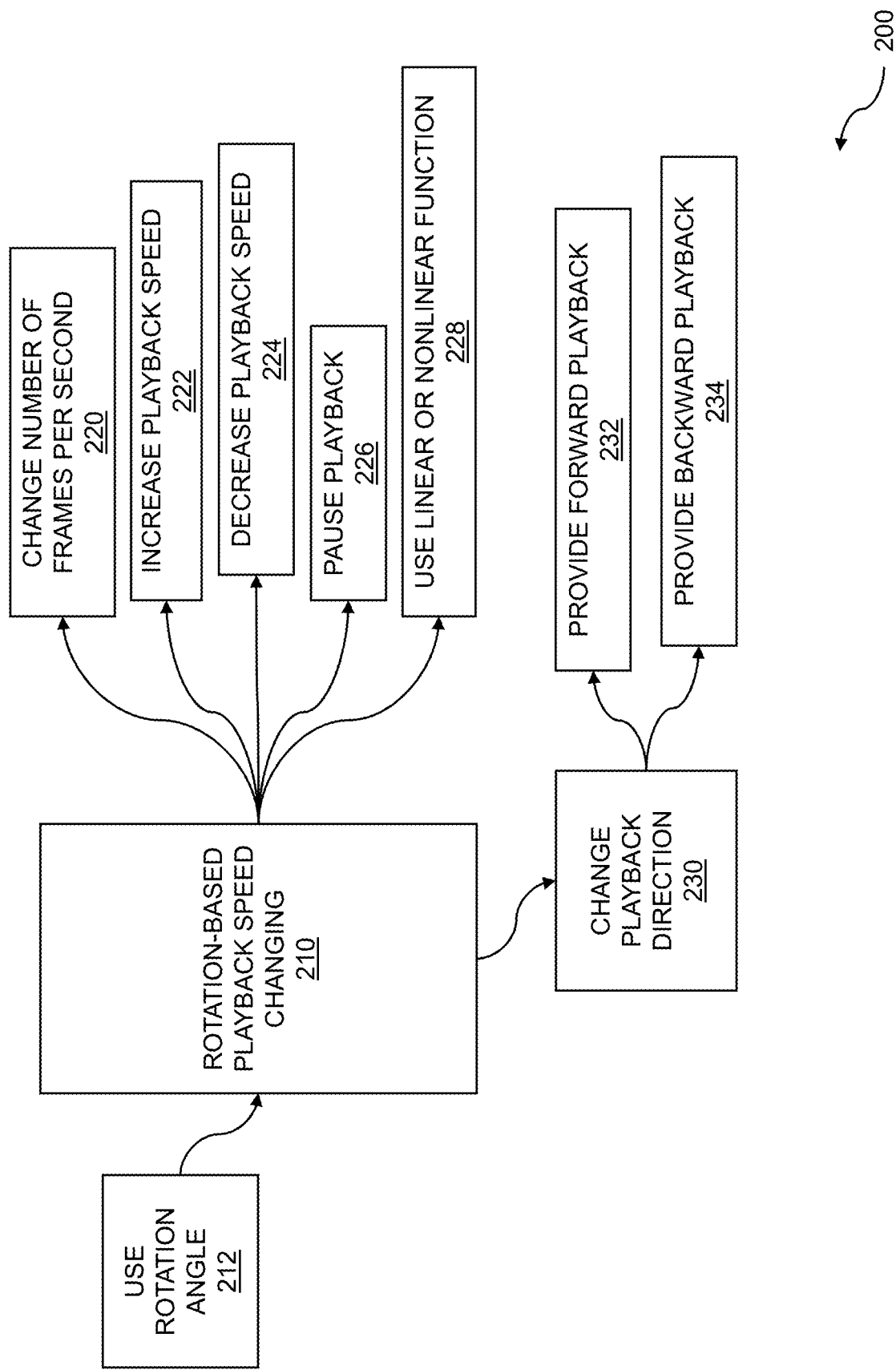
FIG. 2 is a flow diagram for orientation-based changing.

FIG. 2 is a flow diagram for orientation-based playback changing. A media stream can be rendered on a handheld device used for media stream playback. The media stream can include a video stream and one or more audio streams. The playback speed and playback direction of the media stream can be changed based on an orientation of the handheld device. The orientation of the handheld device can include a substantially vertical orientation, a substantially horizontal orientation, or an orientation at an angle between vertical (90 degrees) and horizontal (0 degrees). The orientation of the handheld device can be determined based on roll, pitch, and yaw of the device. The orientation of the handheld device can be changed by rotating the device, tilting the device, and so on. Orientation-based playback changing enables video performance rendering modification based on device rotation metric. A media stream is received from a server, where the media stream is targeted for display on a handheld media stream playback device. An orientation of the handheld device is determined during playback of the media stream on the handheld device. A change of the orientation of the handheld device is detected, where the change occurs during playback of the media stream. A rotation angle of the handheld device is calculated, based on the detecting. The playback of the media stream is changed on the handheld device, based on the rotation angle.

The flow 200 includes changing the playback speed 210 of the media stream on the handheld device. The playback speed can be increased, decreased, paused, etc. The playback speed can also include a direction such as a forward direction or a backward direction (discussed elsewhere). The flow 200 includes using the rotation angle 212. The changing the rotation angle can include an amount of rotation, a speed of rotation, a direction of rotation, and so on. The changing can be based on a threshold, a value, a range of values, a qualification, preferences of an individual, and the like. The media stream that is played back can include a media stream from a subset of media streams, where the subset of media streams can be selected by a user; recommended based on a view count, an engagement score, or analysis of the video; etc. In embodiments, changing the playback speed includes changing speed at which the media stream is rendered on the handheld device, based on the rotation angle. The changing the playback speed can include increasing speed, decreasing speed, pausing, stopping, etc. In the flow 200, the changing the playback speed can include changing a number of frames per second 220 that a video is rendered on the handheld device. A media stream such as a video stream can be based on a resolution, where the resolution can include a number of frames per second (fps). Decreasing the fps of the media stream can increase playback speed, while increase the fps can decrease the playback speed. As a side effect, the reducing the fps can reduce the resolution of the media stream, while increasing the fps can increase media stream resolution. The rotation angle of the handheld device can be determined based on an original orientation of the device. The original orientation of the handheld device can include a substantially vertical orientation, a substantially horizontal orientation, an orientation at an angle between 0 degrees and 90 degrees, etc.

In the flow 200, the changing the playback speed can increase the playback speed 222 by rotating the handheld device in a clockwise direction. As a user is experiencing a media stream as it is being played back on a handheld device, she can rotate the device in a clockwise direction to increase the playback speed. A slight rotation can increase the playback speed by a small amount, while a larger rotation can increase the playback speed by a greater amount. The increase in speed of playback can further be controlled by a rate of rotation of the handheld device. In the flow 200, the changing the playback speed can decrease the playback speed 224 by rotating the handheld device in a counterclockwise direction. Similar to controlling increasing speed, decreasing speed can be controlled by rotating the handheld device a small amount for a small decrease in speed, a larger amount for a larger decrease in speed, and the like. The decrease in speed of playback can also be controlled by a rate of rotation of the handheld device. A fast-counterclockwise rotation of the handheld device can effect a rapid change in playback speed while a slow counterclockwise rotation can effect a slow change in speed. In the flow 200, the changing the playback speed can pause playback 226 by rotating the handheld device counterclockwise substantially by 90 degrees. The rotating 90 degrees can be relative to the angle of the handheld device when the user chose to pause playback. In a usage example, a user can be viewing a media stream rendered on her handheld device. The user may be increasing or decreasing speed, viewing the media stream at normal playback speed, and so on. By rotating the handheld device counterclockwise 90 degrees from the angle at which the user was viewing the media stream, the media stream can be paused.

In the flow 200, the changing the playback speed can be a linear function 228 of the rotation angle. In a usage example, consider that a handheld device held horizontally can play a media stream at normal speed, while the handheld device rotated 90 degrees to a vertical orientation can play the media stream at maximum speed. Rotating the handheld device 25 percent or 22.5 degrees plays the media stream at 25 percent of maximum; the device rotated to 50 percent or 45 degrees plays the media stream at 50 percent of maximum, and so on. In other embodiments, the changing the playback speed can be a nonlinear function of the rotation angle. In a usage example, a function can be chosen such that rotation of the handheld device between 0 degrees and 45 degrees has little effect on playback speed, while rotating the handheld device between 45 degrees and 90 degrees has a larger effect on playback speed. The nonlinear function can enable finer adjustment of playback speed.

In the flow 200, the changing the playback speed comprises changing direction 230 of playback rendering based on the rotation angle of the handheld device. The changing the direction of playback can enable scanning through or fast forwarding through portions of the video stream, rewinding through portions of the video stream, and the like. In the flow 100, the changing direction provides forward playback 232 by rotating the handheld device in a clockwise direction from an initial orientation. The playback of the media stream can include forward playback at a normal viewing speed. The forward playback can include a frame by frame or a slow motion ("slo-mo") playback, fast playback, and the like. In embodiments, the playback speed can increase to provide faster forward playback as the rotation angle increases in the clockwise direction. In the flow 200, the changing direction provides backward playback 234 by rotating the handheld device in a counterclockwise direction from an initial orientation. The backward playback can include a frame by frame or a slow motion (slo-mo) backward playback, fast backward playback, and so on. In embodiments, the changing the playback speed and/or directions can enable an immersive video experience. The immersive video experience can enable a user to "move around" within the media stream. Moving around can be accomplished by zooming in and zooming out; panning in directions such as up, down, left, and right; etc. In embodiments, the immersive video experience can enable virtual reality, augmented reality, and mixed reality viewing.

Figure 3:
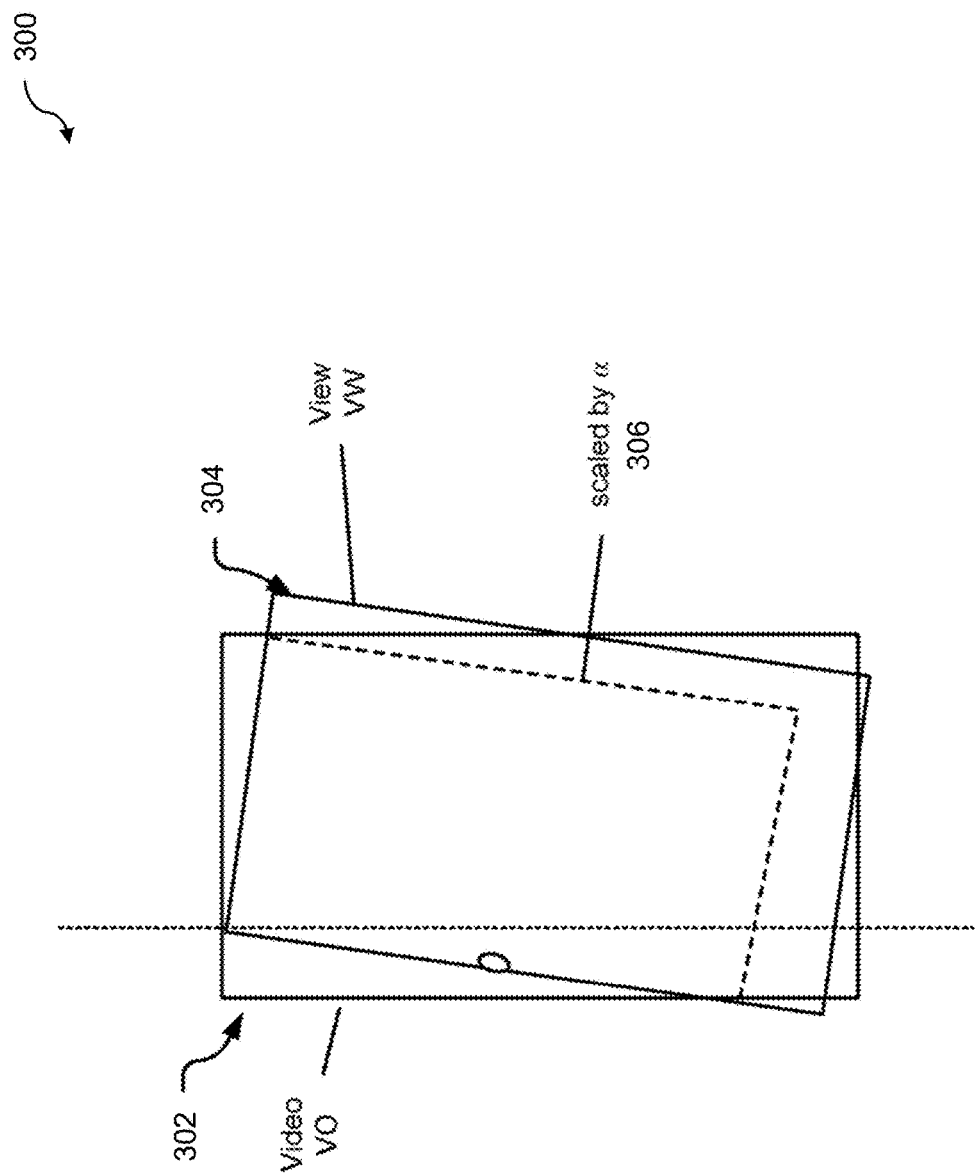
FIG. 3 illustrates an example configuration of a viewing system disclosed herein as transformed into a geometric problem.

FIG. 3 illustrates an example configuration of a viewing system disclosed herein as transformed into a geometric problem. The transforming the configuration of the viewing system into a geometric problem can enable video performance rendering modification based on device rotation metric. As a user rotates an electronic device, such as a smartphone, tablet, etc., the view of the video can also rotate. If the video is to remain visible on the display, the rotated video can be scaled so that the video can still be viewed. The transforming of the viewing system into a geometric problem 300 is illustrated in FIG. 3. The video is represented by a rectangle VO 302, and the view of the video is represented by another rectangle VW 304. The rectangle VW can be rotated by an angle θ. Note that the rotated video represented by 304 does not fully overlap the rectangle 302. Thus, the video must be scaled (here, reduced in size) in order to be fully visible within rectangle 302. In the figure, the video can be scaled by a. The scaled video can be placed into VO 306. The video and view can both be standard portrait with 720p (720×1280).

Figure 4:
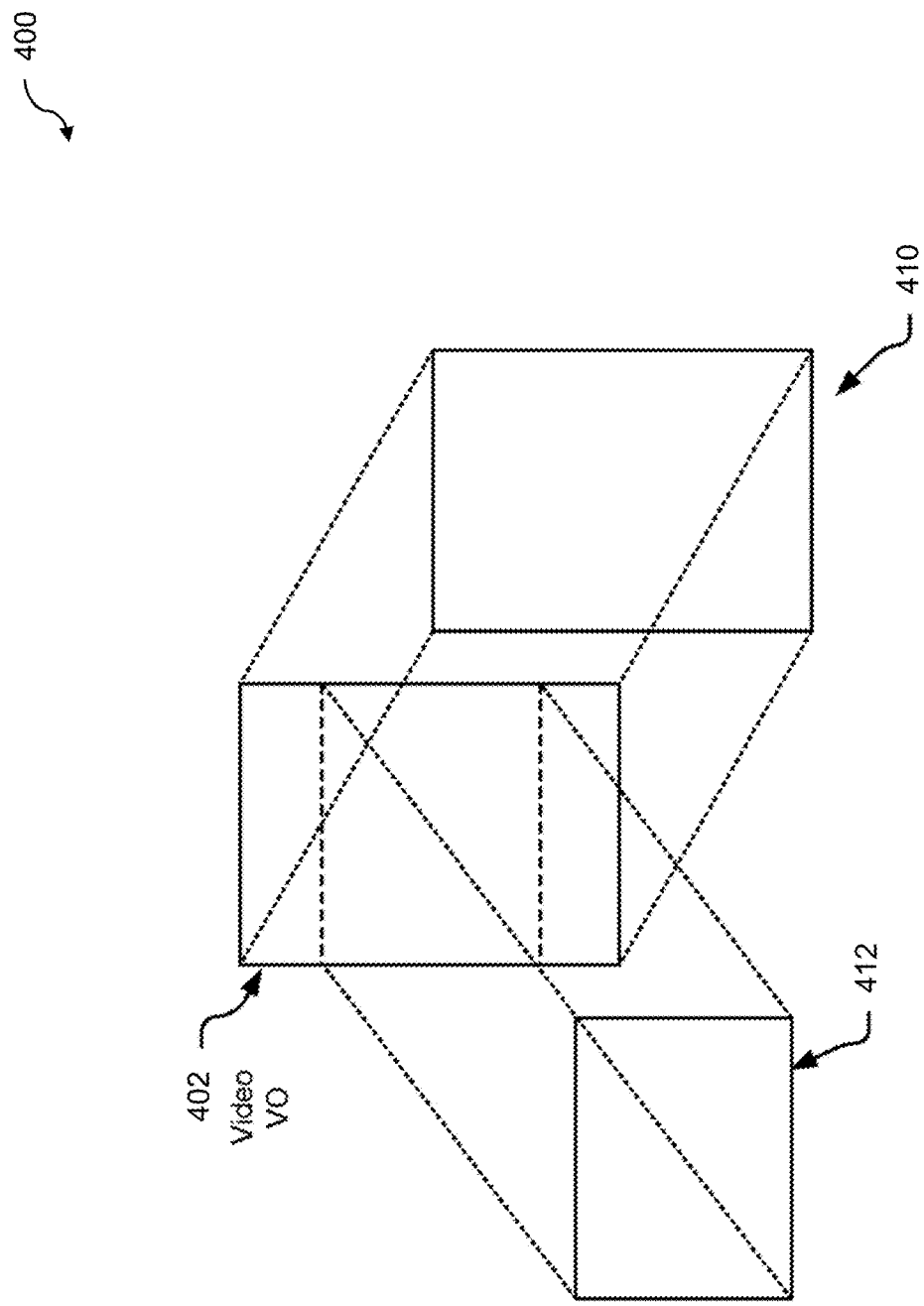
FIG. 4 illustrates an example viewport with the viewport in landscape and portrait modes.

FIG. 4 illustrates an example viewport with the viewport in landscape and portrait modes. A viewport can enhance video performance rendering modification based on device rotation metric. FIG. 4 illustrates a viewport 400. A viewport can be oriented in an upright or portrait position. If the viewport is in upright portrait position 410, then no scaling of the video is necessary, and the system can display the original video 402. If the viewport is in a horizontal or landscape position 412, then the video can be scaled. The scaling of the video can include scaling from a (1280×720) to a (720×405) representation in order to fit it in the video into the viewport. The scaling of the video can result in a viewing area that is 31.6% of the original video. A scale of 77.8% can be required to ensure that the viewport remains in bounds of the video. With regard to a zoom factor, dramatic movement within or scaling of the video should be avoided to ensure a smooth viewing experience when the viewer rotates the viewport. Assuming that the maximal and minimal scale is obtained by scanning through all viewing angles for the video, the zoom factor can be defined as the ratio between maximal scale and minimal scale:

$$\text{Zoom Factor} = \text{Maximal Scale}/\text{Minimal Scale}$$

Figure 5:
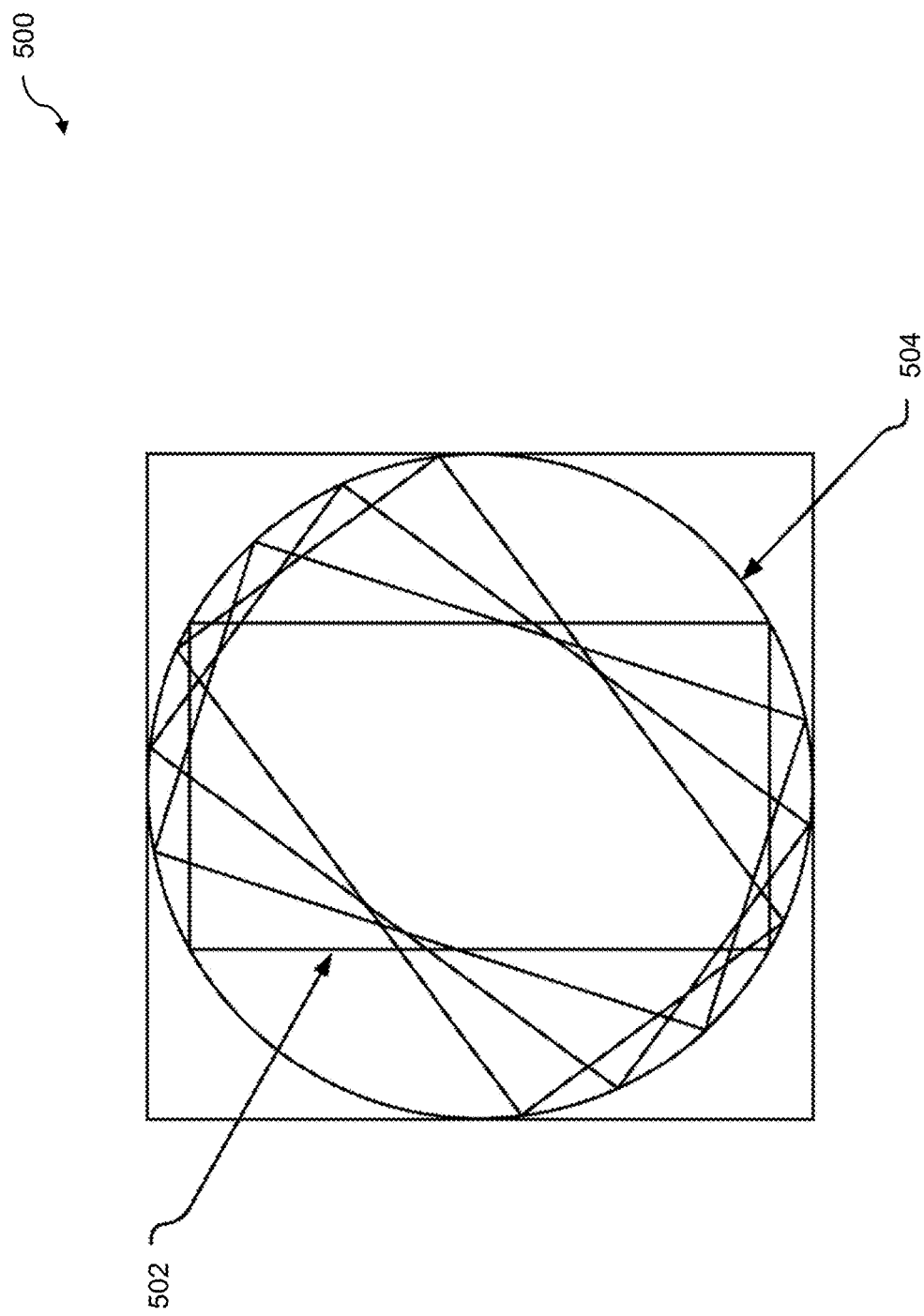
FIG. 5 illustrates an example fixed-orientation video viewing experience by fitting a viewport into an inscribed circle.

FIG. 5 illustrates an example fixed-orientation video viewing experience by fitting a viewport into an inscribed circle. Fitting the viewport into the inscribed circle can enable a video performance rendering modification based on a device rotation metric. The fixed-orientation video viewing experience 500 is accomplished by fitting a viewport 502 into an inscribed circle 504 using circle-based rotation. Here, a further boundary condition can be considered. Assuming that the video rectangle VO (discussed previously) is a square, an inscribed circle can be created, and the view rectangle VW (discussed previously) can be scaled in order to fit into the circle. That is, VW becomes an inscribed rectangle to the circle. Note that no scaling is necessary when the system rotates the rectangle within a circle, resulting in a fixed scale, and the zoom factor is equal to 1. That is, when a square video is recorded, the fixed-orientation video viewing experience can be easily achieved by fitting the viewport into an inscribed circle. Given a non-square video, the video can be trimmed into a square video. However, significant parts of the video may be cropped out as a result of trimming.

Figure 6:
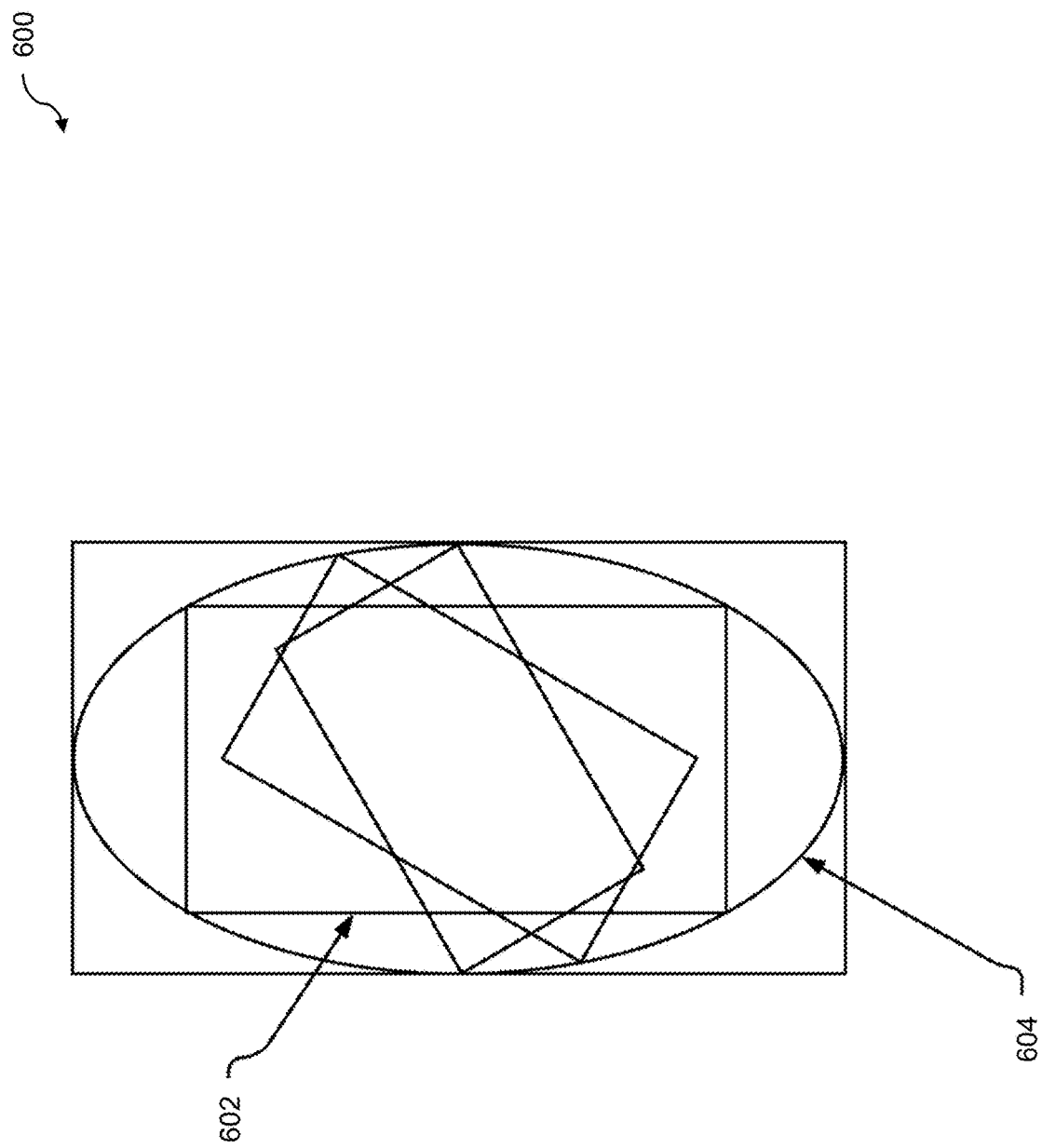
FIG. 6 illustrates an example inscribing of a rectangle-sized video into an oval.

FIG. 6 illustrates an example 600 inscribing of a rectangle sized video 602 into an oval 604. Inscribing the rectangular video into the oval can enable video performance rendering modification based on device rotation metric. In this oval-based rotation, instead of cropping the wide side of the rectangle and rotating on the circle, the inscribed oval 604 of the video rectangle VO (discussed previously) can be created. It may no longer be possible to find an inscribed rectangle to the oval at all angles, since not all vertices can stay on the oval. However, the system can still fit the rectangle sized video 602 on the oval 604, which can be inscribed into the oval 604 in a vertical or horizontal orientation and can have at most two vertices on the oval 604 on other angles.

Figure 7:
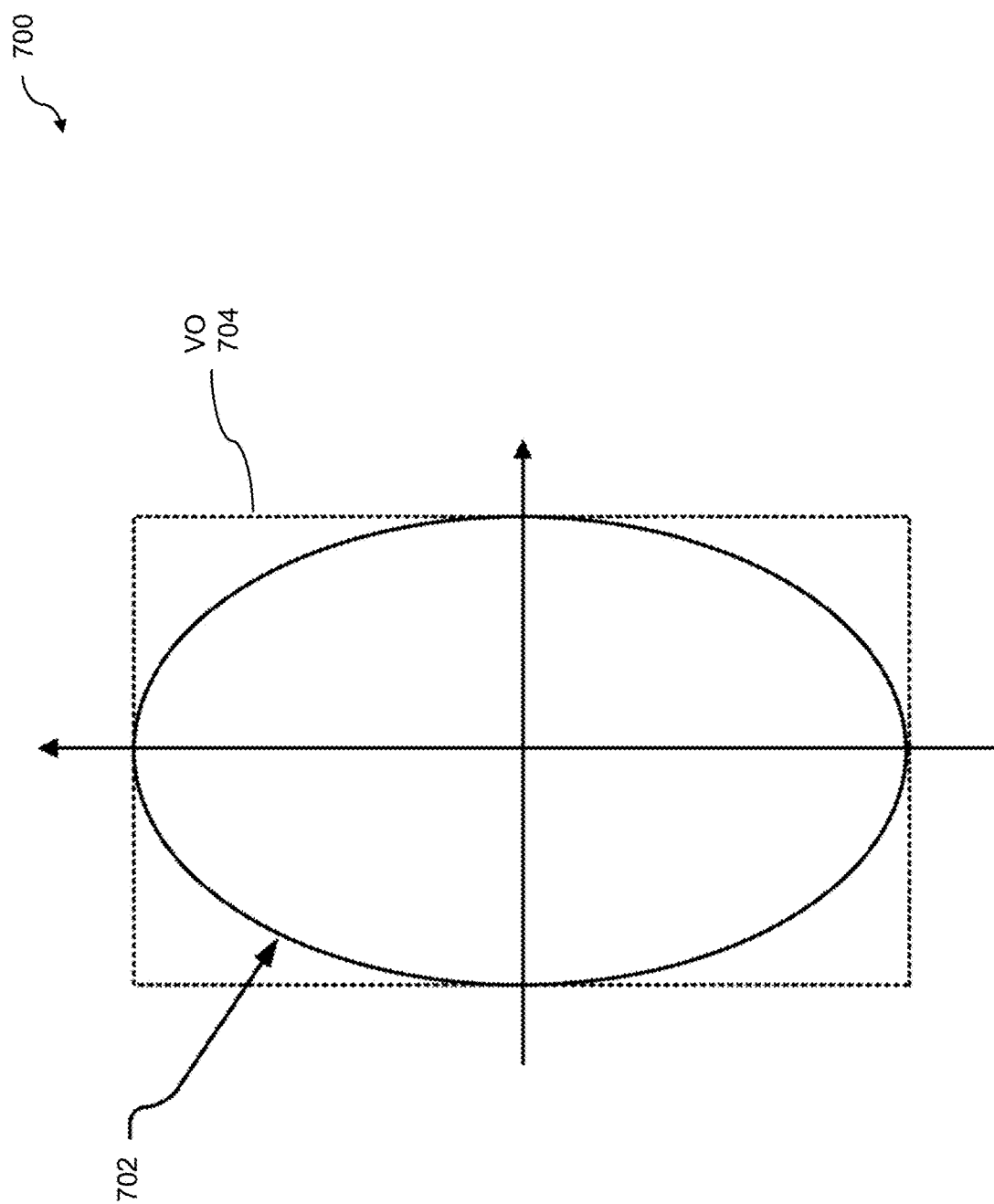
FIG. 7 is an example illustration for fitting a rectangle into an oval.

FIG. 7 is an example illustration for fitting a rectangle into an oval. The fitting a rectangle into an oval 700 can enable video performance rendering modification based on device rotation metric. Alternatively, the playback technology disclosed herein may fit a rectangular video into an oval 702. The playback technology disclosed herein uses an approach described below to find a minimal scale a, given an oval inscribed to video rectangle VO 704 and a view rectangle VW rotated by θ.

Figure 8:
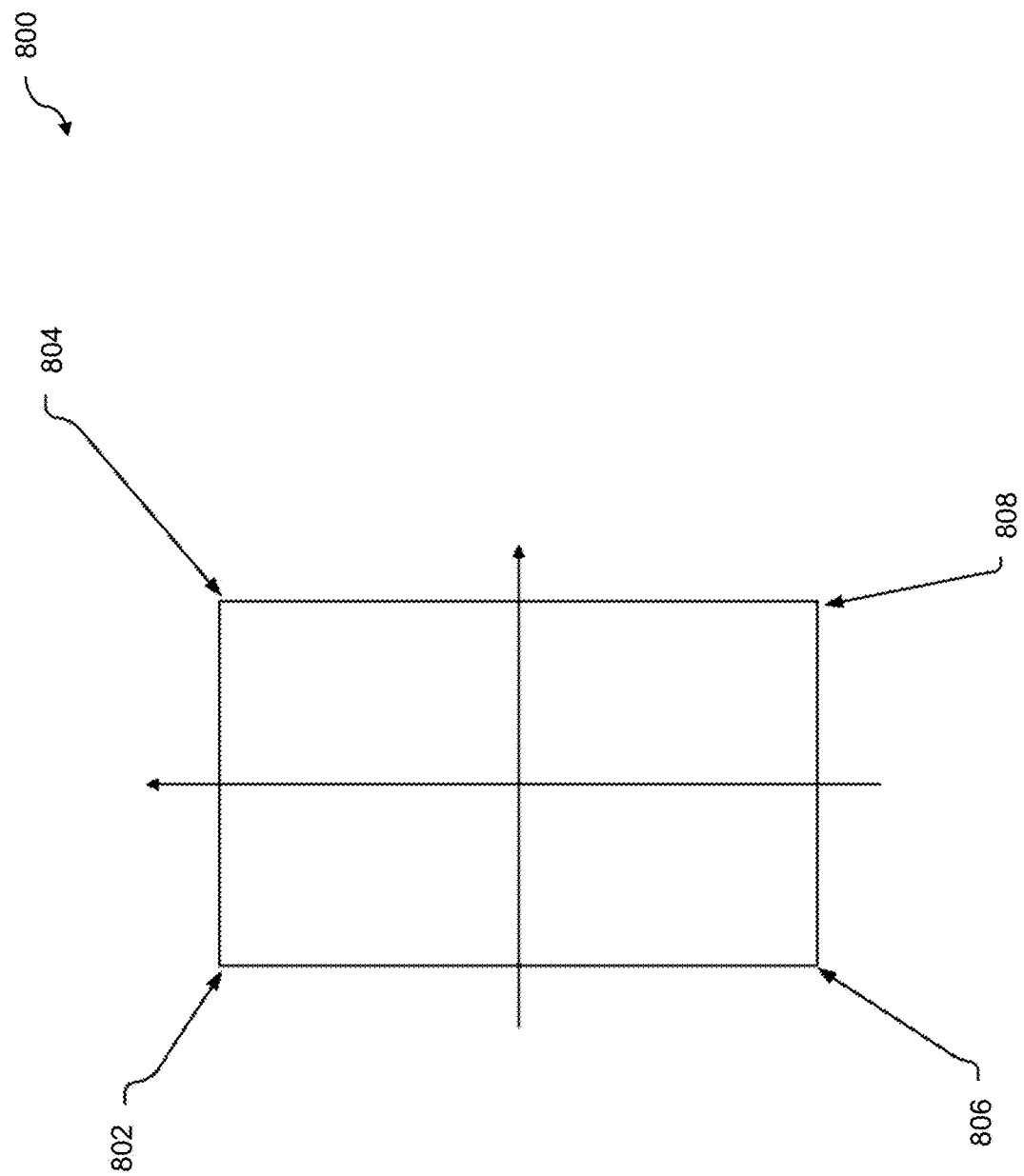
FIG. 8 is an example illustration for calculating position of four vertices of a view rectangle.

(1) An equation of an oval 702, as illustrated in FIG. 7, may be given by:

$$\frac{x^2}{a^2} + \frac{y^2}{b^2} = 1$$

Where $a=0.5\times\text{video width}, b=0.5\times\text{video height}.$ (2) On the other hand, four vertices of an upright, non-rotated view rectangle VW 600, as illustrated in FIG. 6, may be defined by:

$w=0.5\times\text{view width}, h=0.5\times\text{view height}.$ (3) FIG. 8 is an example illustration for calculating position of four vertices of a view rectangle. The calculating position of four vertices of a view rectangle can enable audio and video stream rendering modification based on a device rotation metric. When the view rectangle VW 800 is rotated by theta, the four vertices move to:

Top left vertex 802: (−w cos θ+h sin θ, −w sin θ−h cos θ),
Top right vertex 804: (w cos θ+h sin θ, w sin θ−h cos θ),
Bottom left vertex 806: (−w cos θ−h sin θ, −w sin θ+h cos θ), and
Bottom right vertex 808: (w cos θ−h sin θ, w sin θ+h cos θ).

(4) In order to fit the rotated view rectangle VW in the oval, an implementation scales VW by a and re-applies to (3).

$w'=0.5\alpha\times\text{view width}, h'=0.5\alpha\times\text{view height}$ (5) By combining 1-4, the minimal scale a can be determined given VO, VW, and the rotating angle θ. For instance, if an implementation wants to make sure the top right vertex should stay within the oval, the equation is:

$$\frac{(0.5\alpha \times \text{view width}\times\cos\theta + 0.5\alpha \times \text{view height}\times\sin\theta)^2}{(0.5 \times \text{video width})^2} + \frac{(0.5\alpha \times \text{view width}\times\sin\theta - 0.5a \times \text{view height}\times\cos\theta)^2}{(0.5 \times \text{video height})^2} \leq 1$$

Oval Rotation Method: In an implementation of the video playback technology disclosed herein, the above described geometric framework of designing a rotatable video viewing system is used. The oval gives an alternative mathematical lower bound for the system designer to determine the scaling factor. Based on the Oval Method, the zoom factor is largely reduced. For a typical widescreen portrait video and device of the scale (9:16), the suggested scale is 1.41× at portrait, maxed at 2.04× around 60-degree rotation, and is 1.86× at landscape.

Figure 9:
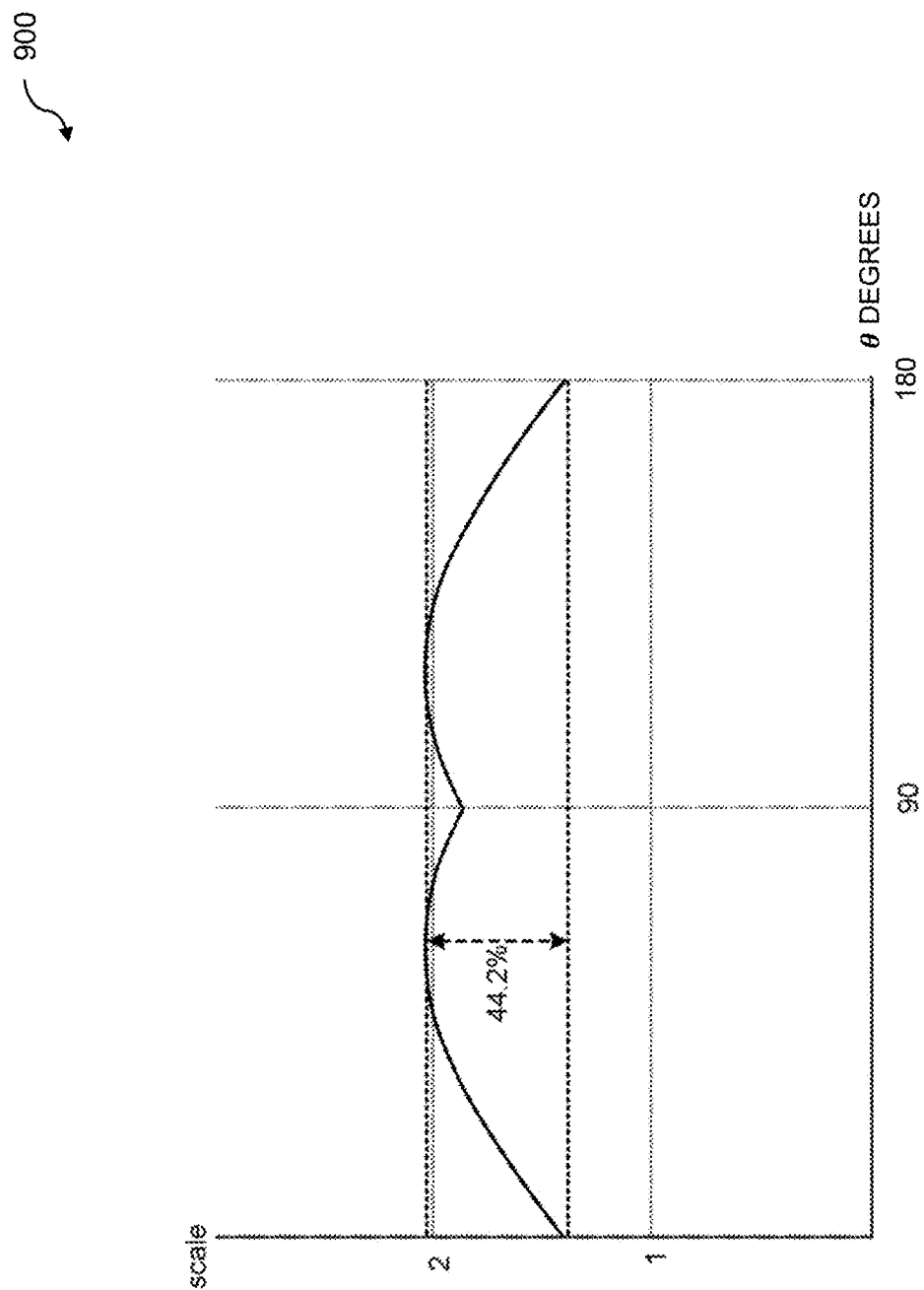
FIG. 9 illustrates an example graph of zoom factor as a function of degree of rotation.

FIG. 9 illustrates an example graph of zoom factor as a function of degrees of rotation. The zoom factor as a function of degrees of rotation can be used to enable video performance rendering modification based on device rotation metric. As a result, the zoom factor is reduced from 77.8% to 44.2%, as illustrated by a graph 900 in FIG. 9. As a result, the user is less likely to feel uncomfortable in viewing the scaled video.

Given the mathematical lower bound of the scaling factor, an implementation disclosed herein uses an alternative scaling curve as long as it stays in bounds. Additional rendering enhancements are discussed below.

Figure 10:
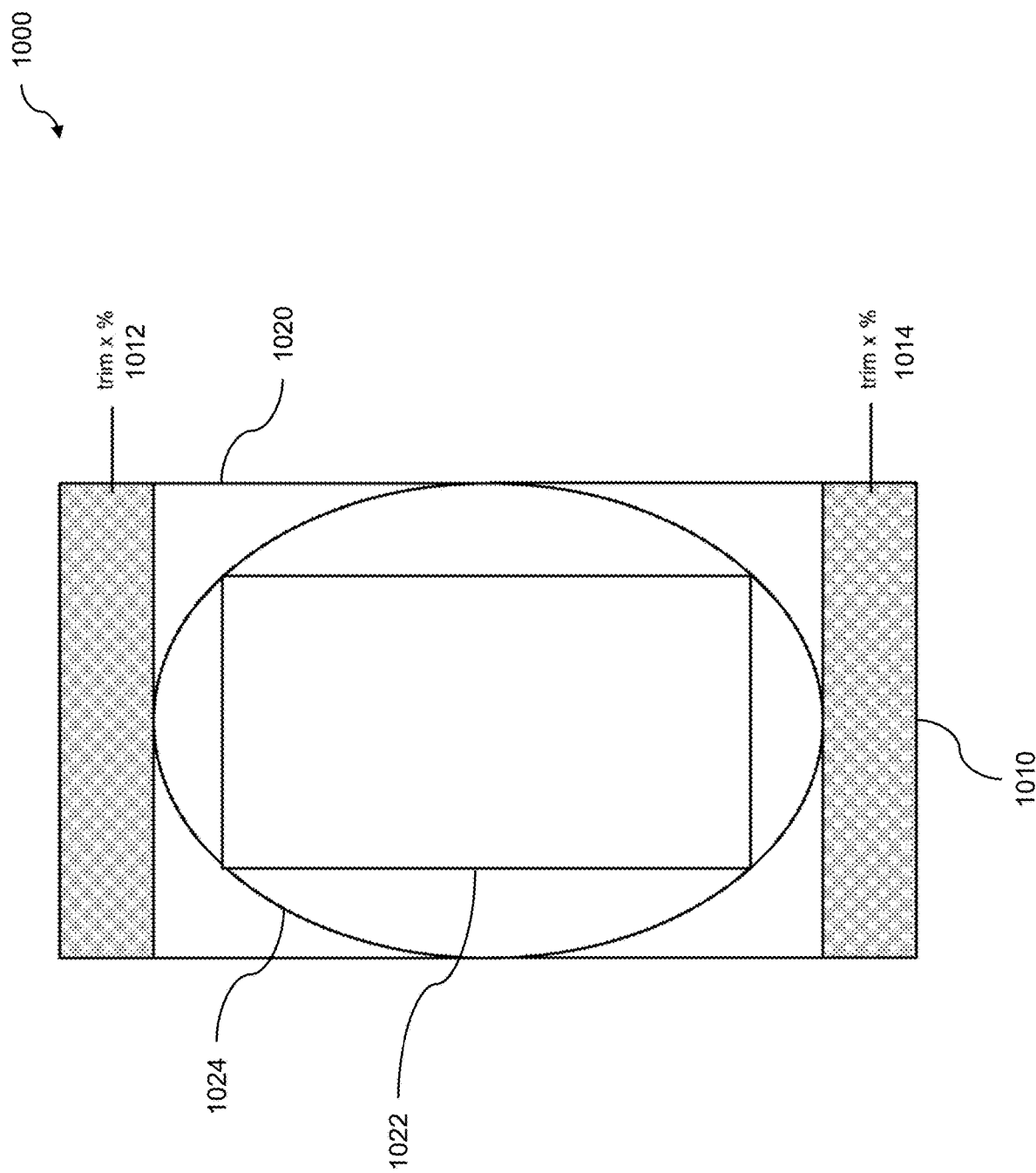
FIG. 10 illustrates trimming of a wide side of a video.

FIG. 10 illustrates trimming of a wide side of a video. Trimming the wide side of the video 1000 by x percent is illustrated by FIG. 10. The trimming of the wide side of the video can enable video performance rendering modification based on a device rotation metric. Video parameters and video display parameters are determined, and a minimum scale factor is calculated to inscribe a rectangle within an oval, based on the height and width of the video. A video 1010, such as a movie, a TV program, a video game, and so, can include a size, an aspect ratio, a resolution, height and width dimensions, and so on. The dimensions, for example, of the video can be different from the dimensions of a display 1020. In order for the video be viewed on the display, the video can be scaled, altered, cropped, truncated, and so on. Embodiments can include trimming a wide side of the video by a predetermined percentage. Since the focus of the video, such as action within a game, is generally toward the center of the video, the portions or edges such as the wide side of the video can be trimmed. In the figure, the video is trimmed by a percentage toward one edge 1012 and a minimum scale value can be calculated to inscribe a rectangle within an oval based on a height and a width of the video and wherein a height and a width of the video display define the rectangle trimmed by a percentage toward an opposite or opposing edge 1014. Discussed throughout, a minimum scale value can be calculated to inscribe a rectangle 1022 within an oval 1024 based on a height and a width of the video. By trimming the wide side of the video, a visible area of the video can be maximized within the video display. If the individual viewing the video wants to look left or right within the video, the extended portions as the trimmed portions can be filled in with video image data. The video image data can be generated using techniques including image processing, machine learning, etc.

Figure 11:
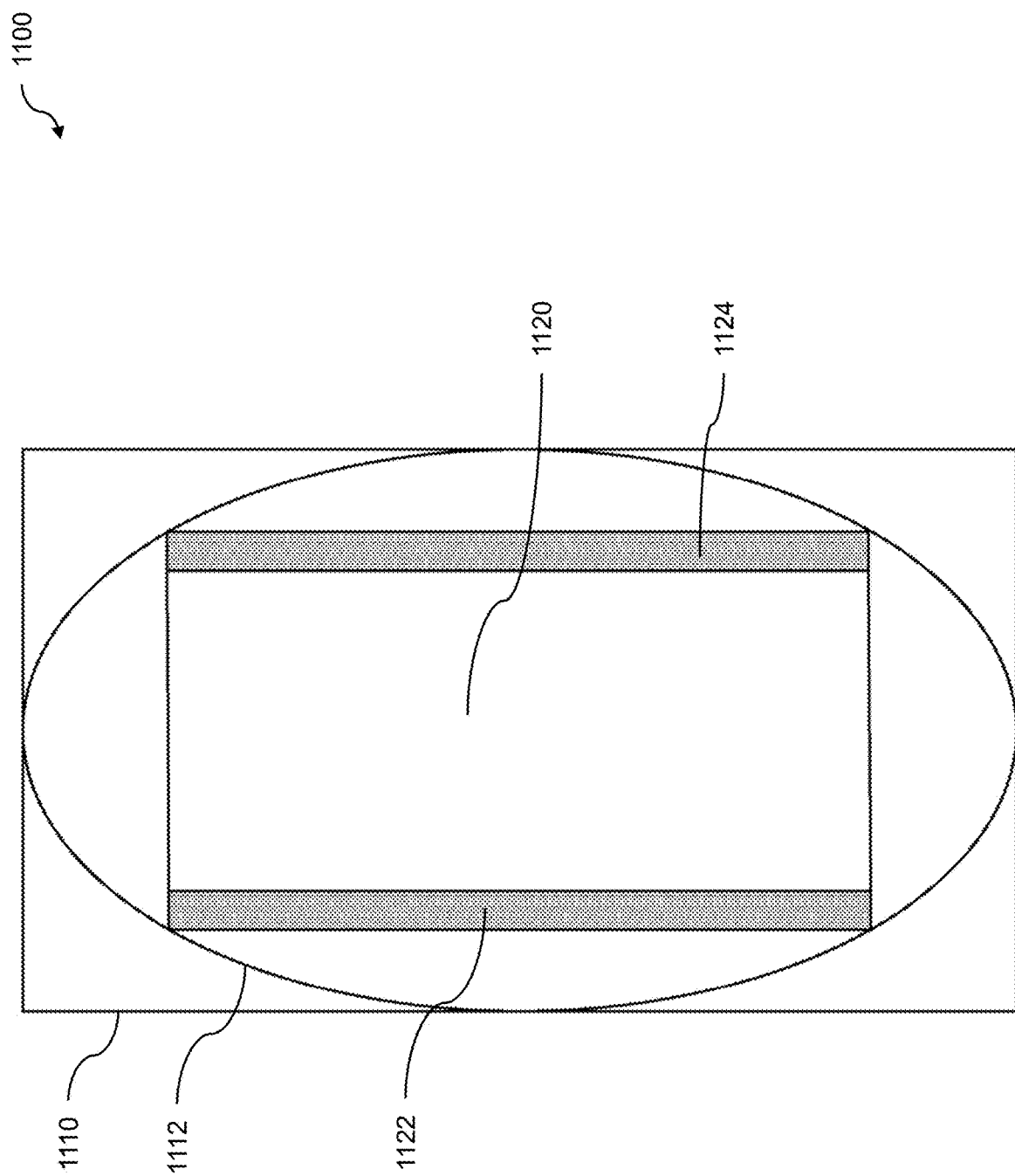
FIG. 11 is an example of pre-zooming and maintaining at a fixed scale with view-around portrait orientation.

FIG. 11 is an example of pre-zooming and maintaining at a fixed scale with a view-around portrait orientation 1100. A video can be pre-zoomed and the fixed scale of the video can be maintained to support video performance rendering modification based on device rotation metric. A video such as a movie or video game can be shown on a display 1110. The display can include associated parameters such as resolution, dimensions, aspect ratio, and so on, where the parameters of the display are substantially similar to or substantially different from parameters associated with the video. The oval 1112 can be based on the video or a scaled version of the video and can be chosen to maximize a visible area of the video. The video can include a height and a width, an aspect ratio, etc., that are not proportional to the display. That is, the video simply may not be able to be scaled to fit within the oval on the display. In embodiments, the video can be pre-zoomed 1120. The pre-zooming of the video can be maintained throughout viewing of the video by the user. When the aspect ratio of the video is different from the aspect ratio of the display, the video can be masked using masks, such as masks 1122 and 1124.

Figure 12:
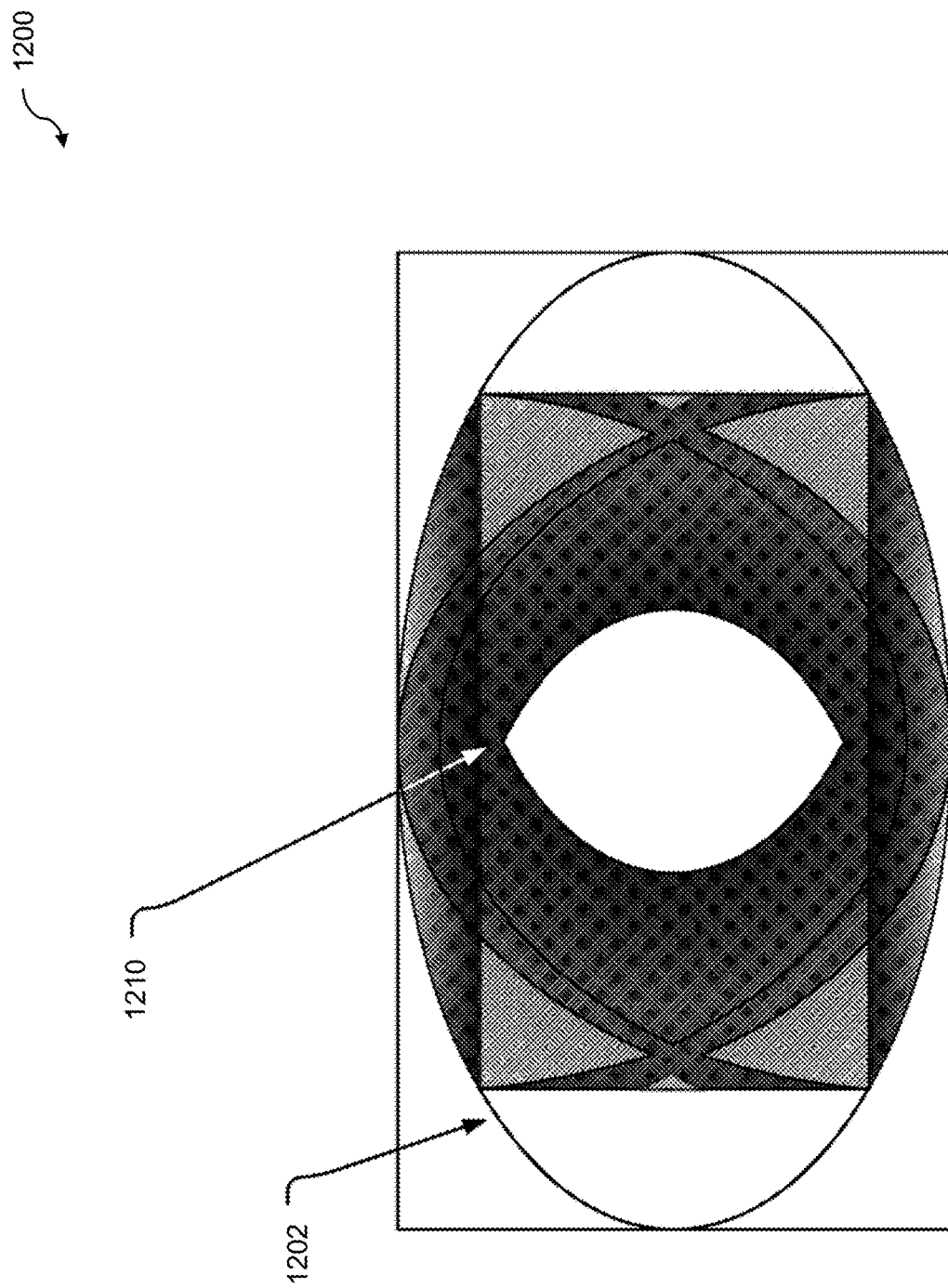
FIG. 12 illustrates overlaying of rotated view angles.

FIG. 12 illustrates overlaying of rotated view angles. Alternatively, the system overlays the rotated view rectangles 1210 in an oval 1202 as illustrated in FIG. 12 to obtain a visible video mask 1200. The mask 1200 may be used as a visual hint for users who record videos, and/or for video compression purposes. For example, the visible video mask 1200 may be communicated to a user so that the user can view a boundary of the visible video mask 1200 when recording a video. For instance, the visible video mask 1200 may be overlaid on a device screen when a user is recording a video.

Figure 13:
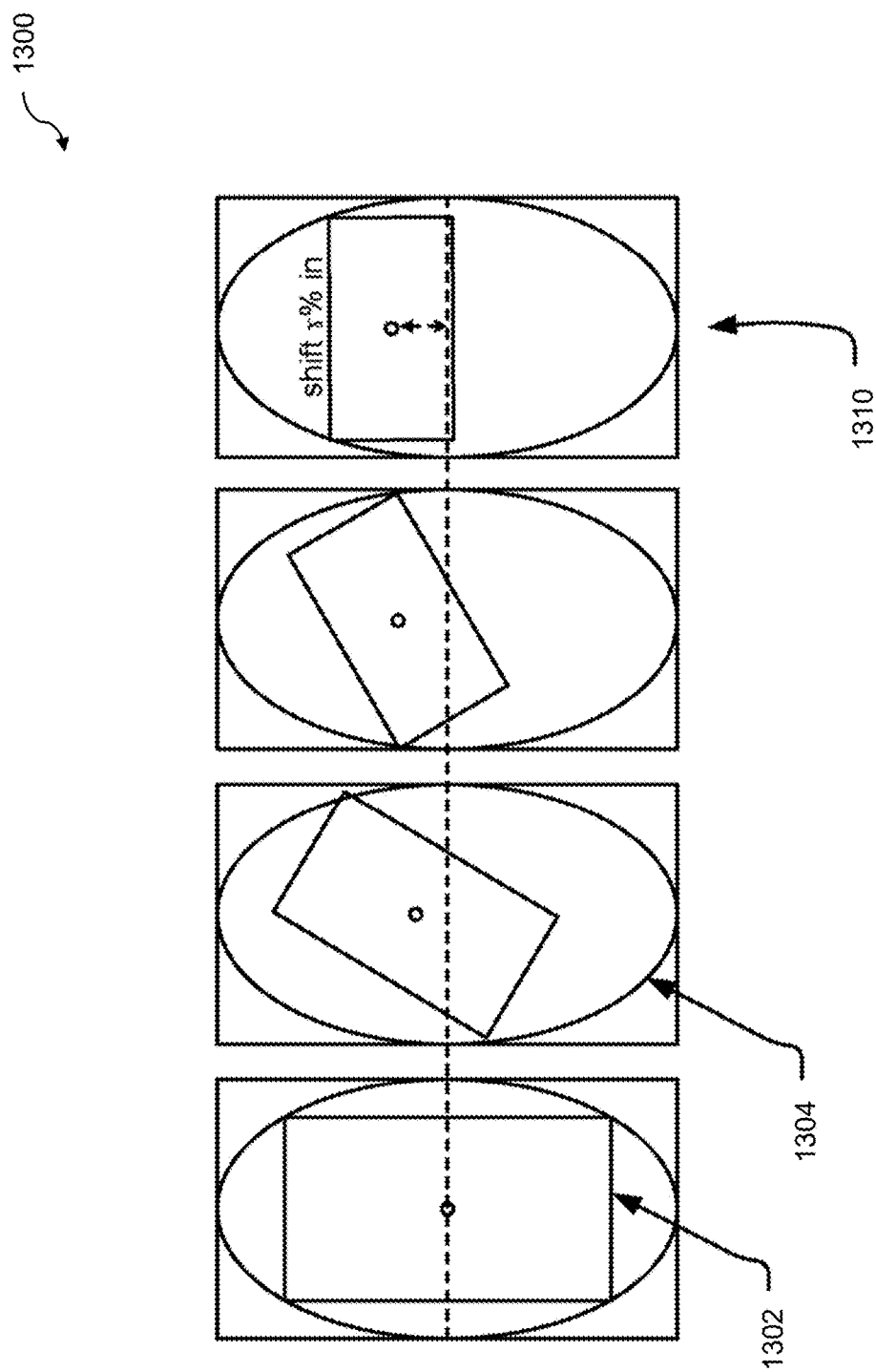
FIG. 13 illustrates rotation of a video off a center of an oval.

FIG. 13 illustrates rotation of a video off a center of an oval. Yet alternatively, the system rotates the video 1302 off a center of an oval 1304 as shown by a series of viewports 1300. For instance, the viewport can be centered at portrait, while shifting upward or downward at landscape as illustrated at 1310. The technique is particularly useful to capture the highlight of the video.

In another implementation, to support off-center rotation, a "Highlight Anchor" can be positioned on the video. In one implementation, the video playback technology disclosed herein allows a user to set the anchor. In another implementation, the video playback technology disclosed herein sets the anchor automatically (by a computer-vision enabled system).

Figure 14:
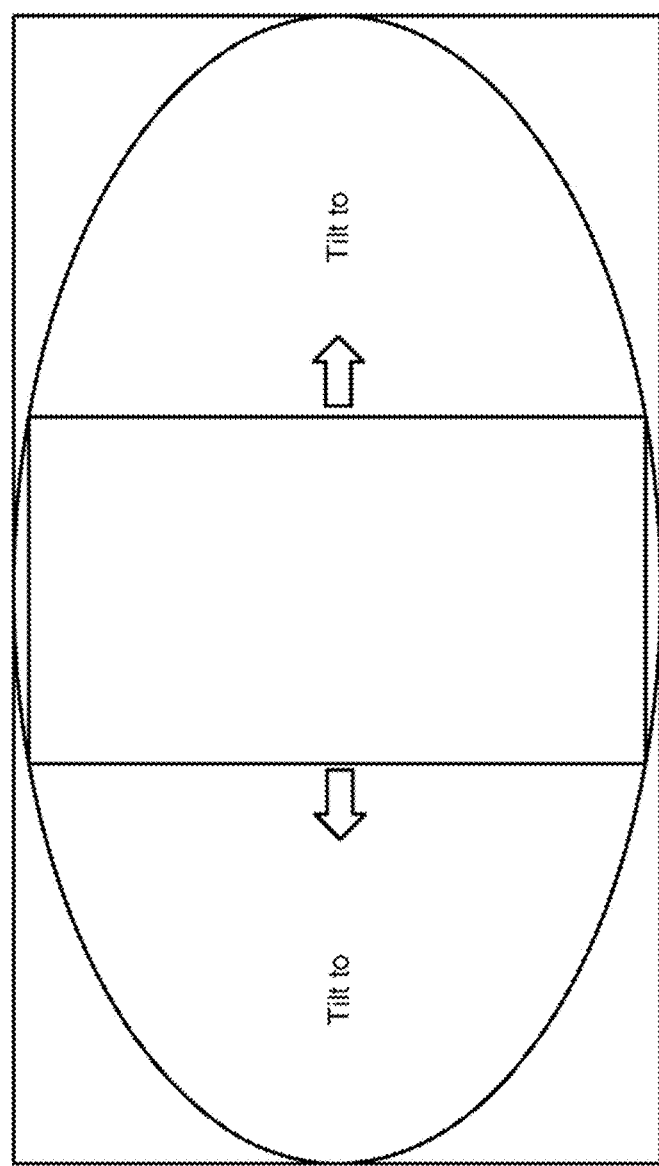
FIG. 14 illustrates movement of viewport that allows a user to tilt or move the viewing device.

FIG. 14 illustrates movement of a viewport that allows a user to tilt or move the viewing device. As the viewport is scaled up (zoomed in) for viewing the video in order to support rotation, viewable margins can exist in one or multiple directions. Therefore, in one implementation, the system allows the user to tilt or move the viewing device to the left, right, up, and down. In such an implementation, the system moves the viewport accordingly as shown in illustration 1400. Here "tilt" is defined as relative motion, whereas "move" is defined as absolute motion. In another implementation, the rotation, movement, and tilting are allowed only after a time set by the video creators.

The video display technology disclosed herein creates a unique video viewing experience in which the user cannot view the entire video in one angle. As a result, the user is motivated to engage in the experience by chasing a moving subject in the video. In one implementation, as only a partial view is visible in the initial view angle, the user is motivated to rotate the viewing device in order to reveal the whole scene within the video.

Furthermore, the video display technology disclosed herein allows a unique storytelling experience for a video creator, who can compose the space and time of the video in various ways to engage the viewers to interact with the video. The engaging viewing experience also represents extensive opportunities for more effective mobile video advertising.

Figure 15:
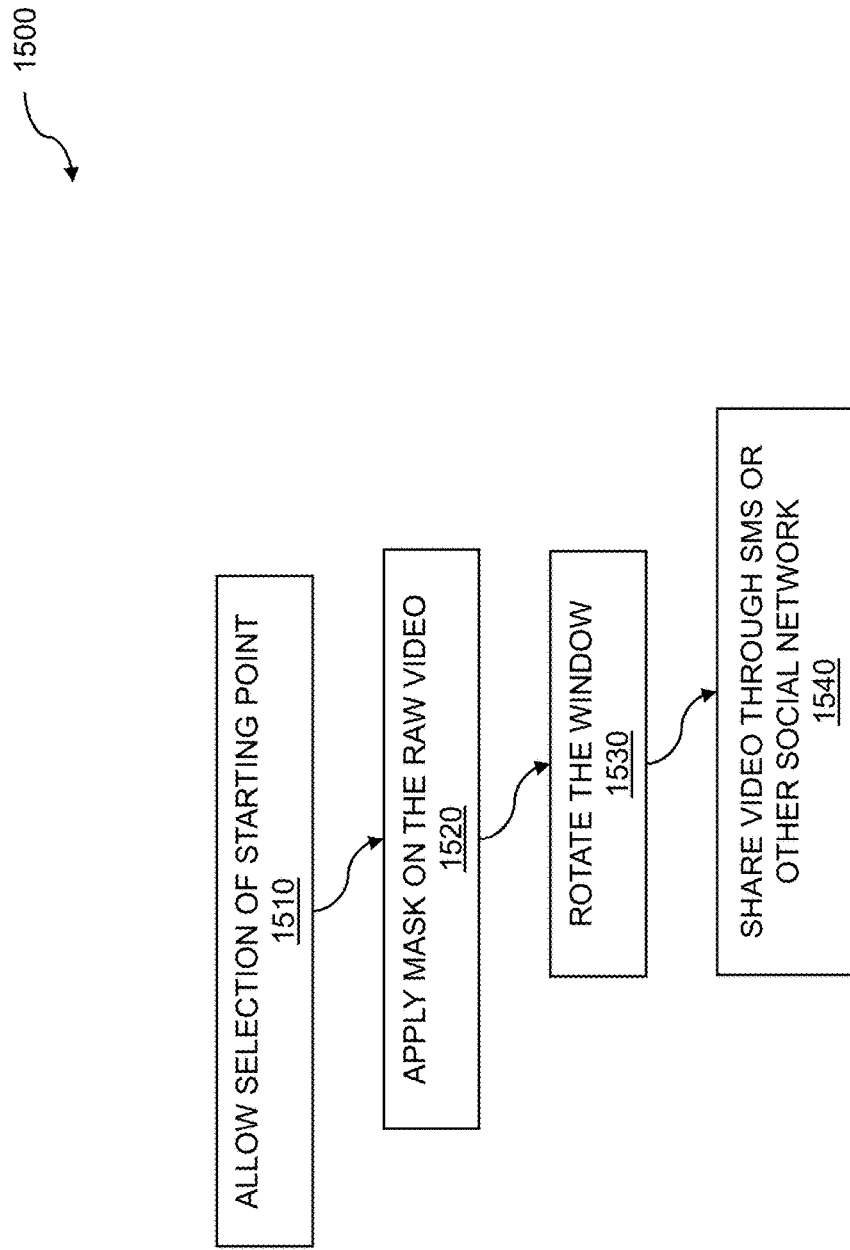
FIG. 15 illustrates example operations of a system for providing an audio and video stream rendering modification based on a device rotation metric.

FIG. 15 illustrates example operations of a system for providing a video performance rendering modification based on a device rotation metric. While the rotating video browsing experience relies on the core algorithm within the specific software, in order for people using a general video browsing software to enjoy a partial experience, the technology disclosed herein provides a special version of the raw video, which can be shared with other people and other software universally. One or more operations 1500 for sharing the video are illustrated in FIG. 15. An operation 1510 allows announcing to one or more friends who want to share the video experience (sharer) to select where they want the rotation to start in the shared version of the video. An operation 1520 applies a mask on the raw video, with a rectangle-shaped window, so that the receiver can view just part of the video, as if using special software to browse the video vertically. Subsequently, depending on the user's selection in operation 1510, at ¼, or ²⁄₄, or ¾ of the video timeline, an operation 1530 rotates the window in operation 1520 clockwise, as if the receiver can rotate the device and see different parts of the video. Finally, an operation 1540 allows the sharer to distribute the video through short message service (SMS) or other social networks.

When the device is laid flat on the desk, the gravity's direction is perpendicular to the screen, and its projection onto the screen's X and Y axes is very small. Since the core algorithm relies on the X and Y axis readings as input, the input has a very low signal-to-noise ratio (SNR), and a small disturbance to the device may cause the video to rotate significantly, resulting in a negative user experience. To avoid this, an implementation disclosed herein avoids any operation if the X and Y axis readings are below predetermined thresholds X_THRESHOLD and Y_THRESHOLD. The pseudocode for such implementation is as given below:

```
if (gravity.x < X_THRESHOLD && gravity.y < Y_THRESHOLD) {
    return;
} else {
    performCoreAlgorithm( );
}
```

The core algorithm may react very swiftly to a device's altitude change against the gravity. When watched for a long time, a user may feel it hyper-responsive and get motion sick. An implementation disclosed herein reduces the motion sickness by avoiding responding to small turbulence in the altitude change. In such an implementation, whenever the software receives an update from the device's gravity sensor, it applies a low-pass filter (LPF) and uses the LPF output as the input to the core algorithm. The pseudocode for such implementation is as given below:

```
var lpfX = 0.0;
var lpfY = 0.0;
let kFilteringFactor = 0.1;
func onDeviceGravityUpdate(gravity) {
    let lpfX = (gravity.x * kFilteringFactor) + (lpfX * (1.0 -
        kFilteringFactor))
    let lpfY = (gravity.y * kFilteringFactor) + (lpfY * (1.0 -
        kFilteringFactor))
}
```

Figure 16:
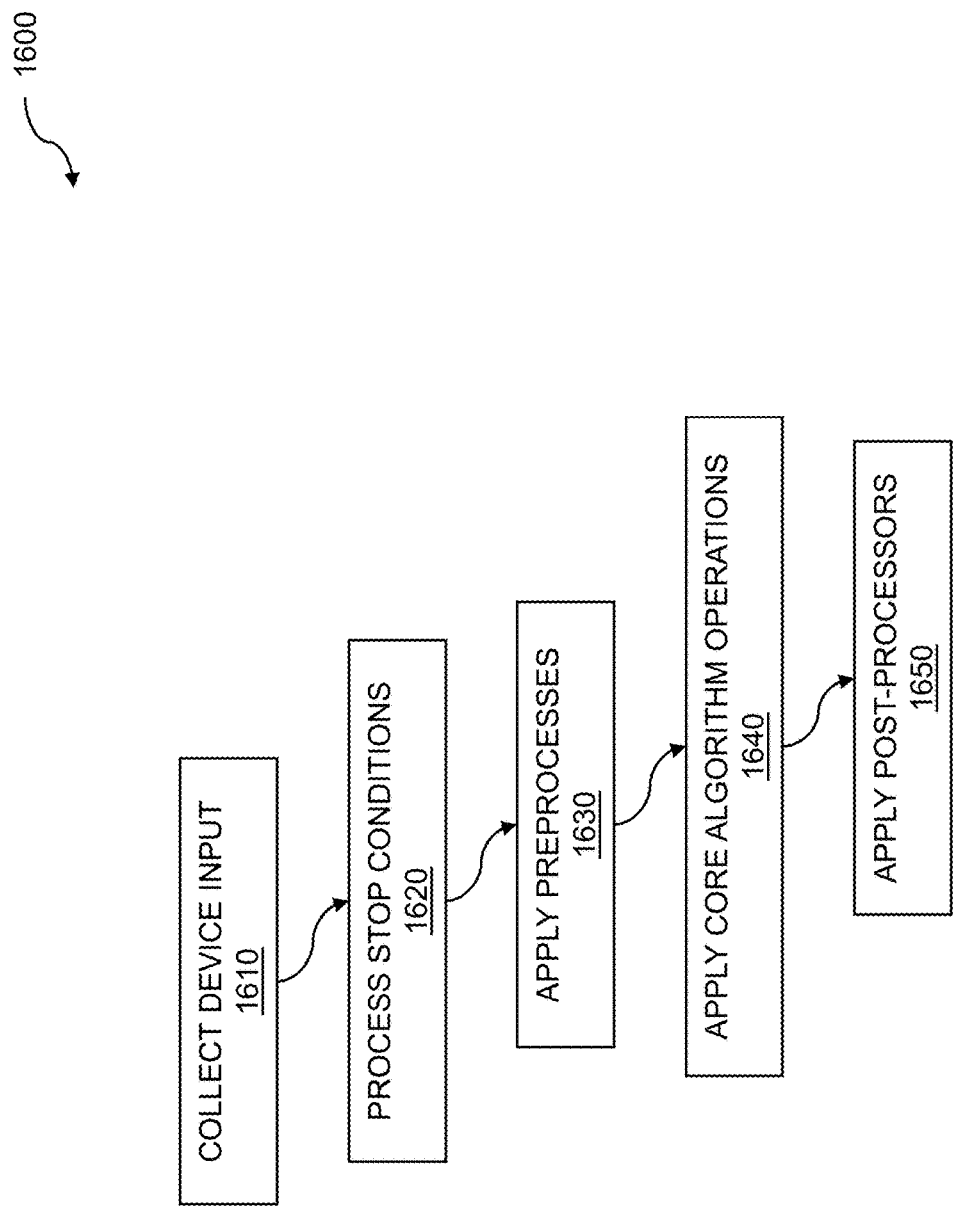
FIG. 16 illustrates alternative example operations of a system for audio and video stream rendering modification based on device rotation metric.

FIG. 16 illustrates alternative example operations of a system 1600 for providing video performance rendering modification based on a device rotation metric. An overview of the video playback system is disclosed herein. An operation 1610 collects various device inputs. An operation 1620 processes one or more stop conditions if the device is laid on a horizontal surface. An operation 1630 applies one or more preprocesses including a low-pass filter, a video inset, a viewport inset, etc. An operation 1640 applies various core algorithm operations discussed herein. Subsequently, an operation 1650 applies one or more post-processing operations to smooth the scale of video playback.

Figure 17:
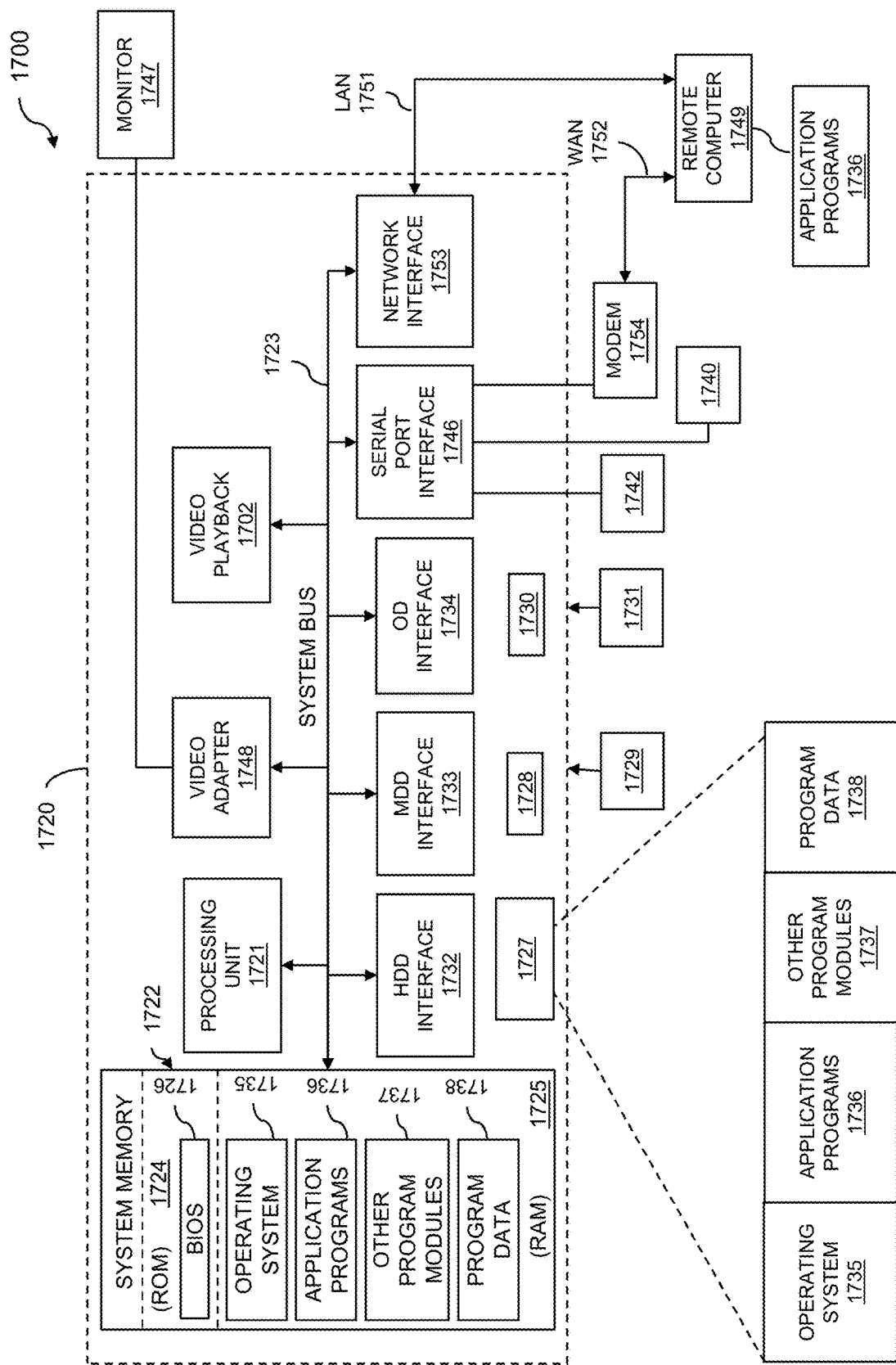
FIG. 17 illustrates an example computing system.

FIG. 17 illustrates an example computing system. The system 1700 may be useful in implementing the described video performance rendering modification based on device rotation metric. The example hardware and operating environment of FIG. 17 for implementing the described technology includes a computing device, such as a general purpose computing device in the form of a gaming console or computer 1720, a mobile telephone, a personal data assistant (PDA), a set top box, or another type of computing device. In the implementation of FIG. 17, for example, the computer 1720 includes a processing unit 1721, a system memory 1722, and a system bus 1723 that operatively couples various system components including the system memory to the processing unit 1721. There may be only one or there may be more than one processing unit 1721, such that the processor of computer 1720 comprises a single central processing unit (CPU), or a plurality of processing units, commonly referred to as a parallel processing environment. The computer 1720 may be a conventional computer, a distributed computer, or any other type of computer; the implementations are not so limited.

The system bus 1723 may be any of several types of bus structures including a memory bus or memory controller, a peripheral bus, a switched fabric, point-to-point connections, and a local bus using any of a variety of bus architectures. The system memory may also be referred to simply as the memory and includes read only memory (ROM) 1724 and random-access memory (RAM) 1725. A basic input/output system (BIOS) 1726, containing the basic routines that help to transfer information between elements within the computer 1720, such as during start-up, is stored in ROM 1724. The computer 1720 further includes a hard disk drive 1727 for reading from and writing to a hard disk (not shown), a magnetic disk drive 1728 for reading from or writing to a removable magnetic disk 1729, and an optical disk drive 1730 for reading from or writing to a removable optical disk 1731 such as a CD ROM, DVD, or other optical media.

The hard disk drive 1727, magnetic disk drive 1728, and optical disk drive 1730 are connected to the system bus 1723 by a hard disk drive interface 1732, a magnetic disk drive interface 1733, and an optical disk drive interface 1734, respectively. The drives and their associated tangible computer-readable media provide nonvolatile storage of computer-readable instructions, data structures, program modules, and other data for the computer 1720. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment. One or more computer instructions for implementing the video playback system 1702 as disclosed herein may be implemented in one of the memories of the computer 1720.

A number of program modules may be stored on the hard disk, magnetic disk 1729, optical disk 1731, ROM 1724, or RAM 1725, including an operating system 1735, one or more application programs 1736, other program modules 1737, and program data 1738. A user may enter commands and information into the personal computer 1720 through input devices such as a keyboard 1740 and pointing device 1742. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 1721 through a serial port interface 1746 that is coupled to the system bus, but may be connected by other interfaces, such as a parallel port, game port, or a universal serial bus (USB). A monitor 1747 or other type of display device is also connected to the system bus 1723 via an interface, such as a video adapter 1748. In addition to the monitor, computers typically include other peripheral output devices (not shown), such as speakers and printers.

The computer 1720 may operate in a networked environment using logical connections to one or more remote computers, such as remote computer 1749. These logical connections are achieved by a communication device coupled to or a part of the computer 1720; the implementations are not limited to a particular type of communications device. The remote computer 1749 may be another computer, a server, a router, a network PC, a client, a peer device or other common network node, and typically includes many or all of the elements described above relative to the computer 1720, although only a memory storage device has been illustrated in FIG. 17. The logical connections depicted in FIG. 17 include a local-area network (LAN) 1751 and a wide-area network (WAN) 1752. Such networking environments are commonplace in office networks, enterprise-wide computer networks, intranets and the Internet, which are all types of networks.

When used in a LAN-networking environment, the computer 1720 is connected to the local network 1751 through a network interface or adapter 1753, which is one type of communications device. When used in a WAN-networking environment, the computer 1720 typically includes a modem 1754, a network adapter, a type of communications device, or any other type of communications device for establishing communications over the wide area network 1752. The modem 1754, which may be internal or external, is connected to the system bus 1723 via the serial port interface 1746. In a networked environment, program engines depicted relative to the personal computer 1720, or portions thereof, may be stored in the remote memory storage device. It is appreciated that the network connections shown are examples and other means of and communications devices for establishing a communications link between the computers may be used.

In an example implementation, software or firmware instructions and data for providing a search management system, various applications, search context pipelines, search services, a service, a local file index, a local or remote application content index, a provider API, a contextual application launcher, and other instructions and data may be stored in memory 1722 and/or storage devices 1729 or 1731 and processed by the processing unit 1721.

Figure 18:
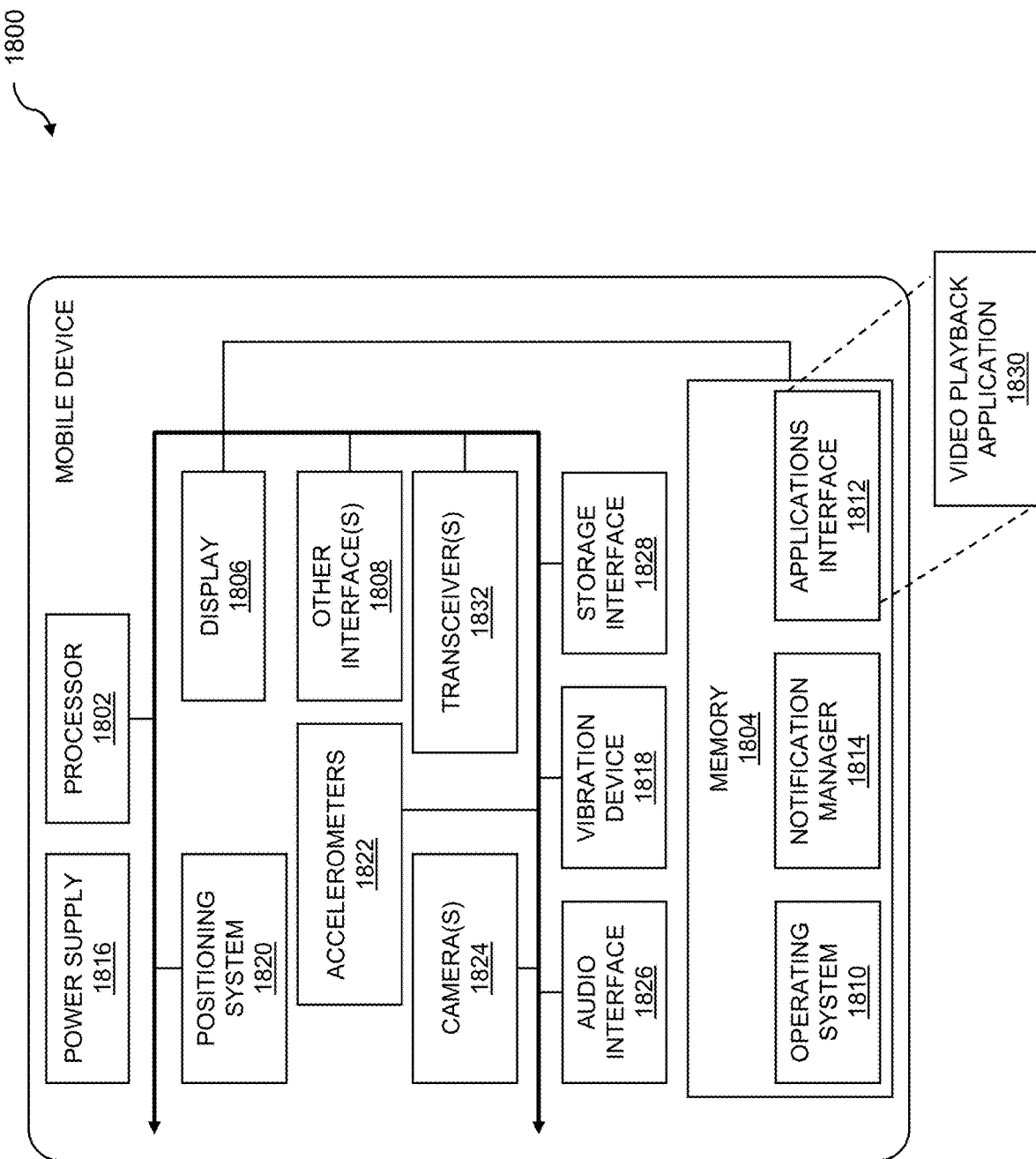
FIG. 18 illustrates an example mobile device.

FIG. 18 illustrates an example mobile device. The mobile device 1800 may be used to implement a video performance rendering modification based on device rotation metric. The mobile device 1800 includes a processor 1802, a memory 1804, a display 1806 (e.g., a touchscreen display), and other interfaces 1808 (e.g., a keyboard). The memory 1804 generally includes both volatile memory (e.g., RAM) and non-volatile memory (e.g., flash memory). An operating system 1810, such as the Microsoft Windows® Phone operating system, resides in the memory 1804 and is executed by the processor 1802, although it should be understood that other operating systems may be employed.

One or more application programs modules 1812 are loaded in the memory 1804 and executed on the operating system 1810 by the processor 1802. Examples of applications 1812 include, without limitation, email programs, scheduling programs, personal information managers, Internet browsing programs, multimedia player applications, etc. In one implementation, audio and video stream rendering modification based on a device rotation metric video stream playback application 1830 may be implemented on the application programs module 1812. A notification manager 1814 is also loaded in the memory 1804 and is executed by the processor 1802 to present notifications to the user. For example, when a promotion can be triggered and presented to a shopper, the notification manager 1814 can cause the mobile device 1800 to beep or vibrate (via the vibration device 1818) and display the promotion on the display 1806.

The mobile device 1800 includes a power supply 1816, which is powered by one or more batteries or other power sources and which provides power to other components of the mobile device 1800. The power supply 1816 may also be connected to an external power source that overrides or recharges the built-in batteries or other power sources.

The mobile device 1800 includes one or more communication transceivers 1832 to provide network connectivity (e.g., mobile phone network, Wi-Fi®, Bluetooth®, etc.). The mobile device 1800 also includes various other components, such as a positioning system 1820 (e.g., a global positioning satellite transceiver), one or more accelerometers 1822, one or more cameras 1824, an audio interface 1826 (e.g., a microphone, an audio amplifier and speaker and/or audio jack), and additional storage 1828. Other configurations may also be employed.

In an example implementation, a mobile operating system, various applications, and other modules and services may be embodied by instructions stored in memory 1804 and/or storage devices 1828 and processed by the processing unit 1802. User preferences, service options, and other data may be stored in memory 1804 and/or storage devices 1828 as persistent datastores.

Figure 19:
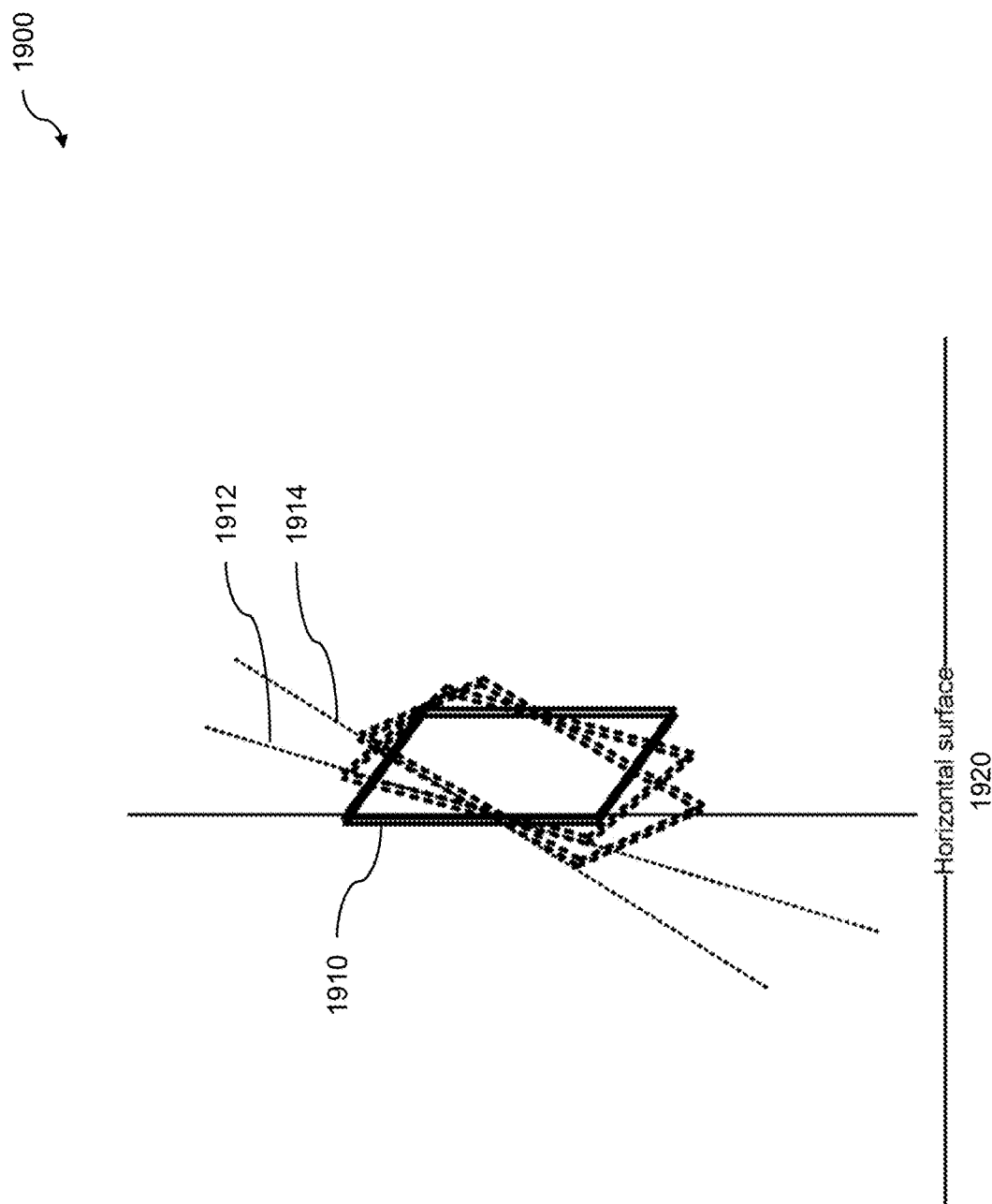
FIG. 19 illustrates an example move of a display device.

FIG. 19 illustrates an example move 1900 of a display device. A display device, such as a display coupled to a personal electronic device including a smartphone, tablet, or PDA, etc., can be used by an individual to display a video. The video that is displayed can include a movie, a video game, etc. The display can be rotated as the individual views the video. Rotation of the display is used for video performance rendering modification based on device rotation metric. A display 1910 can be in an initial orientation such as vertical with respect to a horizontal surface 1920. As the individual views video, the user can rotate the display to varying amounts of rotation. Two rotations are shown, a first rotation 1912 and a second rotation 1914. The rotation of the display can enable the individual to view extended portions of the video, such as extended portions up, down, left, right, etc. The display can also be rotated within a plane. The rotation within a plane can include a clockwise rotation, a counterclockwise rotation, etc. The rotation within a plane can further enhance the immersive video experience by changing a viewport into the video.

Figure 20:
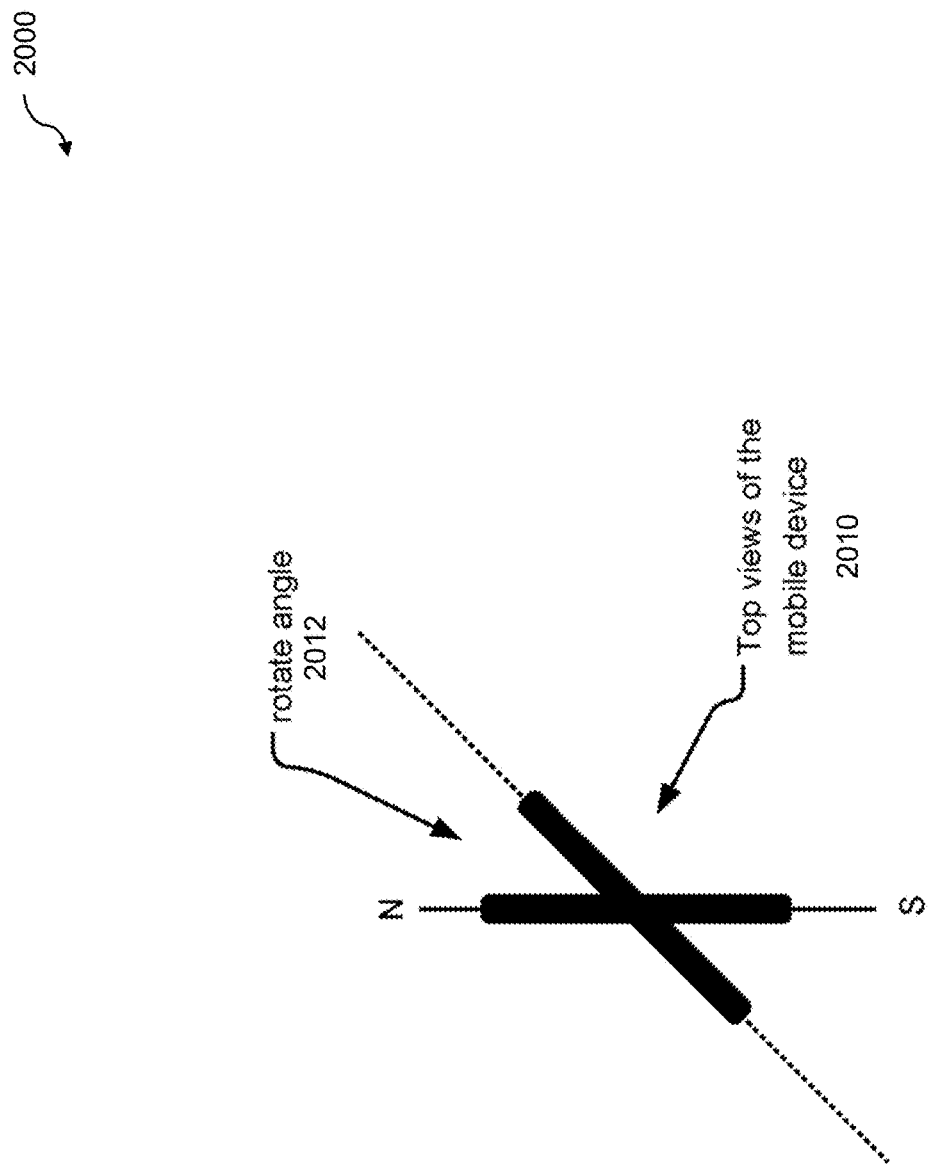
FIG. 20 illustrates an example rotation of a display device.

FIG. 20 illustrates an example rotation 2000 of a display device. Discussed throughout, an individual can view a movie, TV program, video game, or other video content using a display coupled to an electronic device such as a smartphone, tablet, game console, laptop computer, etc. As the individual views the video, that individual can rotate the display. The rotation of the display can change a viewport provided to the individual into the video. Rotation of the display device can enable video performance rendering modification based on device rotation metric. An electronic device 2010 can be viewed from the top. While rotation of the electronic device has been described above for forward and back rotation (pitch) and rotation within a plane (roll), the device can further be rotated with respect to the top view of the device (yaw), as illustrated by rotate angle 2012. This latter rotation can enable different viewing angles and can further enable in-video actions such as looking left or looking right. Such viewing of the video can include viewing extended portions of the video. The extended portions of the video can be filled with generated video data, where the generated video data can be generated using techniques including image processing techniques, machine learning techniques, and the like.

Figure 21:
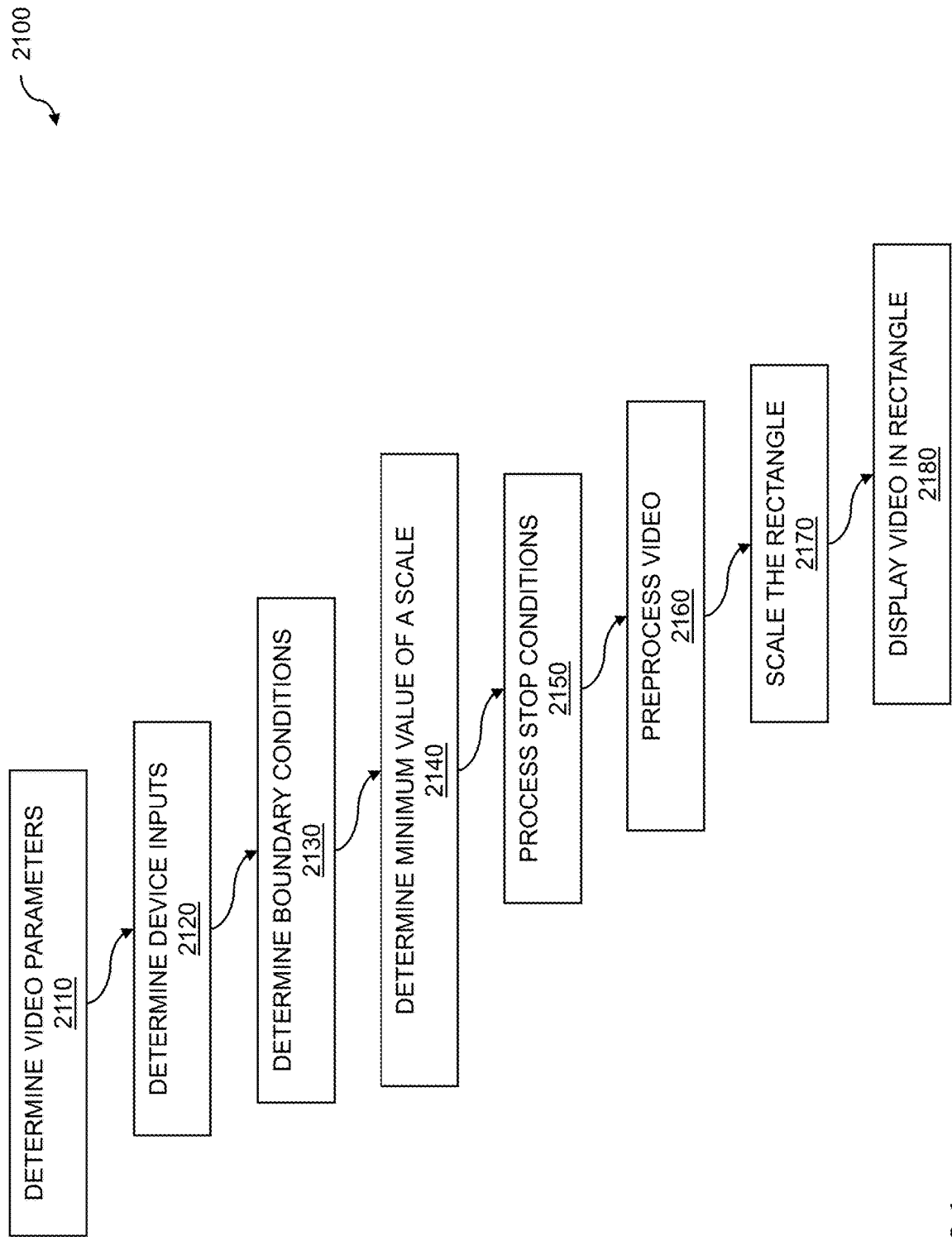
FIG. 21 illustrates example operations of a system for providing an audio and video stream rendering modification based on a device rotation metric.

FIG. 21 illustrates example operations of a system 2100 for providing a video performance rendering modification based on a device rotation metric. An operation 2110 determines various parameters of a video, including a size of the video, a size of a viewport used to display the video, an angle of the viewport, a scale factor, etc. An operation 2120 determines various device inputs, such as an input from an accelerometer, an input from a gyroscope, etc. An operation 2130 determines one or more boundary conditions, such as viewport of the user, a zoom factor, etc. An operation 2140 determines a minimum value of a scale to inscribe a rectangle in an oval. An operation 2150 processes one or more stop conditions disclosed herein. For example, one stop condition may be that if the device displaying the video is put on a substantially horizontal surface as indicated by a device input, the processing of the video as disclosed herein is stopped.

An operation 2160 preprocesses the video according to one or more preprocessing methods disclosed herein. An example preprocessor may be processing the video using a low-pass filter. Another preprocessing operation may include one of a video inset and/or a viewport inset before a core algorithm disclosed herein is applied. An operation 2170 smooths the scale of the rectangle according to one or more scaling methods disclosed herein. An operation 2180 may display the video in the rectangle.

Figure 22A:
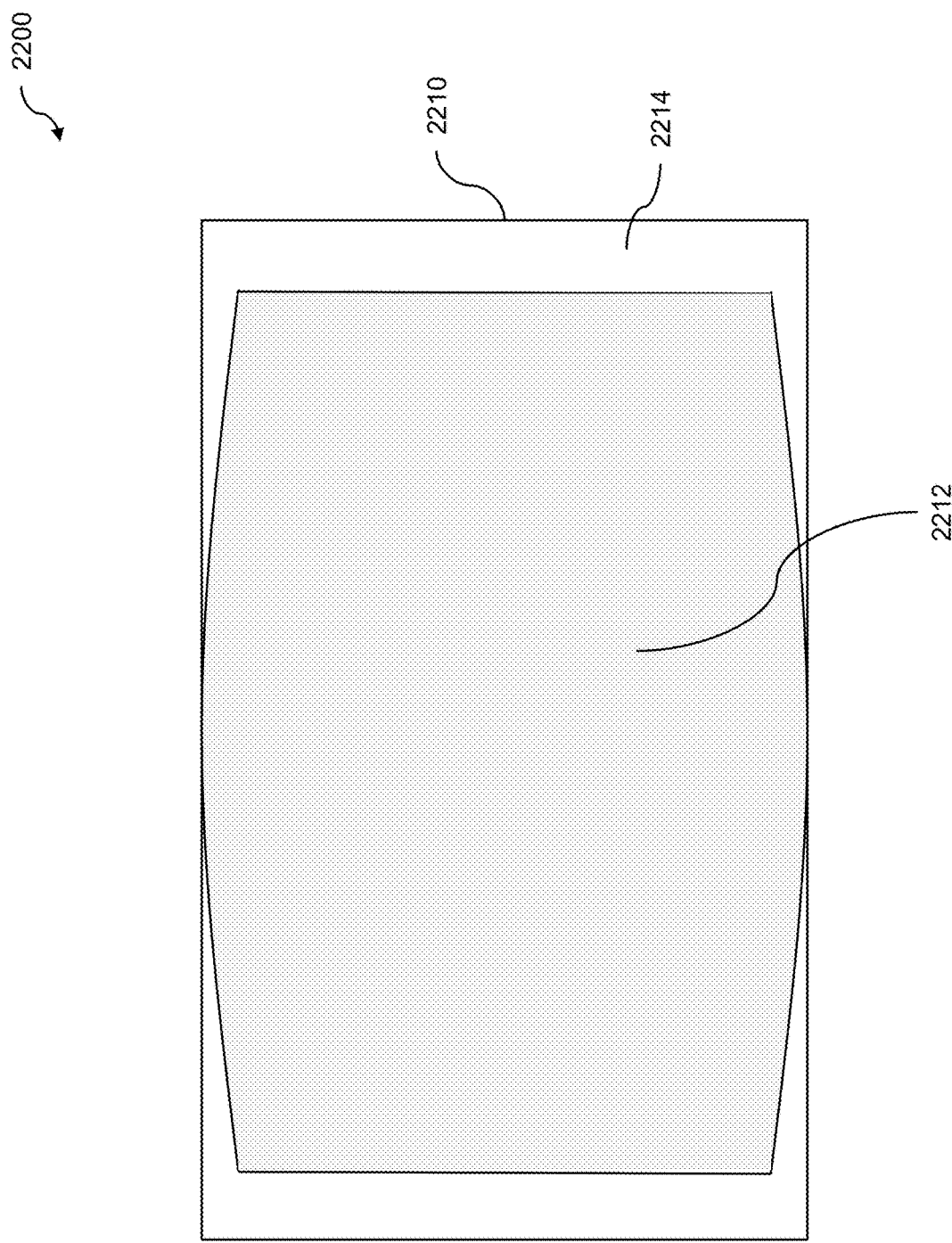
FIG. 22A illustrates an initial video on a device viewport.

FIG. 22A illustrates an initial video on a device viewport. An implementation of the system is disclosed wherein, as the viewport of a device is rotated, the video shown in the viewport is expanded in order to maximize the visible area of original video. In other words, the system proposes a technique for reducing invisible areas of the video while performing rotation of the viewport. Specifically, as shown at 2200, the original video 2210 is shown and the visible area 2212 on a viewport is also shown. Since 2212 is smaller than the original video in 2210, only part of the video is shown on the viewport, thus resulting in lost regions 2214 of the video that would not be seen on the viewport at any rotate angle.

Figure 22B:
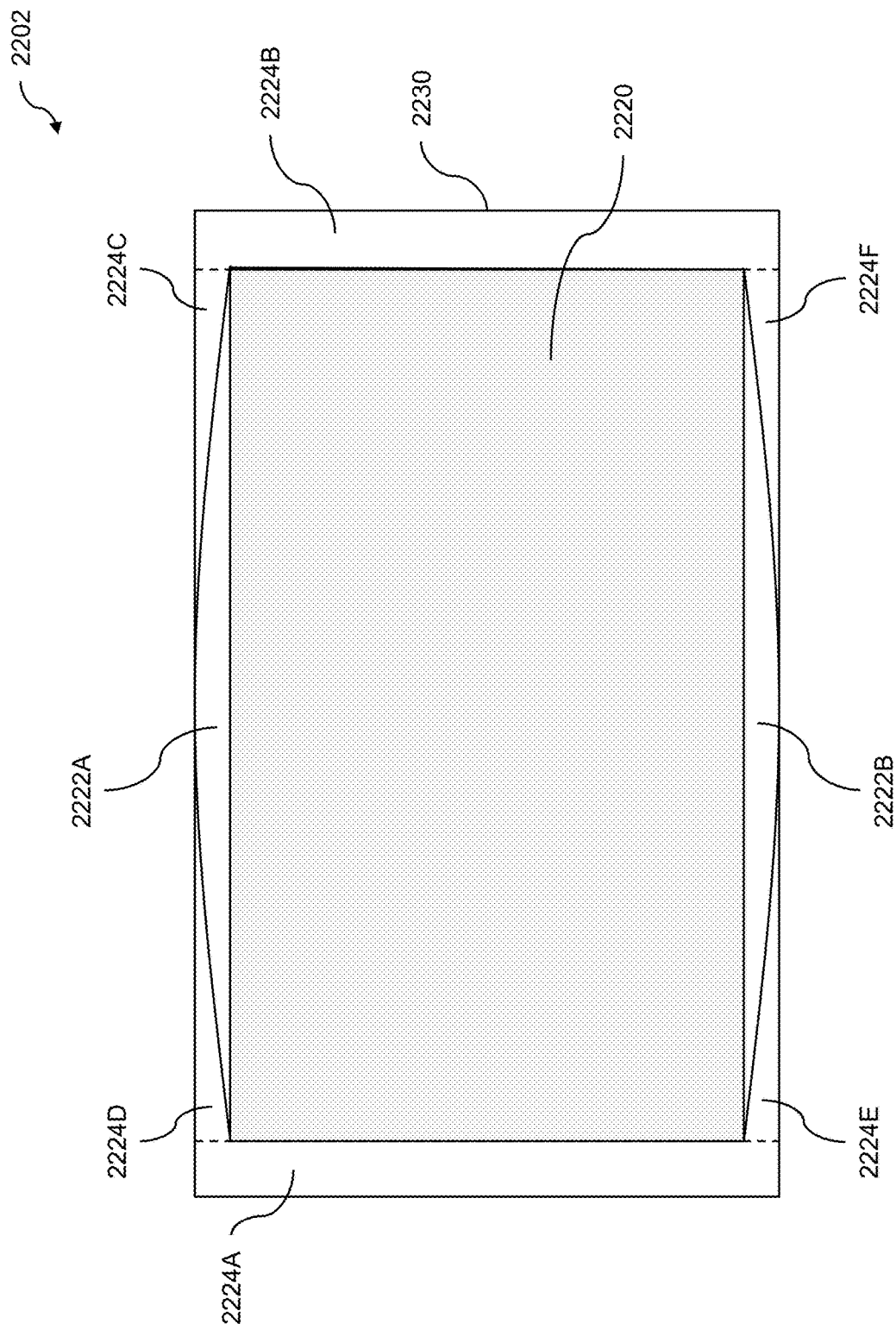
FIG. 22B illustrates an expanded video as device viewport is rotated.

FIG. 22B illustrates an expanded video as the device viewport is rotated. On the other hand, in the proposed system, as shown in 2202, the original video is 2220 and the visible area on a viewport is 2230. The visible area 2230 fully contains the original video of 2220, which indicates no loss of video content in visible regions. The video is expanded to fill in the extended regions 2224 (as illustrated by 2224A and 2224B to the sides and 2224C, 2224D, 2224E, and 2224F to the top and bottom). Furthermore, 2222A on the top and 2222B on the bottom illustrate additional portions of video that are captured on the viewport (while they would be lost in the illustration 2200). In one implementation, the extended regions 2224 may be filled with video image that is generated by image processing and/or machine learning techniques to fill in the peripheral regions of the viewport 2230 beyond the size of the original video is 2220. For example, the content of the extended regions 2224 may be generated so as to show seamless extension of the video from size 2220 to viewport visible area 2230.

The video extrapolation or extend technology disclosed in FIGS. 22A and 22B allows users to view video on the viewport without any side or top edges as the viewport is tilted to the clockwise or counterclockwise direction compared to a vertical axis of the viewport.

Figure 23A:
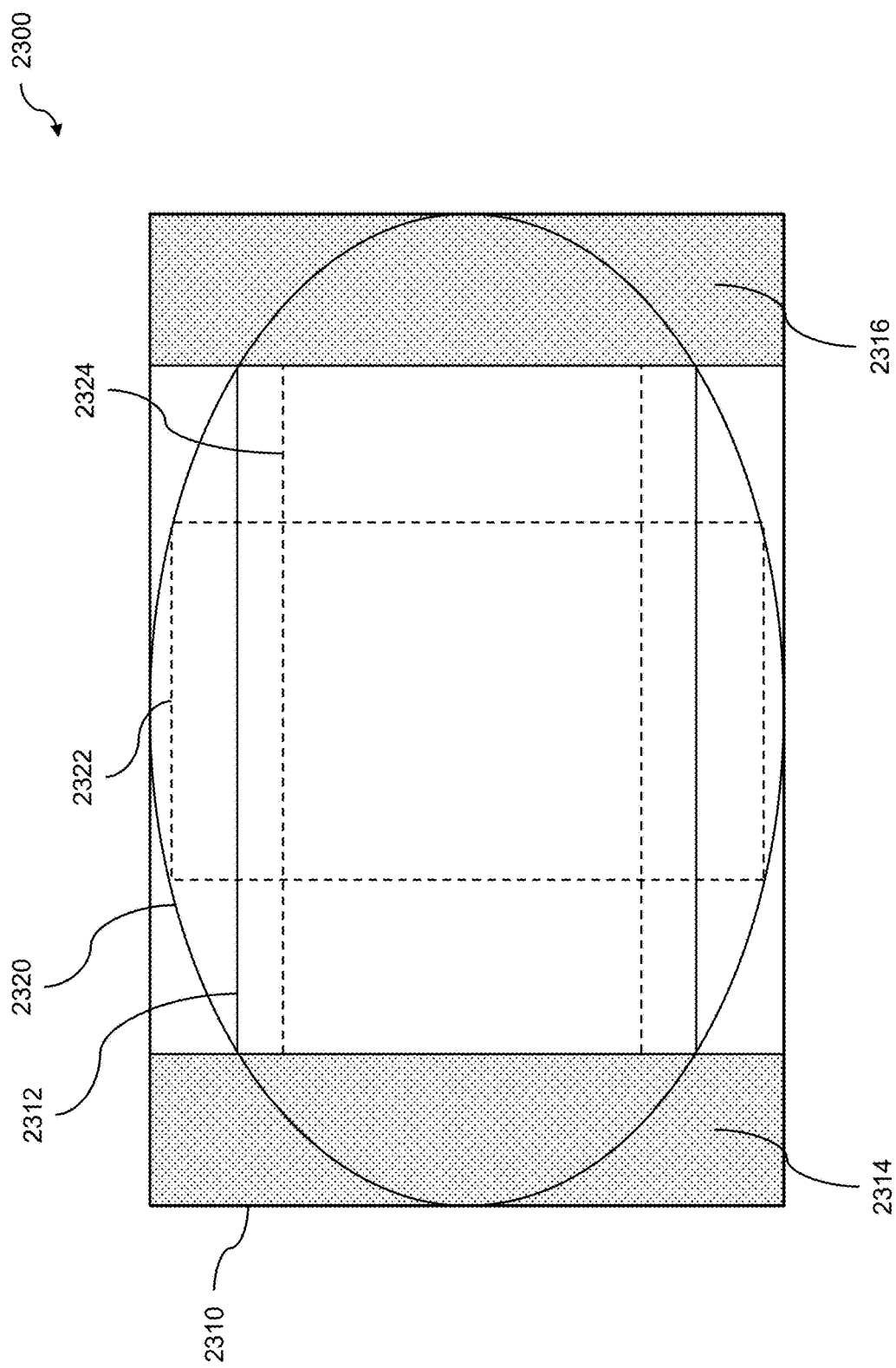
FIG. 23A shows a display with abandoned video portions.

FIG. 23A shows a display with abandoned video portions. Discussed throughout, a video, such as a movie, TV series, educational program, political message, etc., can be rendered on a display. In embodiments, portions of the video can be abandoned, where the abandonment can be based on parameters associated with the video and further parameters associated with a display. The abandoning of portions of the video can enable an enhanced or improved viewing of the video on the display due to differences between video and display capabilities, sizes, resolutions, and the like. Abandoning video portions can enable audio and video stream rendering modification based on a device rotation metric. A plurality of parameters pertaining to a video and a second plurality of parameters pertaining to a video display on a device are obtained. A minimum scale value is calculated to inscribe a rectangle within an oval based on a height and a width of the video, wherein a height and a width of the video display define the rectangle. A rectangular portion of the video is rendered on the video display, wherein the rectangular portion is on or inside boundaries of the oval.

Display of a video with abandoned video portions is shown 2300. The video 2310, can include a wide variety of video material, as described above and throughout. The video parameters associated with the video can include an aspect ratio, a resolution, a frame rate, a refresh rate, a color temperature, and the like. The minimum scale that can be calculated can be used to scale the video, resulting in a video rectangle 2312 that can fit within an oval 2320. Since the rectangle 2312 is smaller (in this example) than the original video, then portions of the video such as video portion 2314 and video portion 2316 can be abandoned. In embodiments, the abandonment of the video portions can be accomplished using wide-side trimming of the video. The scaled video can be viewed on an electronic device such as a laptop computer, a smartphone or PDA, a tablet, and the like. Further embodiments can include preprocessing the video using at least one of a video inset and a viewport inset. In this example, two viewports are shown: a viewport with zero degrees of rotation 2322, and a viewport with ninety degrees of rotation 2324. The viewport 2322 can show the video in a vertical or portrait format, and the viewport 2324 can show the video in a horizontal or landscape format.

Figure 23B:
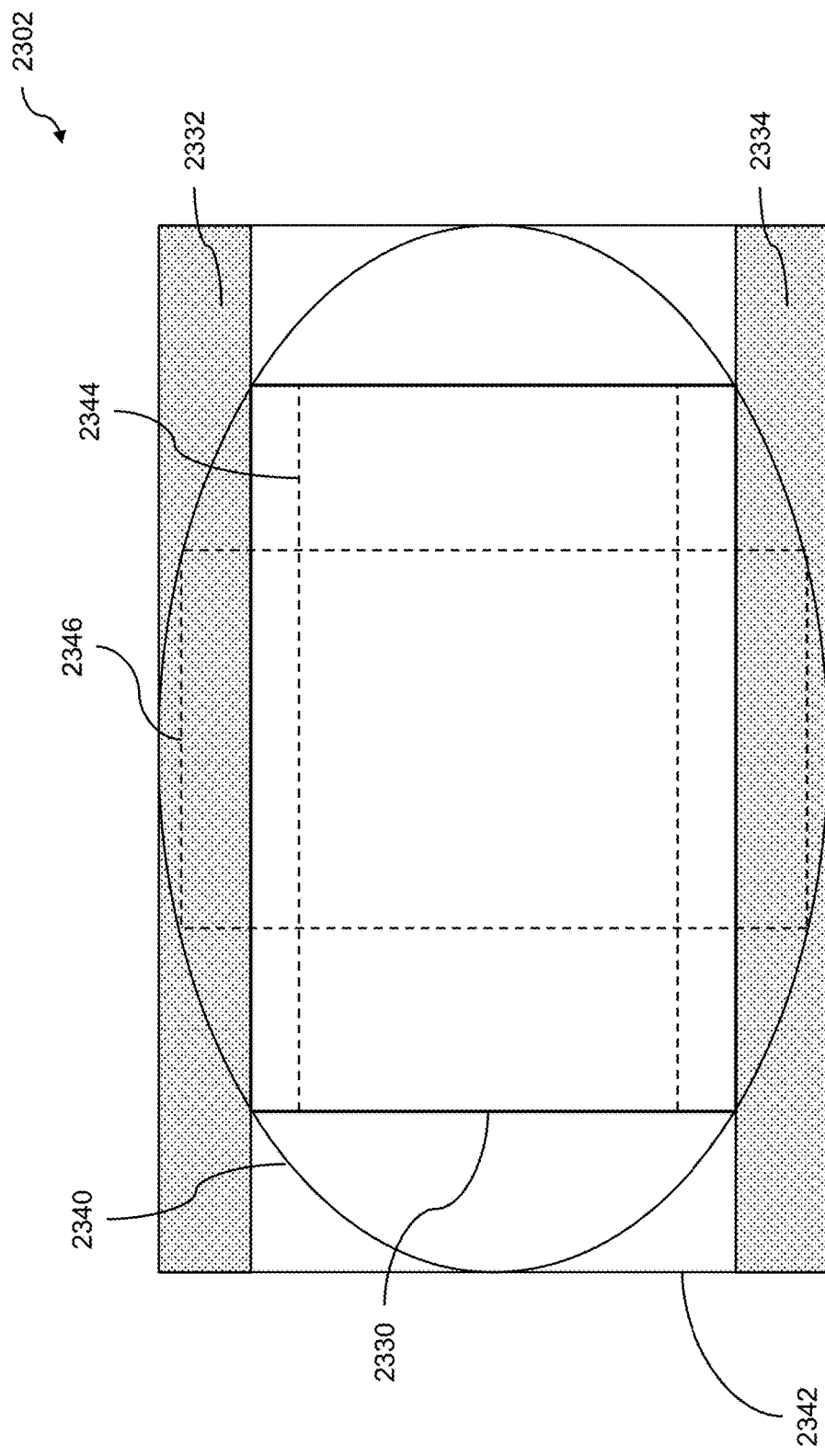
FIG. 23B shows a display with extended video portions.

FIG. 23B shows a display with extended video portions 2302. The video 2330 can be scaled and can be rendered on or inside the boundaries of an oval 2340. The rendering of the video can include displaying the video on a display associated with an electronic device such as a smartphone or tablet, a computing device such as a laptop computer, etc. The oval can have dimensions that enable the oval to fit within a rectangle 2342, where the rectangle can be defined by the width and the height of the device viewing area. The video can be scaled by a factor of one (e.g. unscaled or unaltered) or by another factor. The scaling can be applied to the height of the video and to the width of the video. In embodiments, the scaled value of the height and the scaled value of the width provide expansion of the video. The expansion of the video can include zooming into the video. In embodiments, the expansion of the video maximizes a visible area of the video within the video display. Discussed throughout, the video can be preprocessed using at least one of a video inset and a viewport inset. In the example, two viewports are shown: a horizontal or ninety-degree rotated viewport 2344, and a vertical or zero-degree rotated viewport 2346. Note that the vertical viewport extends above and below the boundaries of the video 2330. Embodiments include filling extended portions of the video with video image data. The extended portions of the video can include extended portion 2332 and extended portion 2334. The extended portions can be filled in using a variety of techniques. In an embodiment, the filling can be accomplished by generating the video image data by image processing. The video data can be generated using techniques including interpolation, extrapolation, and so on. In other embodiments, the filling can be accomplished by generating the video image data by machine learning. The machine learning can be used to analyze a scene and to predict what video image data can be included within extended portion or portions.

Figure 23C:
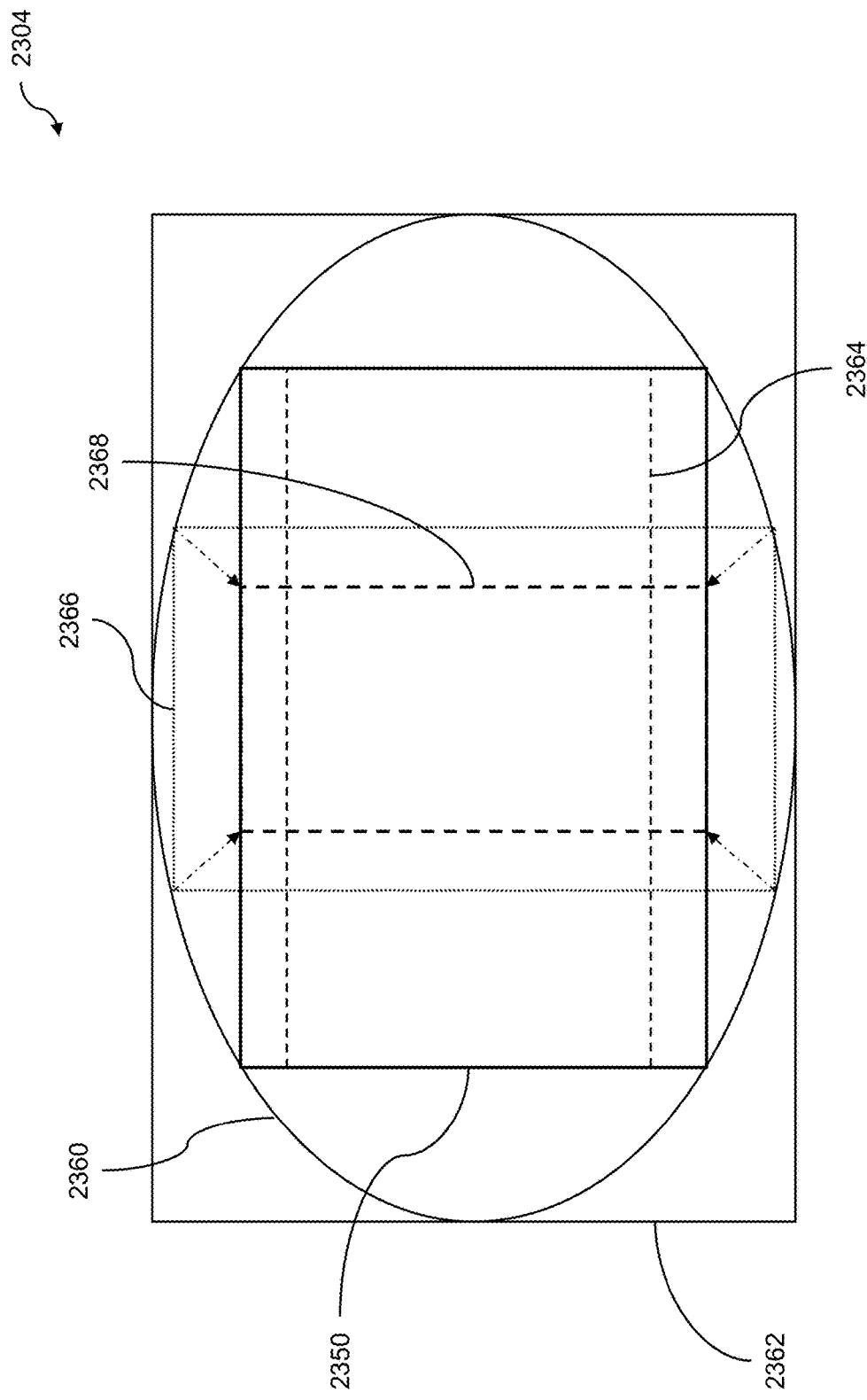
FIG. 23C shows a display with original video.

FIG. 23C shows a display with original video. The original video can be displayed within a viewport. The video can be scaled such that the viewport enables viewing of the original video region without abandoning video data, trimming video data, or filling in video data. A display with original data 2304 supports video performance rendering modification based on a device rotation metric. Discussed above and throughout, the video 2350 can be rendered on or inside the boundaries of an oval 2360, where the rendering of the video includes displaying the video on a personal electronic device, a computing device, and so on. The oval has height and width dimensions that enable the oval to fit within a rectangle 2362. The video can be scaled to fit within the oval or can be left unscaled. The scaling can expand the video to fit within the oval, where the expansion of the video can maximize the visible area of the video. As discussed previously, the video can be preprocessed using at least one of a video inset and a viewport inset. Two viewports are shown, including a horizontal, landscape, or ninety-degree rotated viewport 2364; and a vertical, portrait, or zero-degree rotated viewport 2366. Note that the vertical viewport extends above and below the boundaries of the video 2350. The viewport can be scaled such that the viewport includes the original video region 2368. By scaling the vertical viewport, the original video region can be used without requiring the extended portions of the video to be filled in or trimmed.

Figure 24:
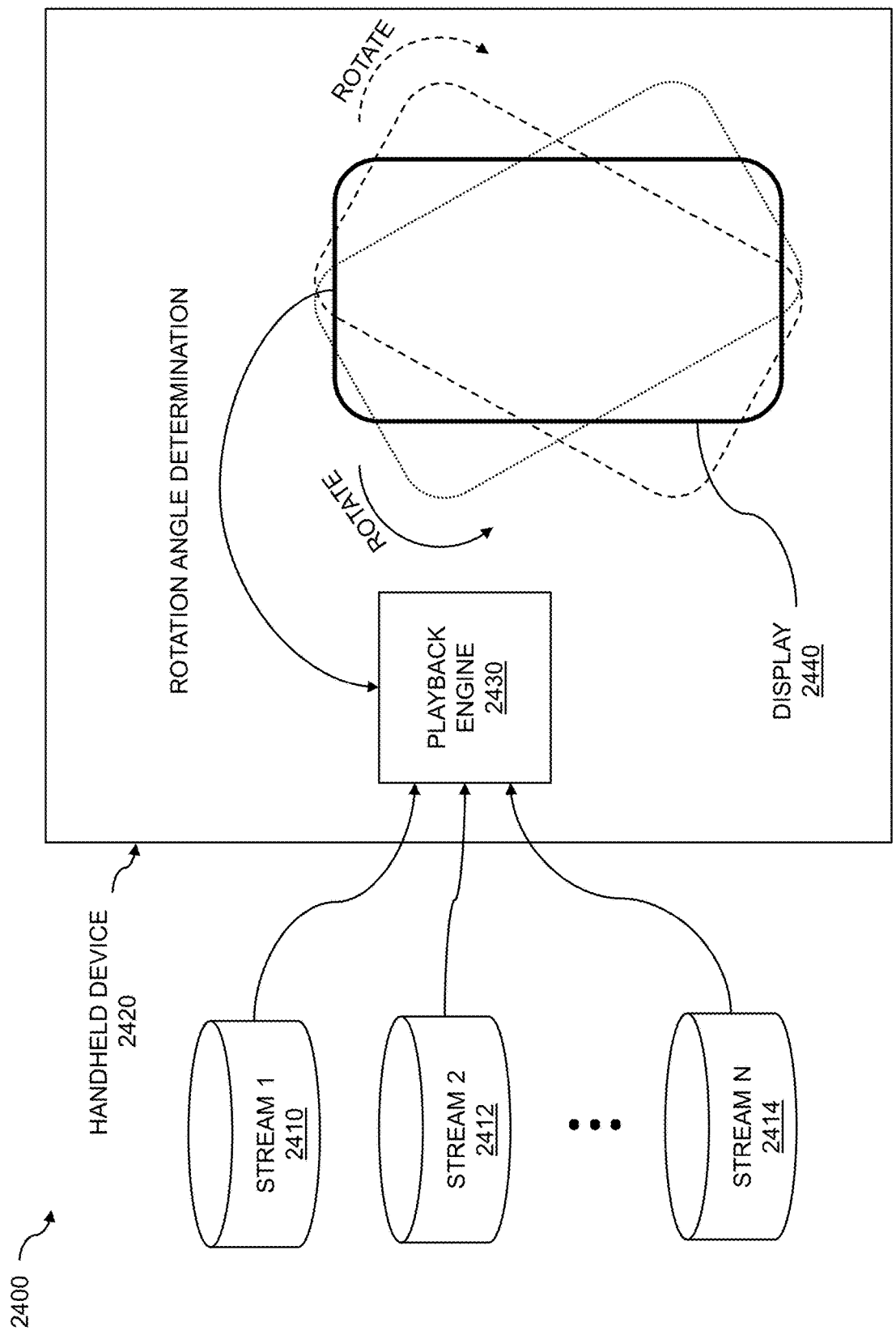
FIG. 24 shows a block diagram for media stream playback.

FIG. 24 shows a block diagram for media stream playback 2400. The media stream playback can include one or more audio streams, one or more video streams, and so on. The one or more media streams can be displayed on a handheld device. The handheld device can be rotated by a user, and the rotation can control how the playback of the one or more media streams occurs. Media stream playback is enabled by video performance rendering modification based on device rotation metric. One or more media streams are received from a server, wherein the one or more media streams are targeted for display on a handheld media stream playback device. An orientation of the handheld device is determined during playback of at least one of the one or more media streams on the handheld device. A change in the orientation of the handheld device is detected, wherein the change occurs during playback of the at least one of the one or more media streams. A rotation angle of the handheld device is calculated, based on the detecting. The playback of at least one of the one or more media streams is changed on the handheld device, based on the rotation angle.

One or more media streams, such as stream 1 2410, stream 2 2412, stream N 2414, and so on, can be stored on a server (not shown). The server can include local server, a remote server, a cloud server, a distributed server, and so on. The server can store media streams, where the media streams can include video streams, audio streams, and so on. The video streams can include videos, short-form videos, and the like. The audio streams can include single channel audio (mono), multichannel audio (stereo, 5.1, Atmos™), and the like. The media streams that can be stored on the server can be uploaded by a user, downloaded over a computer network such as the Internet, etc. The media streams can be played back on a handheld device 2420. The handheld device can include a smartphone, a tablet, a personal digital assistant (PDA), a dedicated media stream playback device, and so on.

The handheld device can include a playback engine 2430. The playback engine can include electronic hardware coupled to the handheld device, a program, code, or app loaded onto and executing on the handheld device, etc. The playback engine can receive one or more video streams from the server. The playback engine can target the one or more media streams for display on the handheld device. The handheld device can include a display 2440. The display can include an LCD display, an LED display, and so on. The display can include a touch screen display, where the touch screen display can respond to an amount of pressure exerted by a user of the handheld device. The display can be rotated by the user. The rotation of the display can include rotating the display clockwise or counterclockwise, tipping the screen away from or toward the user, etc. The rotation of the display can include changing orientation of the display from a vertical orientation to a horizontal orientation; from a horizontal orientation to a vertical orientation; or to an angle corresponding to an orientation between horizontal and vertical. The orientation of the display associated with the handheld device can be determined by detecting a change in orientation of the handheld device.

The determined rotation angle can be provided to the playback engine. The playback engine can change the playback of the one or more media streams on the handheld device based on the rotation angle. The rotation angle can be used by the playback engine to combine media streams or to "de-combine" media streams. The rotation angle can be used to speed up, slow down, pause, start, etc., the media streams. In embodiments, the rotation angle can be used to generate a rotation metric. The rotation metric can impact zoom calculations and renderings for a multiple media stream view playback on the handheld device. Recall that captions can be displayed with the media streams. Embodiments include changing the playback, the caption, and the one or more media streams, based on the rotation angle. The rotation angle can be used to further control the playback of the one or more media streams on the handheld device. The rotation angle can be used to cover peripheral regions of a video display beyond content contained in the at least one of the one or more media streams. The covering peripheral regions can include displaying a frame, a mask, and so on with the one or more media streams. Other embodiments include filling extended portions of the at least one of the one or more media streams with video image data. In a usage example, a user could rotate her handheld device to the right, left, up, or down to "see" to the right, left, up, or down in the media stream. The filling extended portions of a media stream can be accomplished with video image data. In other embodiments, the filling can be accomplished by generating the video image data by image processing.

In some embodiments, the audio frequencies can be adjusted to compensate for the speedup and/or slowdown of a video being played. The audio frequency compensation can help avoid having a "chipmunk sound" (too fast) or a "monster sound" (too slow) due to changing the playback speed of the accompanying video stream. Alternatively, the audio volume can be adjusted to compensate for the speedup and/or slowdown of a video being played. The audio volume compensation can provide a quieting or muting of the sound level during speed up and/or slowdown of a video being played to help avoid audio distraction.

Figure 25:
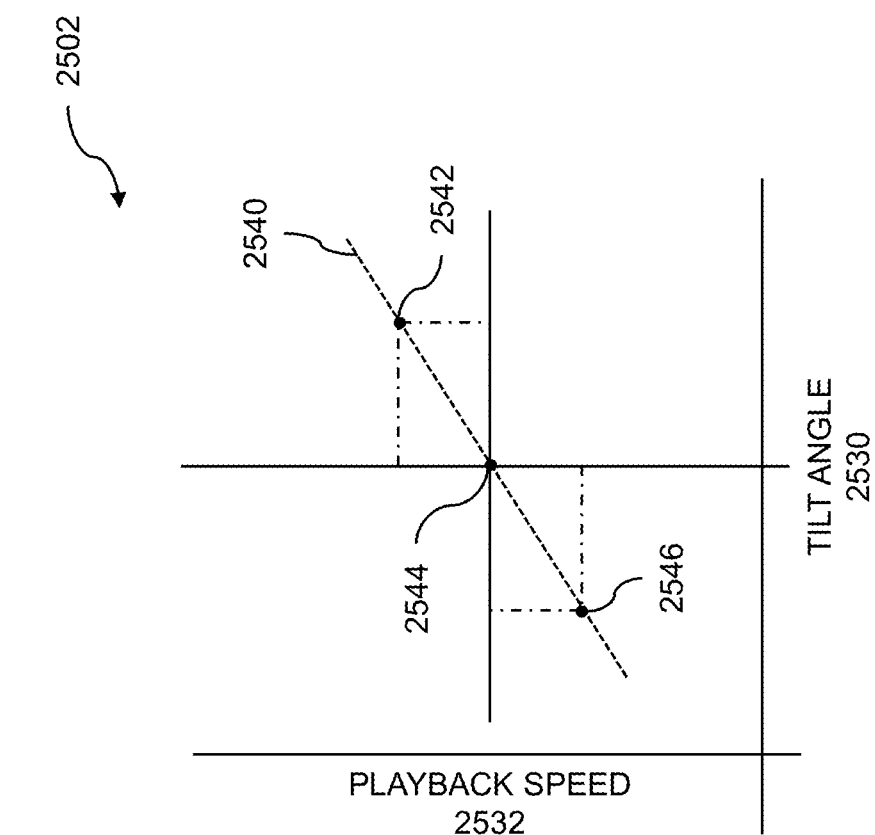
FIG. 25 illustrates linear changing of playback speed.
Figure 25:
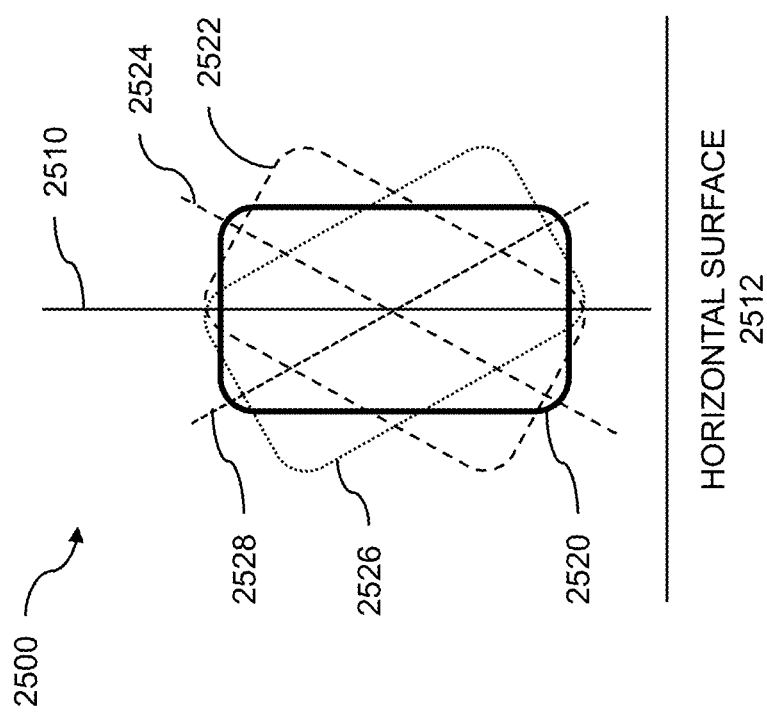

FIG. 25 shows linear changing of playback speed. A media stream can be rendered on a handheld device such as a mobile device. The handheld device can be oriented in a substantially horizontal orientation or a substantially vertical orientation, or can be oriented at an angle between horizontal (0 degrees) and vertical (90 degrees). Playback of the media stream can be accomplished on a handheld device that is substantially vertical, substantially horizontal, or at an intermediate angle. The media stream can include a video stream, one or more audio streams, captions, and so on. If the handheld device is rotated from an original orientation to an angle between horizontal and vertical, then the playback speed of the media stream can be controlled as the media stream is played back on the handheld device. The rendered content can be based on a framework. Media stream playback based on an intermediate viewport angle enables video performance rendering modification based on a device rotation metric. The framework can include media streams, including video, audio streams, additional information, and so on. A handheld device at various orientations is shown 2500. The handheld device 2520 is shown at a center axis orientation 2510 relative to a horizontal surface 2512. The handheld device 2520 can include a mobile device such as a smartphone, tablet, PDA, media player, etc. The horizontal surface can include the earth, an object of furniture, etc. The changes in orientation of the handheld device can be determined relative to the central axis of the device 2510. The orientation of the handheld device can be changed by rotating the device. The handheld device can be rotated clockwise to a second position 2522. The center axis of the handheld device is similarly rotated to the new orientation 2524. An angle of rotation can be determined between the original orientation of the handheld device and the clockwise rotated orientation of the device. The handheld device can be rotated counterclockwise to a third position 2526. The center axis of the handheld device is similarly rotated to the new counterclockwise orientation 2528. An angle of rotation can be determined between the original orientation of the handheld device and the counterclockwise rotated orientation of the device.

Linear changes in playback speed are shown 2502. Based on a tilt angle 2530, a playback speed 2532 can be determined. A given tilt angle can be used to determine a playback speed based on a linear function such as a linear function represented by the line 2540. The tilt angle is based on an angle of rotation of the handheld device. Various playback speeds based on tilt angles are shown. Rotating the handheld device in a positive or clockwise direction can result in a faster playback speed. In a usage example, the user rotates her handheld device in a clockwise direction to a rotation or tilt angle represented by point 2542. The media stream is played back on the handheld device at a corresponding, increased or faster playback speed. The user can rotate her handheld device back to an original orientation represented by point 2544. The handheld device can be in a vertical orientation or a parallel orientation and is parallel to a horizontal surface. As a result, the rotation angle is 0 degrees and the playback speed can include a normal or standard playback speed. The user can further rotate her handheld device in a counterclockwise direction to a rotation angle represented by point 2546. The "negative" rotation angle can correspond to a reduced or slowed playback speed. The slowed playback speed can include a frame by frame playback, slo-mo playback, and the like.

Figure 26:
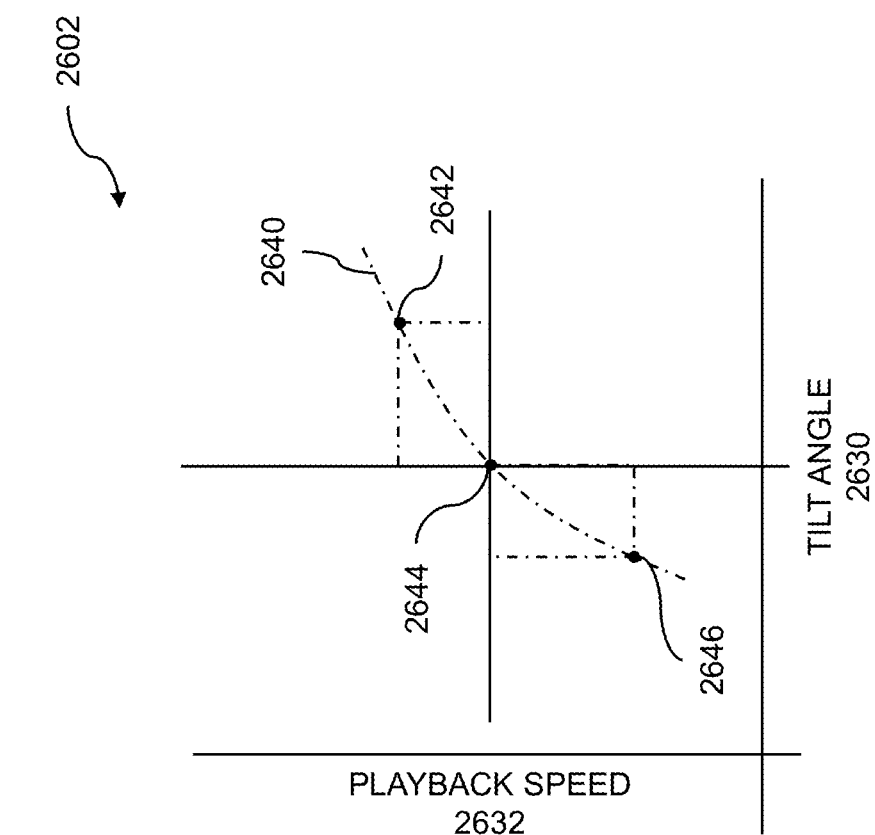
FIG. 26 illustrates nonlinear changing of playback speed.
Figure 26:
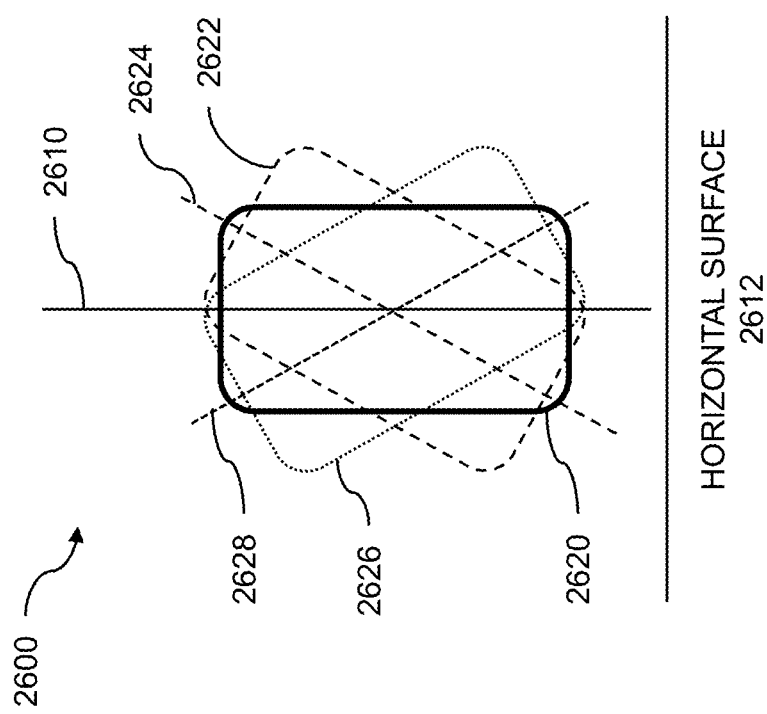

FIG. 26 illustrates nonlinear changing of playback speed. While linear changing of playback speed of a media stream has been discussed, the function used to control the playback speed need not be linear. An example of nonlinear changing of playback speed is shown 2600. Nonlinear changing of playback speed enables video performance rendering modification based on device rotation metric. The media stream that is played back can include a video stream, one or more audio streams, and so on. Discussed throughout, if the handheld device is rotated from an original orientation to an angle between horizontal and vertical, then the playback speed of the media stream can be changed. The playback speed of a media stream on the handheld device can include a nominal or "normal speed" playback, an accelerated or faster playback, a decelerated or slower playback, etc. An example handheld device such as a smartphone or tablet is shown at various orientations. The handheld device 2620 is shown with a center axis orientation 2610 relative to a horizontal surface 2612. The changes in orientation of the handheld device can be determined relative to the central axis of the device 2610. The orientation of the handheld device can be changed by rotating the device. The handheld device can undergo a clockwise rotation to a target second position 2622. The center axis orientation of the handheld device is similarly rotated to the new orientation 2624. A rotation angle can be determined between the original orientation of the handheld device and the clockwise rotated orientation of the device. The handheld device can be rotated counterclockwise to a third position 2626. The center axis of the handheld device is similarly rotated to the new counterclockwise orientation 2628. A rotation angle can be determined between the original orientation of the handheld device and the counterclockwise rotated orientation of the device.

Nonlinear changes in playback speed of a media stream are shown 2602. Nonlinear changes in playback speed differ from linear changes in playback speed by using a different function to determine a corresponding playback speed for a given rotation or tilt angle. A playback speed 2632 can be determined based on a tilt angle 2630. A tilt angle can be used to determine a playback speed based on a nonlinear function such as a nonlinear function represented by the line 2640. The tilt angle is based on an angle of rotation or tilt of the handheld device. Three example playback speeds based on tilt angles are shown. Rotating the handheld device in a positive or clockwise direction can result in a faster playback speed relative to a nominal (e.g. standard playback) speed. Since the tilt angle to playback speed function is nonlinear, then small changes of the rotation angle can effect larger changes on the playback speed in comparison to changes based on the linear function. In a usage example, the user rotates her handheld device in a clockwise direction to a rotation or tilt angle represented by point 2642. The media stream is played back on the handheld device at a corresponding, increased or faster playback speed. The user can rotate her handheld device back to an original orientation represented by point 2644 to return playback speed to normal speed. The handheld device can be in a vertical orientation or a parallel orientation and is parallel to a horizontal surface. The user can further rotate her handheld device in a counterclockwise direction to a second rotation angle represented by point 2646. The "negative" rotation angle can correspond to a reduced or slowed playback speed.

Figure 27:
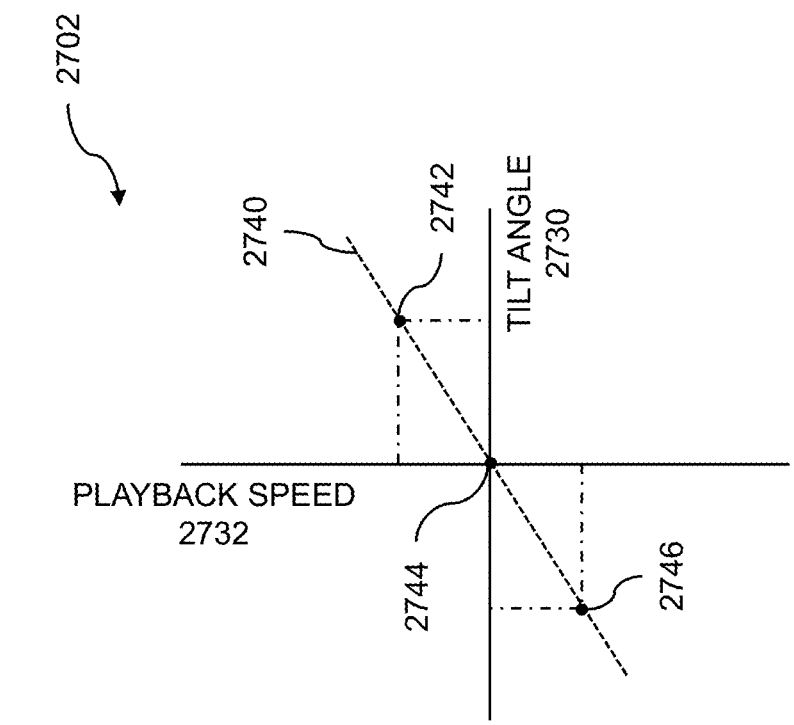
FIG. 27 illustrates linear changing of playback direction.
Figure 27:
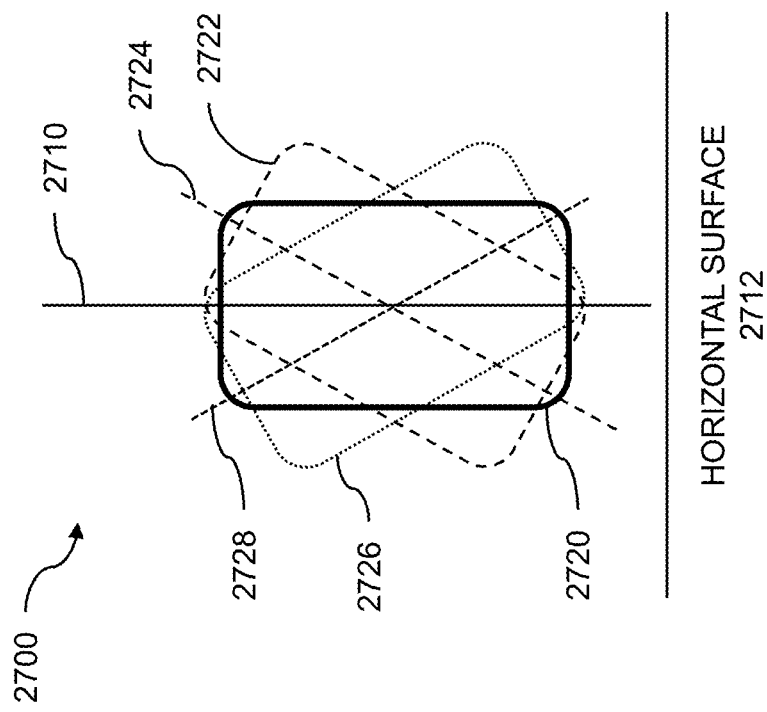

FIG. 27 shows linear changing of playback direction. Discussed throughout, media stream playback can be modified by rotating a handheld device on which the media stream is rendered. In addition to changing playback speed, the playback direction can also be modified. The amount of change of playback direction with respect to rotation angle of the handheld device enables video performance rendering modification based on a device rotation metric. Recall that playback of the media stream can be accomplished while the handheld device is oriented at a substantially vertical, substantially horizontal, or at an intermediate angle. If the handheld device is rotated from an original orientation to an angle between horizontal and vertical, then the playback direction of the media stream can be controlled as the media stream is played back on the handheld device. The rendered content can be based on a framework. A handheld device at various orientations is shown 2700. The handheld device 2720 is shown at an orientation with a center axis orientation 2710 relative to a horizontal surface 2712. Changes in orientation of the handheld device can be determined relative to the central axis 2710 of the device. The orientation of the handheld device can be changed by rotating the device. The handheld device can be rotated clockwise to a second position 2722 with the center axis similarly rotated to the second orientation 2724. A rotation angle can be determined between the original orientation of the center axis of the handheld device and the clockwise rotated or second orientation of the device. The handheld device can be rotated counterclockwise to a third position 2726. The center axis of the handheld device is similarly rotated to a third, counterclockwise orientation 2728. A second rotation angle can be determined between the original orientation of the handheld device and the counterclockwise rotated orientation of the device.

Changes in playback direction can be based on a function. Linear changes in playback direction are shown 2702. Based on a rotation or tilt angle 2730, a playback direction and speed 2732 can be determined. For a given tilt angle, a playback direction can be determined based on a linear function such as a linear function represented by the line 2740. The tilt angle is based on a rotation angle of the handheld device. Forward, backward, and "neutral" (e.g. paused) playback directions based on tilt angles are shown. Rotating the handheld device in a positive or clockwise direction can result in a forward playback direction. The clockwise rotation can further effect faster playback speed. In a usage example, the user rotates her handheld device in a clockwise direction to a rotation or tilt angle represented by point 2742. The media stream is played back on the handheld device in a forward direction and at a corresponding, increased or faster playback speed. The user can rotate her handheld device back to an original orientation represented by point 2744. The handheld device can be in a vertical orientation or a parallel orientation and is parallel to a horizontal surface. The rotation angle at 2744 corresponds to 0 degrees and the playback direction is neutral. The user can further rotate her handheld device in a counterclockwise direction to a rotation angle represented by point 2746. The "negative" rotation angle can correspond to a reverse playback direction and can include a corresponding reverse playback speed.

Figure 28:
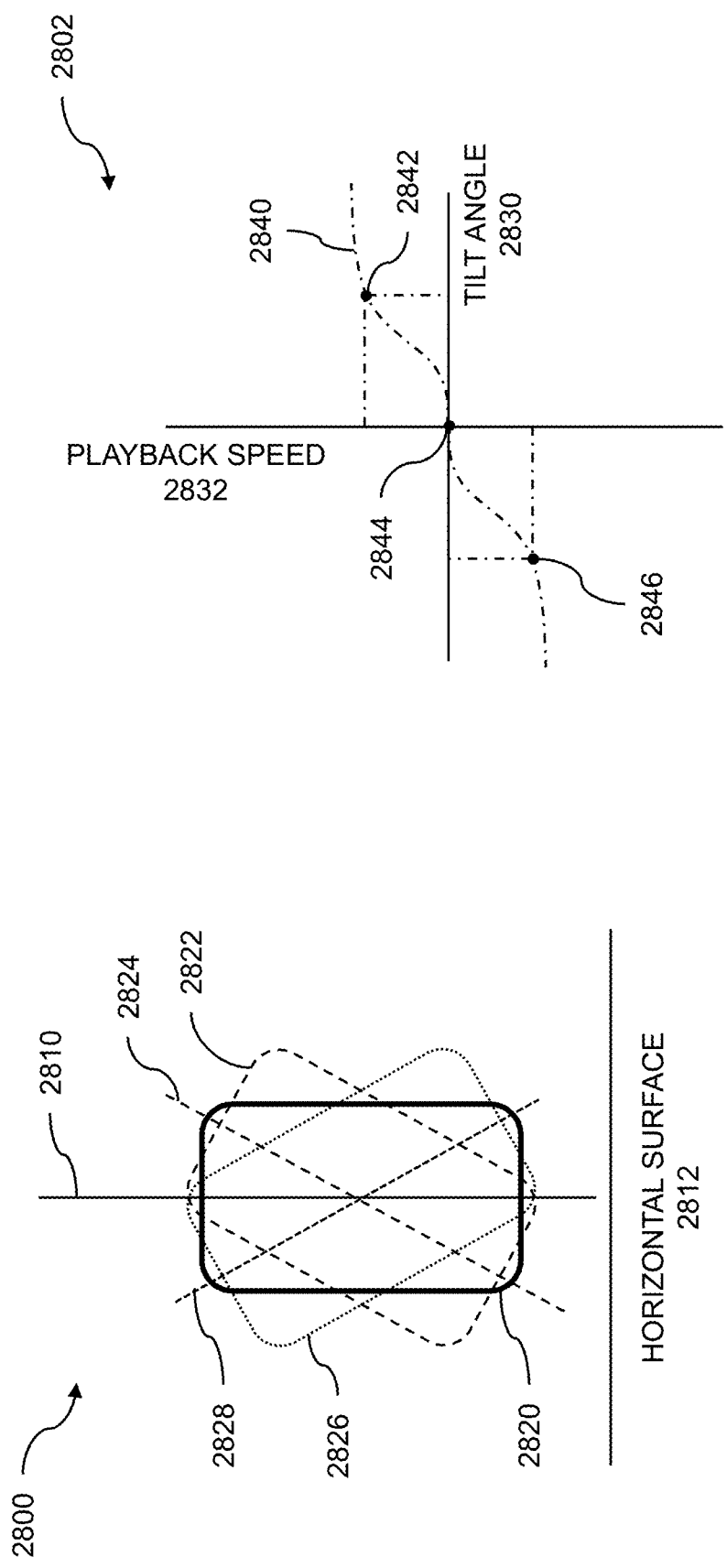
FIG. 28 shows nonlinear changing of playback direction.

FIG. 28 illustrates nonlinear changing of playback direction. The modification of media stream playback direction corresponding to rotation of a handheld device on which the media stream is rendered can be nonlinear. The nonlinear change of playback direction with respect to rotation angle of the handheld device enables video performance rendering modification based on a device rotation metric. Playback of the media stream, which can include a video stream and one or more audio streams, can be accomplished while the handheld device is oriented at a substantially vertical, substantially horizontal, or at an intermediate angle between horizontal (0 degrees) and vertical (90 degrees). Rotating the handheld device from an original orientation to second orientation such as an angle between horizontal and vertical can change the playback direction of the media stream as the media stream is played back on the handheld device. A handheld device in three orientations is shown 2800. The handheld device 2820 is shown at an orientation with a center axis orientation 2810 relative to a horizontal surface 2812. Changes in orientation of the handheld device can be determined relative to the central axis 2810 of the device. The orientation of the handheld device can be changed by rotating the device. The handheld device can be rotated clockwise to a second orientation 2822 with the center axis similarly rotated to the second orientation 2824. A rotation angle can be calculated between the original center axis orientation of the handheld device and the clockwise rotated or second orientation of the device. The handheld device can be rotated counterclockwise to a third orientation 2826. The center axis of the handheld device is similarly rotated to a third, counterclockwise orientation 2828. A second rotation angle can be determined between the original orientation of the handheld device and the counterclockwise rotated orientation of the device.

Changes in playback direction can be based on a function such as a nonlinear function 2802. Based on a rotation or tilt angle 2830, a playback direction and speed 2832 can be determined. A playback direction for on a given tilt angle can be determined based on a nonlinear function such as a nonlinear function represented by the curve 2840, where the tilt angle is based on a rotation angle of the handheld device. Forward, backward, and "neutral" (e.g. paused) playback directions based on tilt angles are shown. The playback direction can include a playback speed. Rotating the handheld device in a clockwise direction can result in a forward playback direction and a forward playback direction speed. The playback speed in the forward direction can include slow, normal, and fast playback speeds. In a usage example, the user rotates her handheld device in a clockwise direction to a rotation or tilt angle represented by point 2842. The media stream is played back on the handheld device in a forward direction and at a corresponding, increased or faster playback speed. Note that the bottom end of the curve (e.g. near the axes origin) playback speed in the forward direction varies little for increasing tilt angle. This behavior of changes in playback speed can offer the user greater control over forward playback speeds. The user can rotate her handheld device back to an original orientation represented by point 2844. At the axes origin represented by point 2844, handheld device rotation angle can be substantially zero resulting in a playback direction of zero. Zero direction in this context is defined as pausing or stopping the playback of the media stream. The user can further rotate her handheld device in a counterclockwise direction to a rotation angle represented by point 2846. The "negative" rotation angle can correspond to a reverse playback direction and can include a corresponding reverse playback speed.

Figure 29:
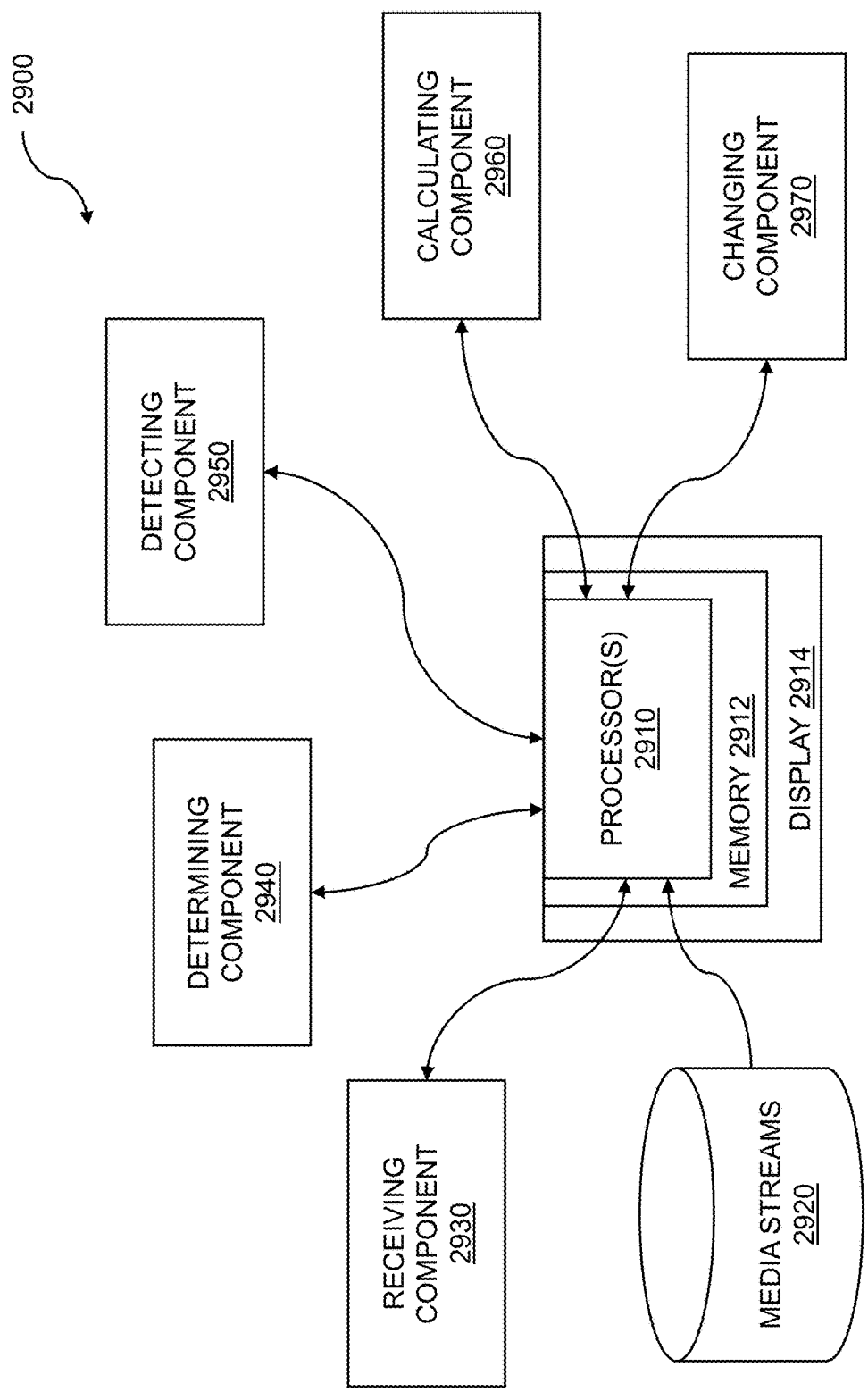
FIG. 29 is a system diagram for media stream playback.

FIG. 29 is a system diagram for media stream playback. Media stream playback can be based on video performance rendering modification based on a device rotation metric. The system 2900 can include one or more processors 2910 coupled to a memory 2912 which stores instructions. The system 2900 can include a display 2914 coupled to the one or more processors 2910 for displaying data, videos, intermediate steps, instructions, short-form videos, and so on. In embodiments, one or more processors 2910 are coupled to the memory 2912 where the one or more processors, when executing the instructions which are stored, are configured to perform: receiving a media stream from a server, wherein the media stream is targeted for display on a handheld media stream playback device; determining an orientation of the handheld device during playback of the media stream on the handheld device; detecting a change of the orientation of the handheld device, wherein the change occurs during playback of the media stream; calculating a rotation angle of the handheld device, based on the detecting; and changing playback speed of the media stream on the handheld device, based on the rotation angle The system 2900 can include a collection or repository of videos and data represented as media streams 2920. The videos and data of media streams 2920 may be stored in storage such as electronic storage coupled to the one or more processors, a database, one or more statically linked libraries, one or more dynamically linked libraries, or other appropriate video or data media stream formats. The media streams can include a variety of media content such as movies, television series, news programs, sporting events, political debates, videos, short-form videos, video frames, composite videos, and the like. The data can include data associated with video displays, media stream metadata, and so on. The videos or other media content can present a story, an advertisement, a political message, an educational segment, and the like. A media stream such as a video or a short-form video can include a video from among a plurality of videos, where the videos can comprise a wide range or variety of content. The data can include textual information or data that can be associated with a media stream, as discussed below. The textual information can be augmented with image information, themes, and so on.

The system 2900 can include a receiving component 2930. The receiving component 2930 can enable the system 2900 to receive a media stream 2920 from a server for audio and video stream rendering modification based on a device rotation metric. The receiving component can be included within a device that also includes processor 2910, memory 2912, and/or display 2914. The receiving component 2930 can be included externally from other components of the system 2900. The receiving component 2930 can receive media streams 2920 from a network, such as the Internet or other suitable network. The media stream is targeted for display on a handheld media stream playback device. The server can include a local server, a remote server, a cloud-based server, a distributed server, and so on. The handheld media stream playback device can include a personal electronic device such as a smartphone, a tablet, a PDA, and the like. The handheld device can display one or more media streams substantially simultaneously. The media stream can include videos, short-form videos, etc. The media stream that is received can be downloaded from or recommended by a library of media streams on the server, selected by a user, provided to a user, crowdsourced by users, etc. The media stream, videos, short-form videos, etc., can include a variety of content. The media stream can include travel videos, cooking videos, home-improvement videos, makeup videos, animal videos, and the like. The media stream can include an aspect ratio, a resolution, a range of color temperatures, a range of brightness, etc., appropriate for display on the handheld media stream playback device. The receiving component may further perform media stream analysis such as video scene analysis, where video scene analysis is performed on each of the plurality of videos. The video scene analysis can include detecting video cuts, video content, and so on.

The system 2900 can include a determining component 2940. The determining component 2940 can include functions and instructions for determining a plurality of parameters pertaining to a video and a second plurality of parameters pertaining to a video display, including an orientation of the handheld device during playback of the media stream on the handheld device. The orientation can be determined in an absolute sense, such as by using a compass-based direction or a gravity-based position. Alternatively, the orientation can be determined in a relative sense, such as by using an accelerometer-based change of device position from an arbitrary starting point, for example, the orientation of the device when playback is first initiated. The plurality of parameters pertaining to the video can include video content, resolution, duration, digital rights management information, and so on. Embodiments include determining various parameters of the video including size of the video, the size of a viewport, a rotation angle of a viewport, and a scale factor. The second plurality of parameters pertaining to a video display can include display type, size, resolution, refresh rate, color temperature, display orientation (relative or absolute), etc. The orientation of the handheld device can include an orientation of a display screen associated with the handheld device. In embodiments, the orientation of the handheld device can include a substantially vertical orientation, a substantially horizontal orientation, a rotated orientation relative to horizontal or vertical, and so on. The orientation can include a clockwise rotation of the handheld device, a counterclockwise rotation of the handheld device, etc. The orientation of the handheld device can affect playback of media streams by effecting media stream playback speed changes. Discussed below, the orientation of the handheld device can cause a change in playback speed and playback direction of the media stream on the handheld device. In embodiments, the changing the playback speed can include changing speed at which the media stream is rendered on the handheld device. The playback speed can be changed by playing fewer frames to slow down playback, playing more frames to speed up playback, playing the same number of frames at a lower or higher frames per second (fps) rate, and the like. The playback direction can be controlled based on rotation of the handheld device relative to an original orientation of the handheld device. In a usage example, the playback direction can include a forward direction when the handheld device is rotated clockwise, a backward direction when the handheld device is rotated counterclockwise, and the like.

The system 2900 can include a detecting component 2950. The detecting component 2950 can include functions and instructions for detecting the change of a plurality of parameters pertaining to a video stream and a video stream display, including detecting a change of an orientation of the handheld device during playback of the media stream on the handheld device. The change that is detected by detecting component 2950 can be a relative change, an absolute change, or a combination of both relative and absolute changes. The change of orientation of the handheld device can include changing orientation from horizontal to vertical, vertical to horizontal, or changing to an orientation based on any angle between vertical and horizontal. The change of orientation of the handheld device occurs during playback of the media stream. The change of orientation can occur in a three-dimensional (3D) space, including orientation changes of roll, pitch, and yaw. The system 2900 can accommodate the 3D changes by the same or different responses. For example, a change in orientation from portrait to landscape may invoke one type of change, whereas a change in orientation from vertical to horizontal may invoke the same or a different type of change.

The system 2900 can include a calculating component 2960. The calculating component 2960 can include functions and instructions for calculating a rotation angle of the playback device, based on determining an initial orientation of the playback device and detecting a change in the orientation of the handheld playback device. The initial orientation and the change in orientation can be relative amounts, absolute amounts, or a combination of both relative and absolute amounts. The calculating component 2960 can calculate a rotation metric used to modify or change the media stream. The calculating the rotation angle can determine an angle based on degrees, radians, etc. In embodiments, the rotation angle can be used to generate a rotation metric wherein the rotation metric impacts zoom calculations and renderings for the playback. In a usage example, a user changing the rotation angle of her handheld device by tipping the handheld device away from herself might zoom out the media stream, while tipping the device toward herself might zoom in the media stream. Rotating the handheld device clockwise or counterclockwise can change the playback speed of the media stream. The rotation angle can further be used to change playback direction of the media stream.

The system 2900 can include a changing component 2970. The changing component 2970 can include functions and instructions for modifying a video stream. The changing component 2970 can include functions and instructions for audio and video stream rendering modification based on a device rotation metric. The rendering can be based on the gravity sensor data, trimming, zooming, and the like. The rendering can include displaying the video in the rectangle. As discussed throughout, displaying in the rectangle can be based on scaling, zooming, trimming, etc. The rendering can include a visible video mask, where the visible video mask can be generated by rotating the rectangle. In embodiments, the rendering can include communicating the visible video mask to a user and overlaying the visible video mask on a video recording device screen. The video recording device can include a digital video recording device such as a video camera, a web camera (webcam), etc. The rendering can be based on a rotation metric that is calculated for a handheld video and audio media stream playback device. The changing can include changing playback speed of the media stream. Embodiments include changing the playback speed of the media stream to a faster or slower speed, pausing the playback, etc., based on the rotation angle. The changing can include changing playback direction of the media stream. Embodiments include changing the playback direction of the media stream to a forward direction or a backward direction, based on the rotation angle.

Consider a usage example in which a user is holding her handheld device in a horizontal direction to view her selected media stream. The playback can be changed with respect to speed and direction by rotating the handheld device. The changing the playback speed comprises changing speed at which the media stream is rendered on the handheld device. To start forward playback of the media stream, the user starts to rotate her device in a clockwise direction. As the device is rotated farther in the clockwise direction, the playback speed of the media presentation increases. The playback speed can include a frame by frame playback, a normal viewing speed, a slow motion or "slo-mo" speed, a fast-forward speed, etc. Rotating the handheld device back to a vertical orientation can pause or stop playback. If the user desires to revisit or review a section of the media stream, she begins to rotate her handheld device in a counterclockwise direction. As the device is rotated counterclockwise direction, the media stream playback is reversed. If the device is rotated farther in a counterclockwise direction, the rate of reverse playback of the media stream increases. The reversed playback speed can range from a slow, frame-by-frame, playback to a fast reverse playback.

The system 2900 can include a computer program product embodied in a non-transitory computer readable medium for media stream playback, the computer program product comprising code which causes one or more processors to perform operations of: receiving a media stream from a server, wherein the media stream is targeted for display on a handheld media stream playback device; determining an orientation of the handheld device during playback of the media stream on the handheld device; detecting a change in the orientation of the handheld device, wherein the change occurs during playback of the media stream; calculating a rotation angle of the handheld device, based on the detecting; and changing playback speed of the media stream on the handheld device, based on the rotation angle.

The system 2900 can provide a computer system for media stream playback comprising: a memory which stores instructions; one or more processors coupled to the memory wherein the one or more processors, when executing the instructions which are stored, are configured to perform: receiving a media stream from a server, wherein the media stream is targeted for display on a handheld media stream playback device; determining an orientation of the handheld device during playback of the media stream on the handheld device; detecting a change in the orientation of the handheld device, wherein the change occurs during playback of the media stream; calculating a rotation angle of the handheld device, based on the detecting; and changing playback speed of the media stream on the handheld device, based on the rotation angle.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for media stream playback comprising:
    receiving a media stream from a server, wherein the media stream is targeted for display on a handheld media stream playback device;
    determining an orientation of the handheld device during playback of the media stream on the handheld device using data from a gravity sensor;
    detecting a change in the orientation of the handheld device, wherein the change occurs during playback of the media stream, wherein the detecting includes performing a low-pass filtering on the data from the gravity sensor to create a filtered output;
    calculating an intermediate rotation angle of the handheld device, based on the detecting; and
    selectively changing a plurality of parameters associated with the playback of the media stream on the handheld device, based on the intermediate rotation angle of the handheld device, while simultaneously changing playback speed of the media stream on the handheld device, as a function of the intermediate rotation angle and the filtered output of the gravity sensor, and wherein the changing the playback speed comprises changing speed at which the media stream is rendered on the handheld device.

2. The method of claim 1 wherein the changing the playback speed changes a number of frames per second that a video is rendered on the handheld device.

3. The method of claim 1 wherein the changing the playback speed increases the playback speed by rotating the handheld device in a clockwise direction.

4. The method of claim 1 wherein the changing the playback speed decreases the playback speed by rotating the handheld device in a counterclockwise direction.

5. The method of claim 4 wherein the changing the playback speed pauses playback by rotating the handheld device counterclockwise substantially by 90 degrees.

6. The method of claim 1 wherein normal playback speed rendering is accomplished when the handheld device has a display screen in a substantially vertical orientation.

7. The method of claim 6 wherein the normal playback speed matches a speed at which the media stream was recorded.

8. The method of claim 1 wherein the changing the playback speed is a linear function of the rotation angle.

9. The method of claim 1 wherein the changing the playback speed is a nonlinear function of the rotation angle.

10. The method of claim 1 wherein the changing the playback speed comprises changing direction of playback rendering based on the rotation angle of the handheld device.

11. The method of claim 10 wherein the changing direction provides forward playback by rotating the handheld device in a clockwise direction from an initial orientation.

12. The method of claim 11 wherein the playback speed increases to provide faster forward playback as the rotation angle increases in the clockwise direction.

13. The method of claim 10 wherein the changing direction provides backward playback by rotating the handheld device in a counterclockwise direction from an initial orientation.

14. The method of claim 10 wherein an initial orientation for the handheld device has a display screen in a substantially vertical orientation.

15. The method of claim 10 wherein an initial orientation for the handheld device has a display screen in a substantially horizontal orientation.

16. The method of claim 15 wherein playback speed increases as the rotation angle deviates further from the initial orientation.

17. The method of claim 10 wherein the changing the playback speed pauses playback by rotating the handheld device to show a display screen in a substantially vertical orientation.

18. The method of claim 10 wherein the changing the playback speed pauses playback by rotating the handheld device to show a display screen in a substantially horizontal orientation.

19. The method of claim 10 wherein the changing speed changes the playback speed linearly based on the rotation angle.

20. The method of claim 10 wherein the changing speed changes the playback speed nonlinearly based on the rotation angle.

21. The method of claim 1 wherein the calculating the rotation angle is based on one or more motion sensors included in the handheld device.

22. The method of claim 21 wherein the motion sensors comprise a gyroscope, an accelerometer, or a magnetic field sensor within the handheld device.

23. The method of claim 1 further comprising receiving a second media stream, performing playback of the media stream and the second media stream, and changing the playback speed of the media stream and the second media stream on the handheld device, based on the rotation angle.

24. The method of claim 1 wherein the playback speed of the media stream is paused at an initial orientation and changes based on the rotation angle.

25. The method of claim 1 wherein the media stream comprises a single video channel and a pair of audio channels.

26. The method of claim 1 wherein the rotation angle is used to generate a rotation metric, wherein the rotation metric impacts zoom calculations and renderings for the playback.

27. The method of claim 1 wherein the changing the playback enables an immersive video experience.

28. A non-transitory computer readable medium that stores a computer program for media stream playback, the computer program comprising code which causes one or more processors to perform operations of:
receiving a media stream from a server, wherein the media stream is targeted for display on a handheld media stream playback device;
determining an orientation of the handheld device during playback of the media stream on the handheld device using data from a gravity sensor;
detecting a change in the orientation of the handheld device, wherein the change occurs during playback of the media stream, wherein the detecting includes performing a low-pass filtering on the data from the gravity sensor to create a filtered output;
calculating an intermediate rotation angle of the handheld device, based on the detecting; and
selectively changing a plurality of parameters associated with the playback of the media stream on the handheld device, based on the intermediate rotation angle of the handheld device, while simultaneously changing playback speed of the media stream on the handheld device, as a function of the intermediate rotation angle and the filtered output of the gravity sensor, and wherein the changing the playback speed comprises changing speed at which the media stream is rendered on the handheld device.

29. A computer system for media stream playback comprising:
a memory which stores instructions;
one or more processors coupled to the memory wherein the one or more processors, when executing the instructions which are stored, are configured to perform:
receiving a media stream from a server, wherein the media stream is targeted for display on a handheld media stream playback device;
determining an orientation of the handheld device during playback of the media stream on the handheld device using data from a gravity sensor;
detecting a change in the orientation of the handheld device, wherein the change occurs during playback of the media stream, wherein the detecting includes performing a low-pass filtering on the data from the gravity sensor to create a filtered output;
calculating an intermediate rotation angle of the handheld device, based on the detecting; and
selectively changing a plurality of parameters associated with the playback of the media stream on the handheld device, based on the intermediate rotation angle of the handheld device, while simultaneously changing playback speed of the media stream on the handheld device, as a function of the intermediate rotation angle and the filtered output of the gravity sensor, and wherein the changing the playback speed comprises changing speed at which the media stream is rendered on the handheld device.

30. The method of claim 1 wherein the performing of the low-pass filtering occurs in response to an output from the gravity sensor exceeding a predetermined threshold.

31. The method of claim 30 further comprising computing a scale factor based on the rotation angle, wherein the scale factor is computed to enable the media stream to be rendered in a rectangle inscribed within an oval region on the handheld media stream playback device.

32. The method of claim 31 further comprising performing a pre-zoom operation, wherein the pre-zoom operation causes the scale factor to be computed as a fixed scale such that the scale factor is maintained throughout viewing of the media stream.

33. The method of claim 1 wherein determining an orientation of the handheld device comprises determining a flat orientation of the handheld device, wherein the display screen is oriented such that gravity's direction is perpendicular to the display screen.

34. The method of claim 1 further comprising adjusting volume to compensate for the selectively changing playback speed of the media stream.

35. The method of claim 1 wherein changing playback speed of the media stream comprises stopping playback.

* * * * *